(12) United States Patent
Watanabe et al.

(10) Patent No.: US 9,787,905 B2
(45) Date of Patent: Oct. 10, 2017

(54) IMAGE PROCESSING APPARATUS, IMAGE DISPLAY APPARATUS AND IMAGING APPARATUS HAVING THE SAME, IMAGE PROCESSING METHOD, AND COMPUTER-READABLE MEDIUM STORING IMAGE PROCESSING PROGRAM FOR DISPLAYING AN IMAGE HAVING AN IMAGE RANGE ASSOCIATED WITH A DISPLAY AREA

(71) Applicant: OLYMPUS CORPORATION, Tokyo (JP)

(72) Inventors: Nobuyuki Watanabe, Yokohama-shi (JP); Naoyuki Miyashita, Tokyo (JP); Hideaki Furukawa, Tokyo (JP); Hiroshi Matsuzaki, Tokyo (JP); Takahiro Yano, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/714,915

(22) Filed: May 18, 2015

(65) Prior Publication Data

US 2015/0249790 A1  Sep. 3, 2015

Related U.S. Application Data

(62) Division of application No. 13/287,679, filed on Nov. 2, 2011, now abandoned.

(30) Foreign Application Priority Data

Nov. 2, 2010  (JP) ................................. 2010-246528
Nov. 2, 2010  (JP) ................................. 2010-246529

(Continued)

(51) Int. Cl.
*H04N 5/232* (2006.01)
*H04N 5/262* (2006.01)
(Continued)

(52) U.S. Cl.
CPC ..... *H04N 5/23293* (2013.01); *G06K 9/00711* (2013.01); *G06K 9/3233* (2013.01);
(Continued)

(58) Field of Classification Search
CPC ........... H04N 5/23293; H04N 5/23219; H04N 5/2621
(Continued)

(56) References Cited

U.S. PATENT DOCUMENTS

2008/0218596 A1  9/2008 Hoshino
2009/0268074 A1  10/2009 Sugino
(Continued)

FOREIGN PATENT DOCUMENTS

JP  2007-129480 A  5/2007
JP  4029174 B2  1/2008
(Continued)

OTHER PUBLICATIONS

Office Action dated Jun. 16, 2015, issued in counterpart Japanese Patent Application No. 2011-231886, with English translation (8 pages).

*Primary Examiner* — Antoinette Spinks
(74) *Attorney, Agent, or Firm* — Westerman, Hattori, Daniels & Adrian, LLP

(57) ABSTRACT

An image processing apparatus receives an image signal and generates a display image having an image range associated with a display area of a display unit from an image based on the image signal. The image processing apparatus includes a position-of-interest-calculating-unit, a frame-out-accuracy-calculation-unit, an alteration-variable-decision-unit
(Continued)

and an image-alteration-unit. The position-of-interest-calculating-unit calculates a position of interest as a position of an object of interest in the image. The frame-out-accuracy-calculation-unit calculates a frame-out accuracy representing an accuracy that the position of interest deviates from the image range based on the position of interest and the image range. The alteration-variable-decision-unit decides a processing variable of alteration processing performed with respect to the image in conformity with the frame-out accuracy. The image-alteration-unit performs the alteration processing with respect to the image in conformity with the decided processing variable to generate a signal of the display image.

48 Claims, 49 Drawing Sheets

(30) Foreign Application Priority Data

Jan. 26, 2011 (JP) .................. 2011-013696
Oct. 21, 2011 (JP) .................. 2011-231886

(51) Int. Cl.
*G06K 9/00* (2006.01)
*G06K 9/32* (2006.01)

(52) U.S. Cl.
CPC ....... *H04N 5/23219* (2013.01); *H04N 5/2621* (2013.01); *G06K 2209/27* (2013.01)

(58) Field of Classification Search
USPC ....................................... 348/222.1
See application file for complete search history.

(56) References Cited

U.S. PATENT DOCUMENTS

| | | |
|---|---|---|
| 2010/0149400 A1 | 6/2010 | Sugino |
| 2011/0019027 A1* | 1/2011 | Fujita ............... G06T 7/20 348/222.1 |
| 2015/0149956 A1* | 5/2015 | Kempinski ......... G06F 3/017 715/784 |

FOREIGN PATENT DOCUMENTS

| | | |
|---|---|---|
| JP | 2008-278480 A | 11/2008 |
| JP | 2009-218719 A | 9/2009 |
| JP | 2010-141722 A | 6/2010 |

\* cited by examiner

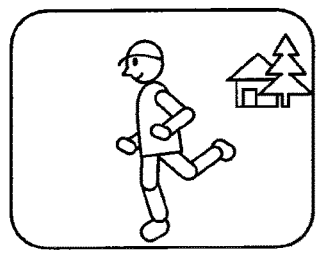
F I G. 5
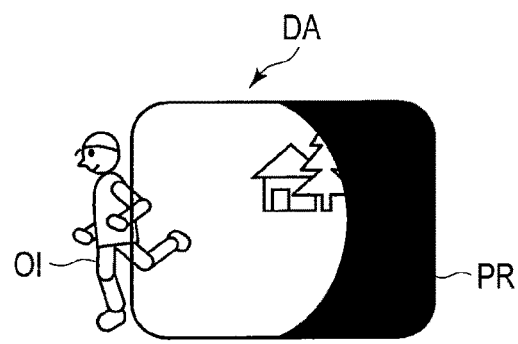
F I G. 6
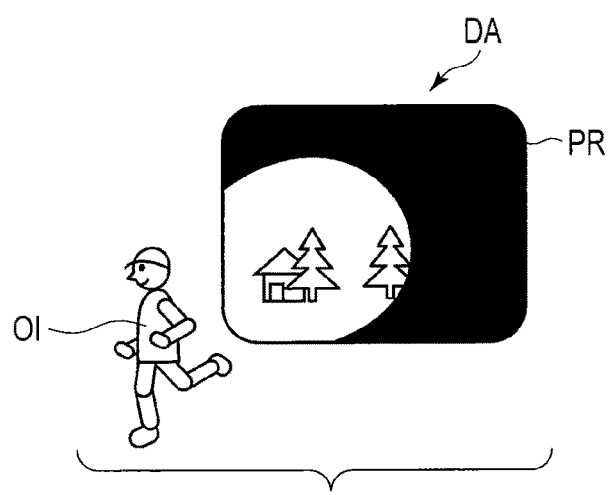
F I G. 7

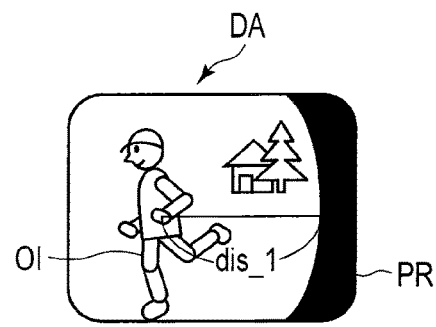
F I G. 1 2 A
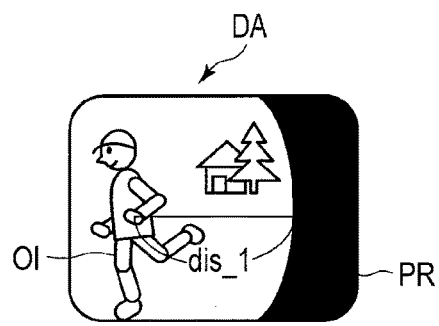
F I G. 1 2 B
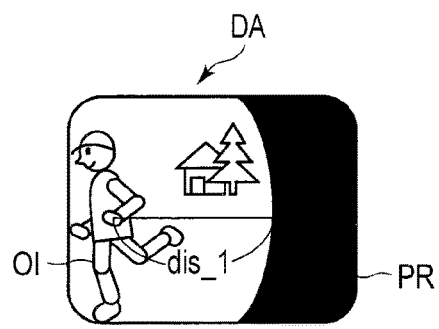
F I G. 1 2 C

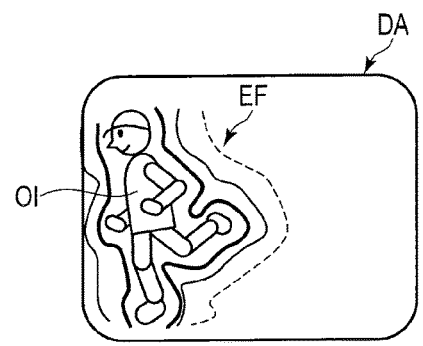
F I G. 2 1
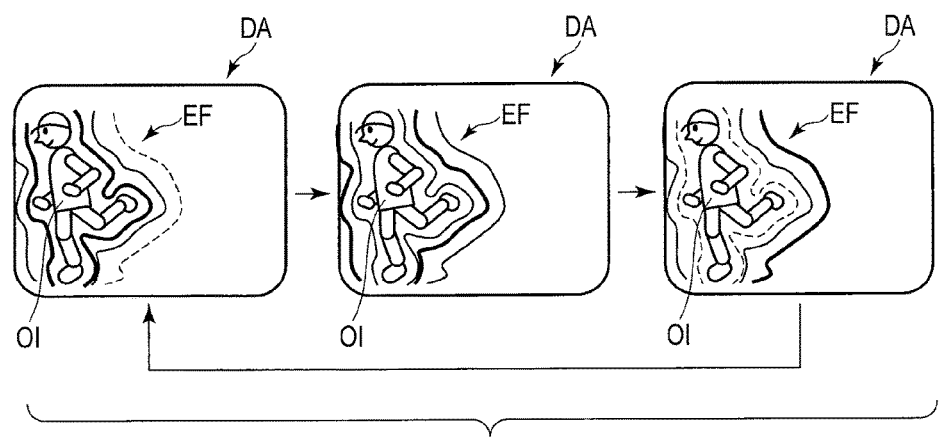
F I G. 2 2

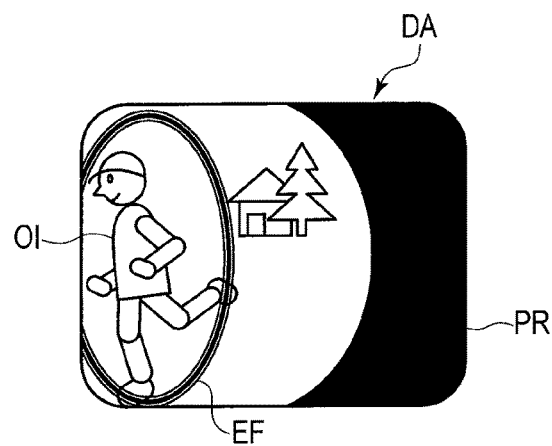
F I G. 26
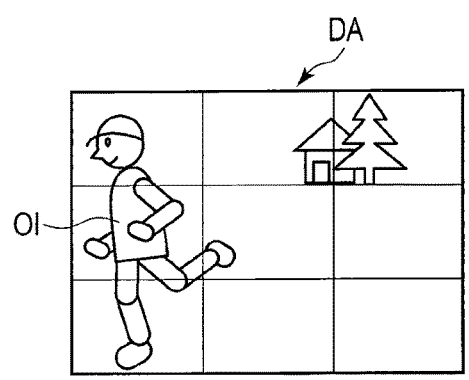
F I G. 29A
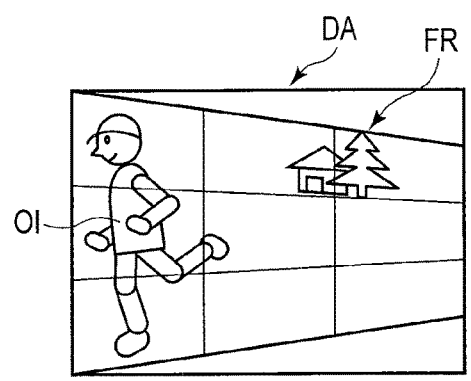
F I G. 29B

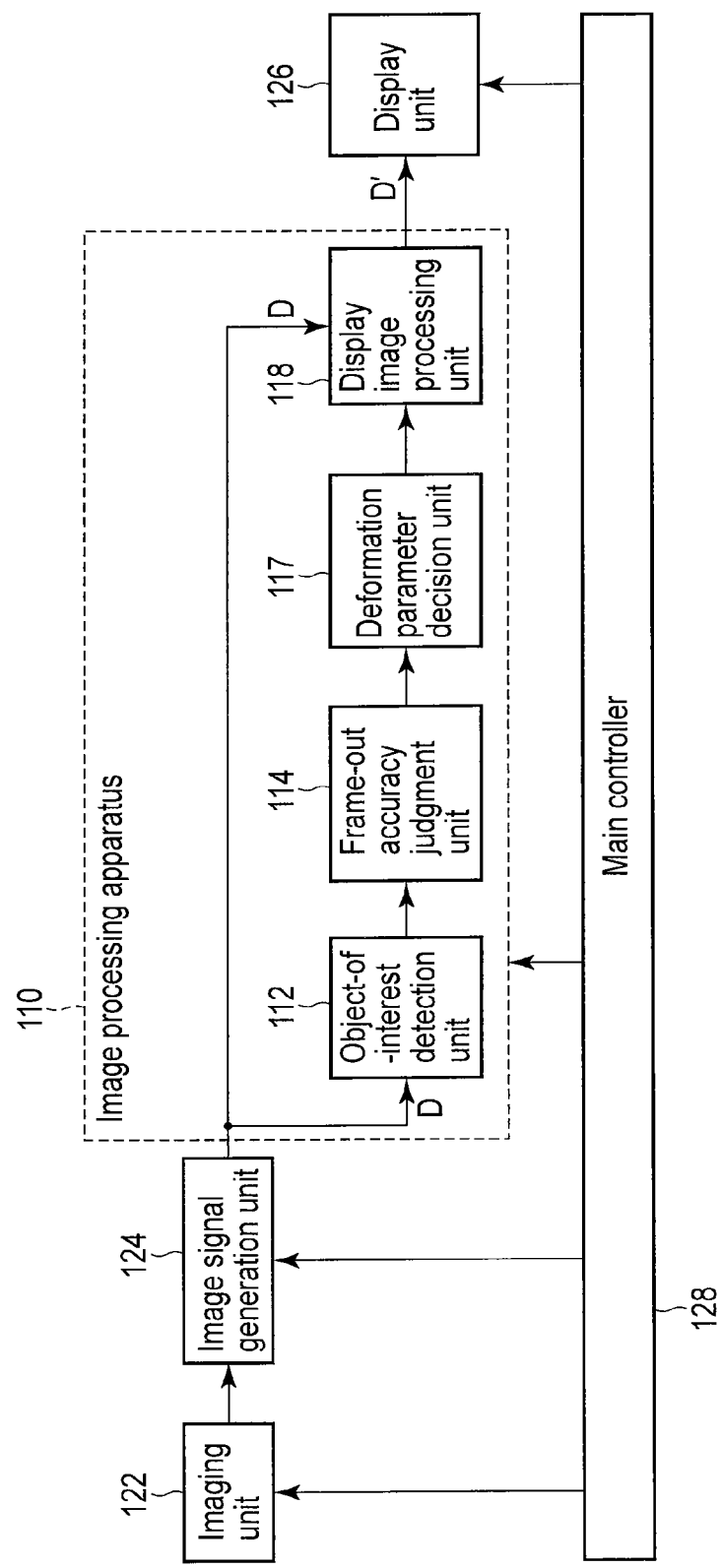
F I G. 27

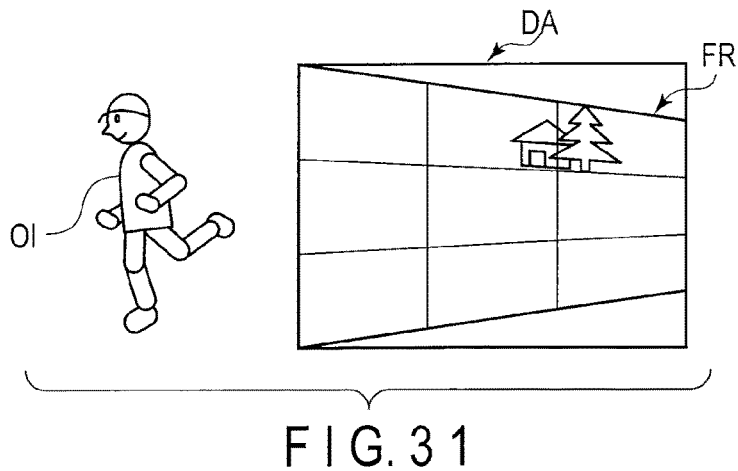
F I G. 3 1
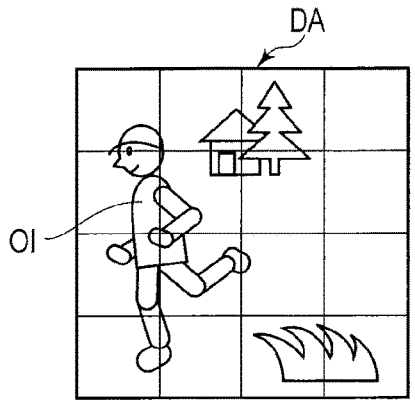
F I G. 3 2 A
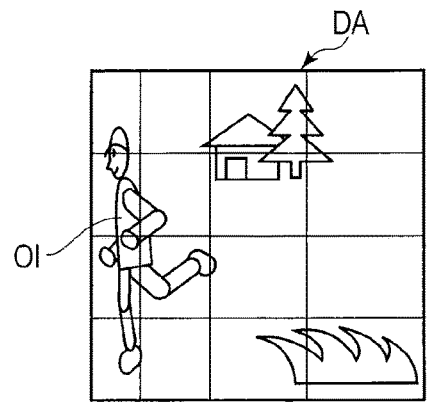
F I G. 3 2 B
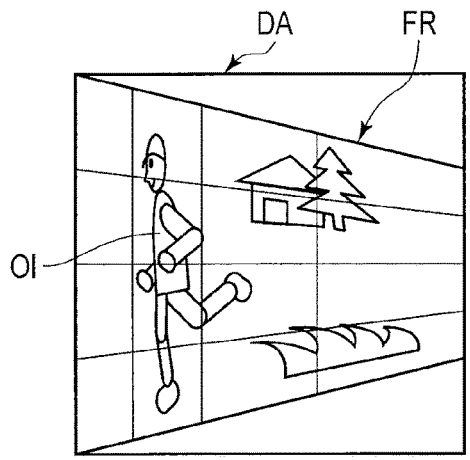
F I G. 3 3
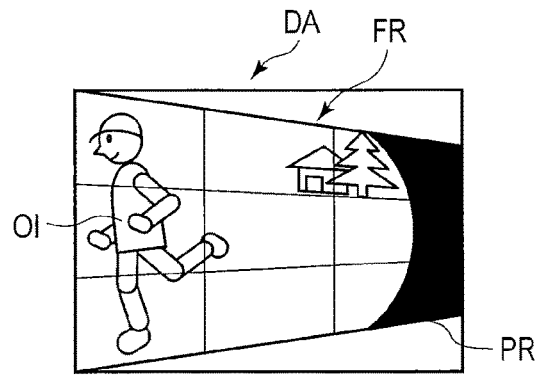
F I G. 3 4

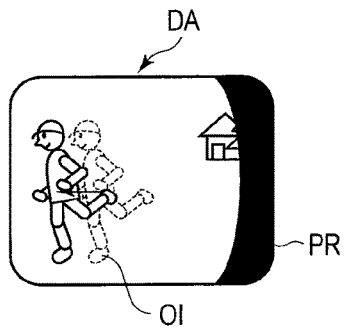 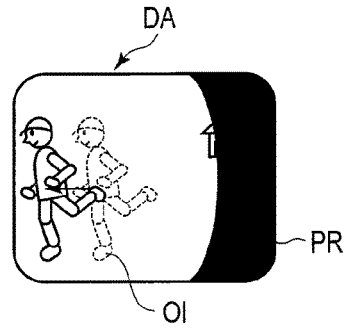
FIG. 38A   FIG. 38B
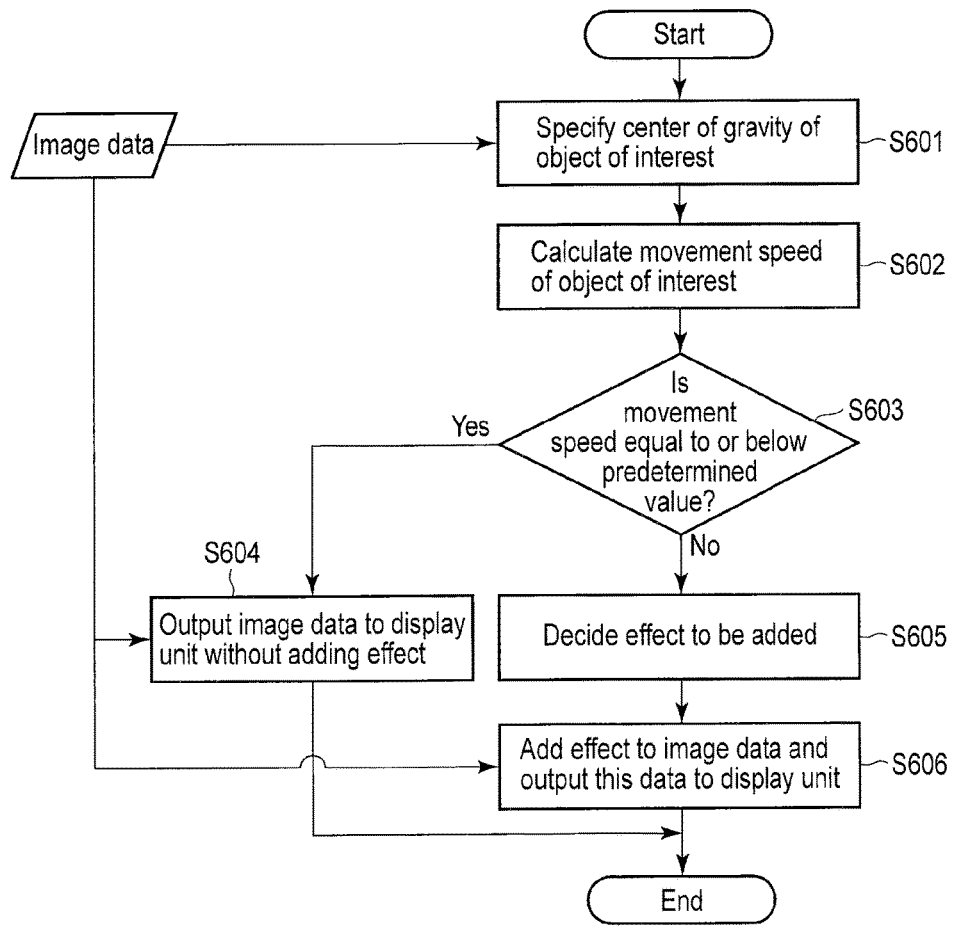
FIG. 39

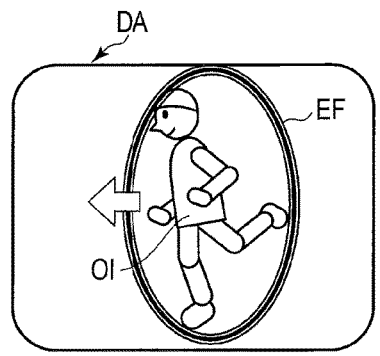 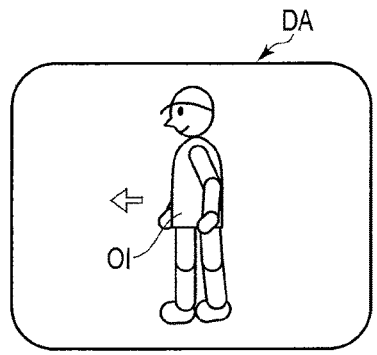
FIG. 40A  FIG. 40B
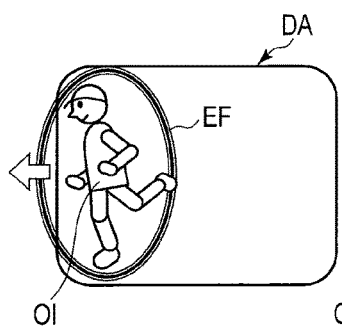 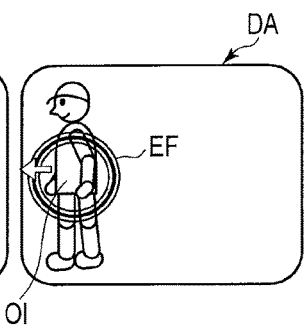 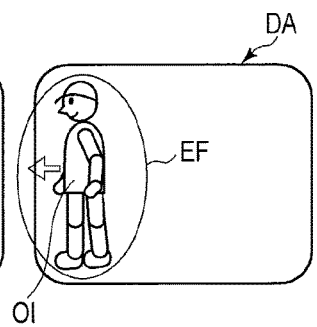
FIG. 41A  FIG. 41B  FIG. 41C
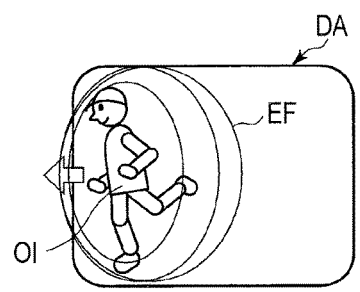
FIG. 42

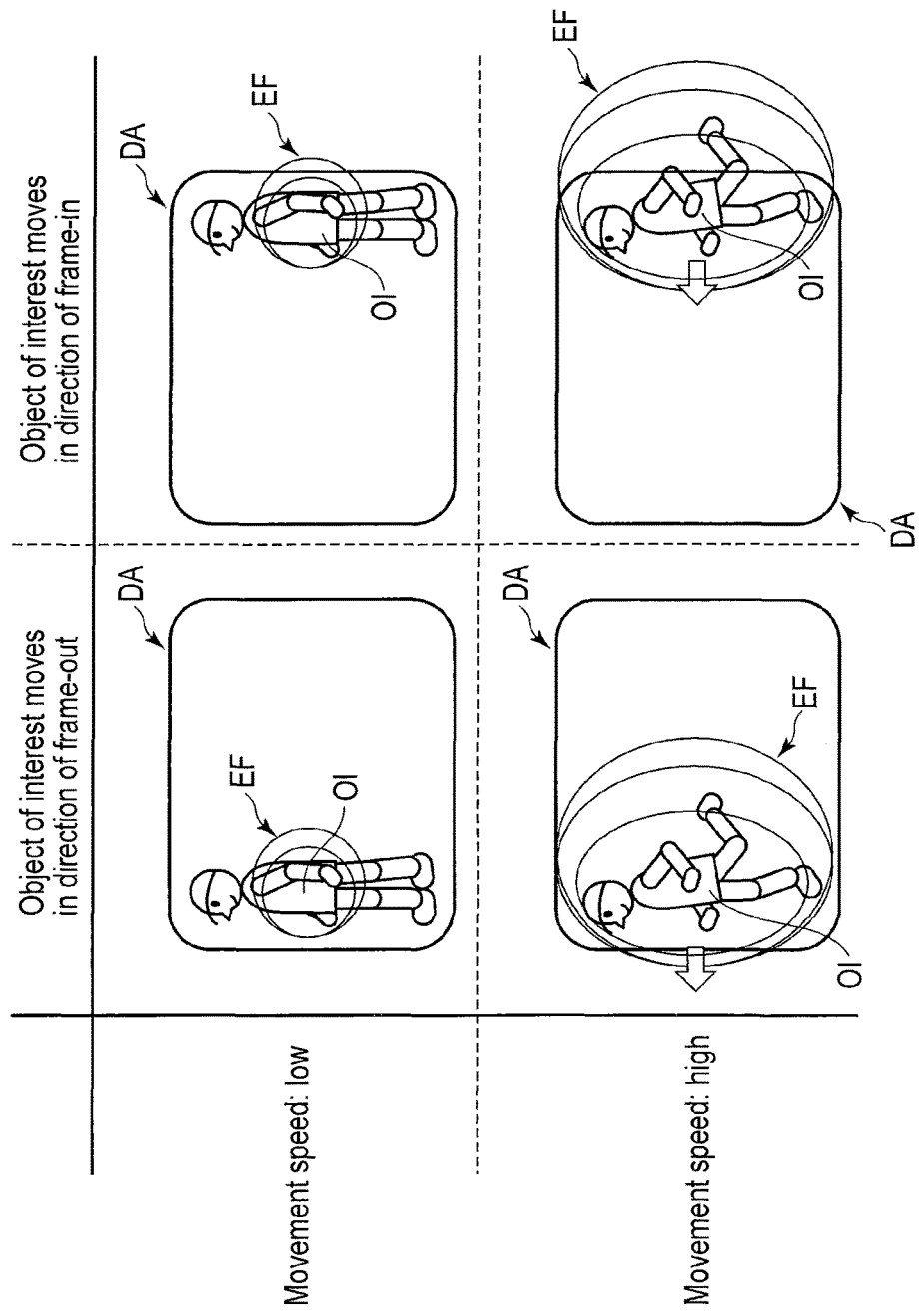
F I G. 43

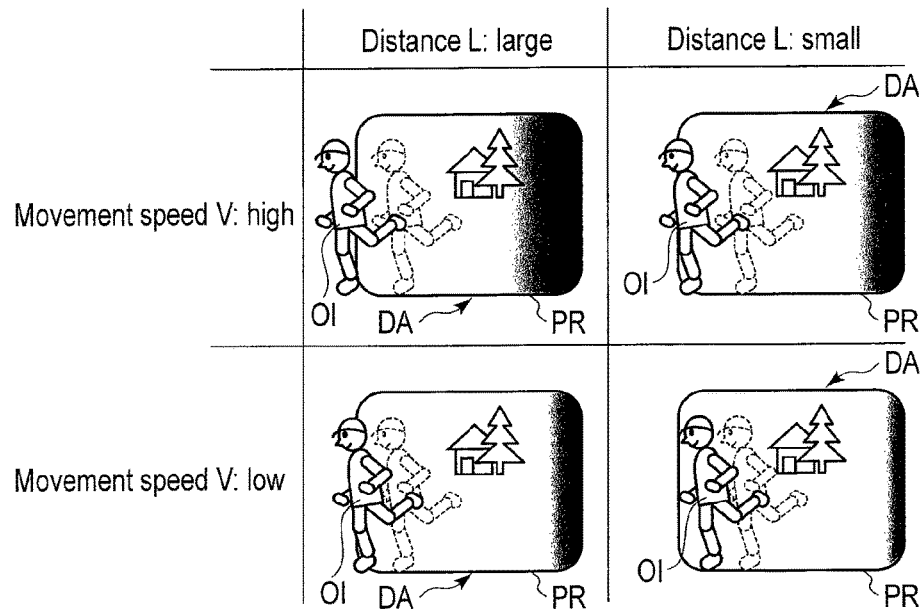
F I G. 47
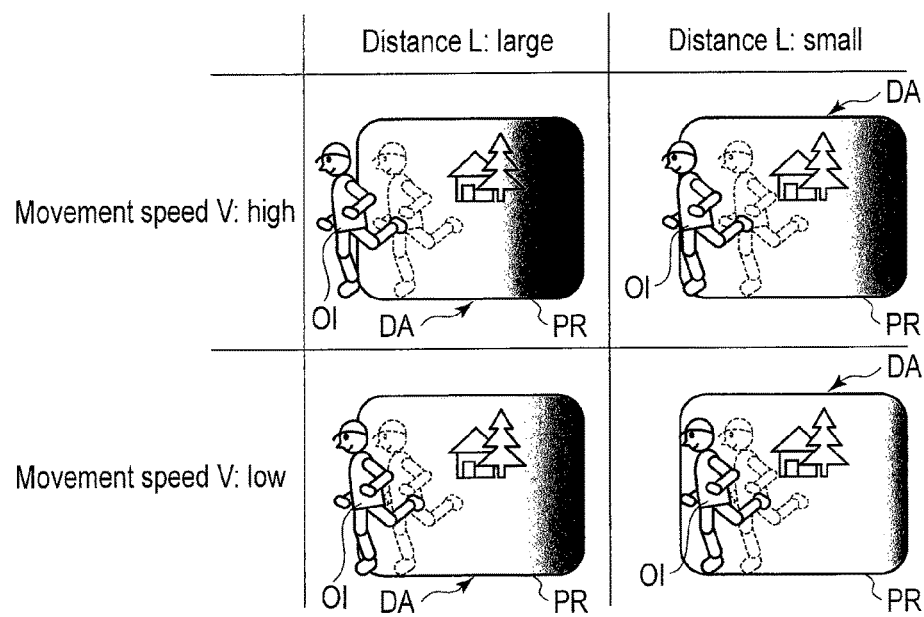
F I G. 48

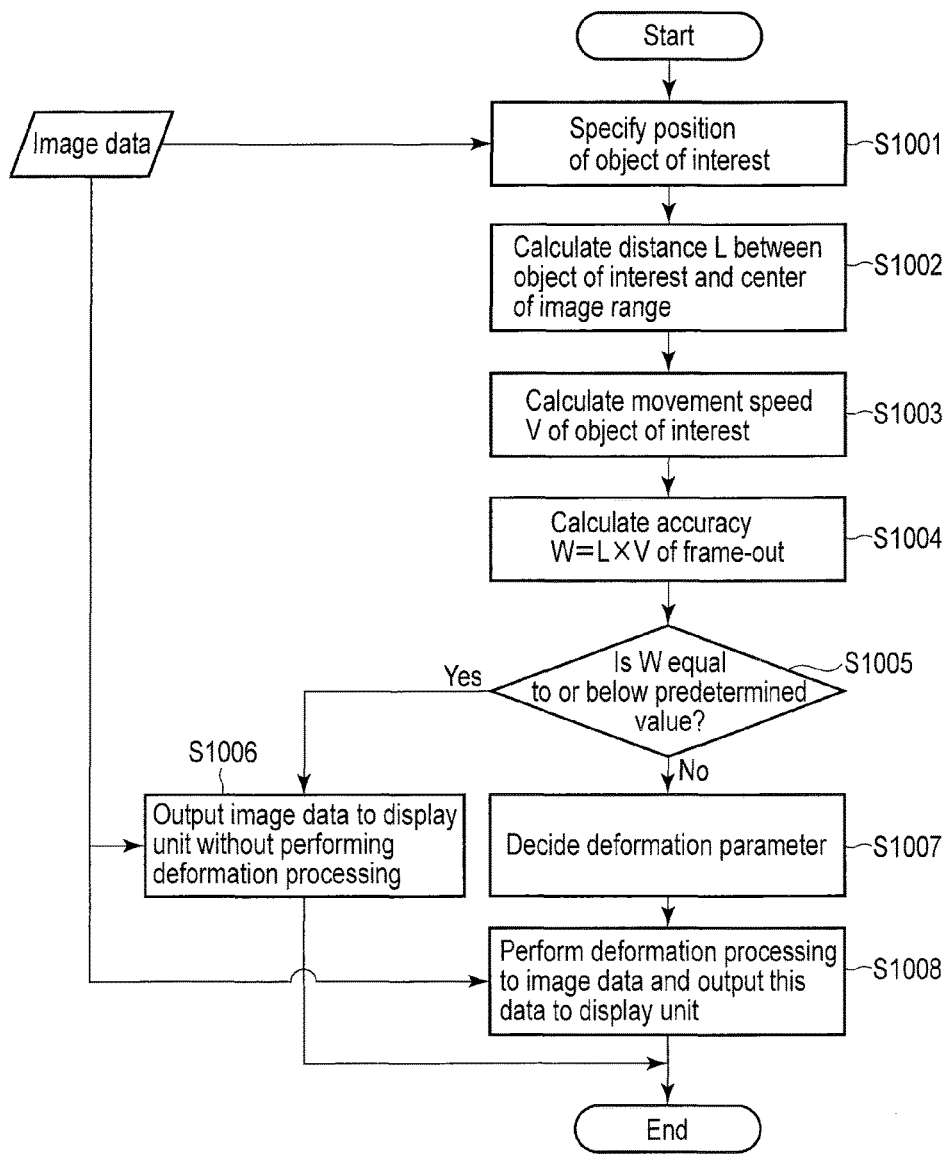
F I G. 51

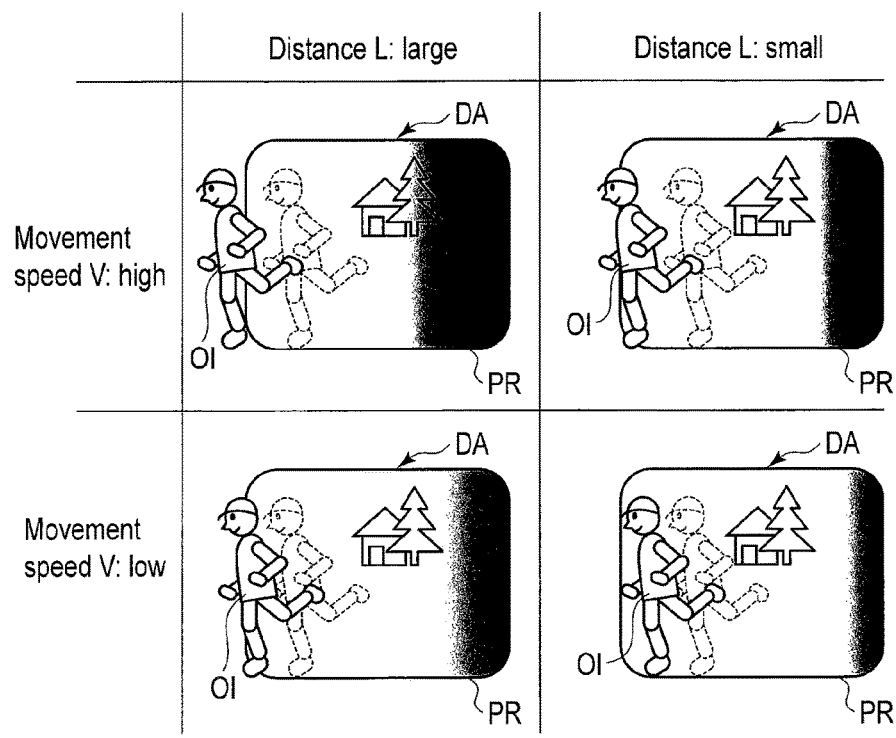
F I G. 54

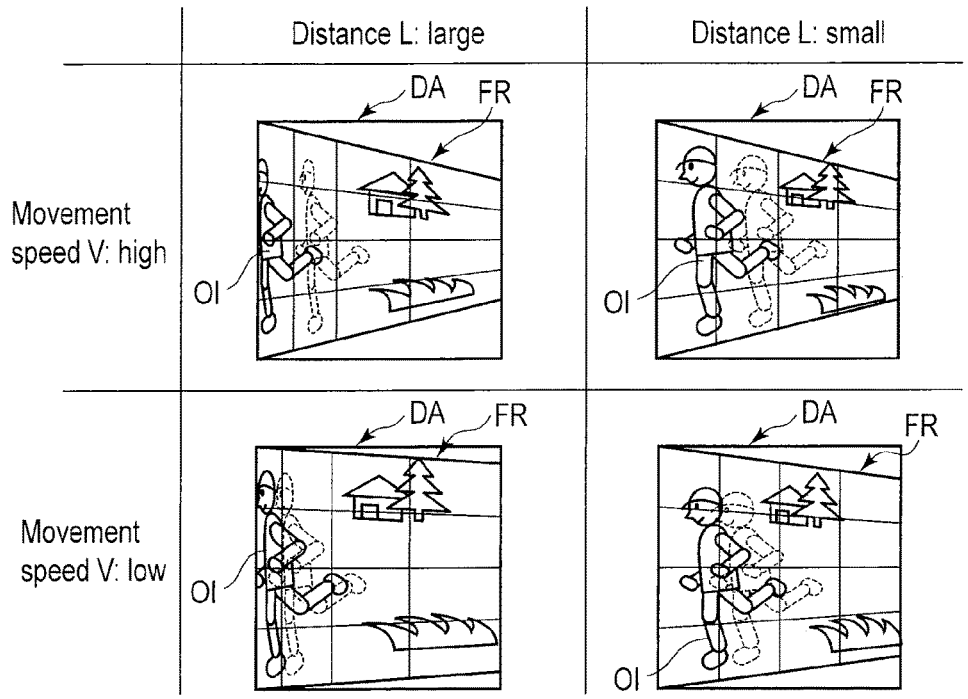
F I G. 59
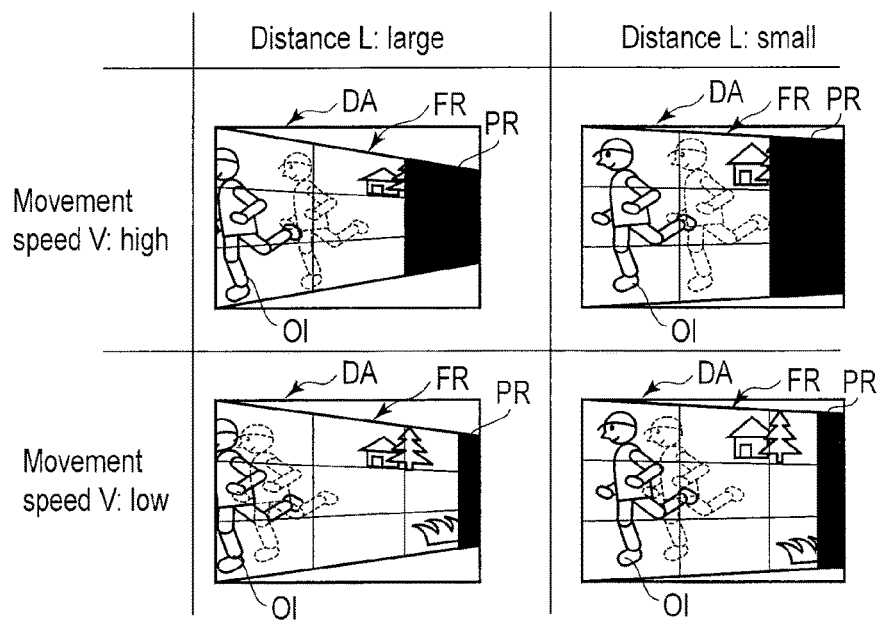
F I G. 60

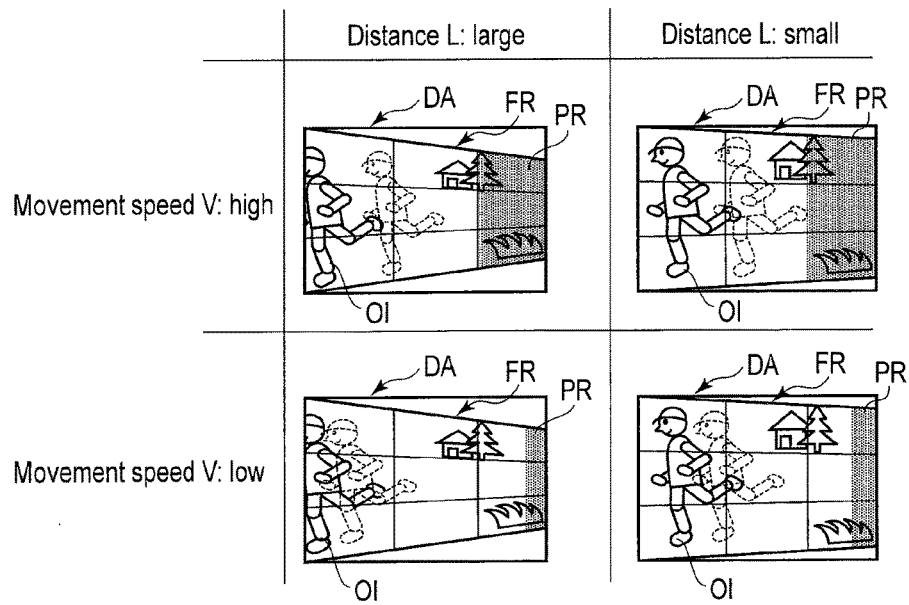
F I G. 6 1
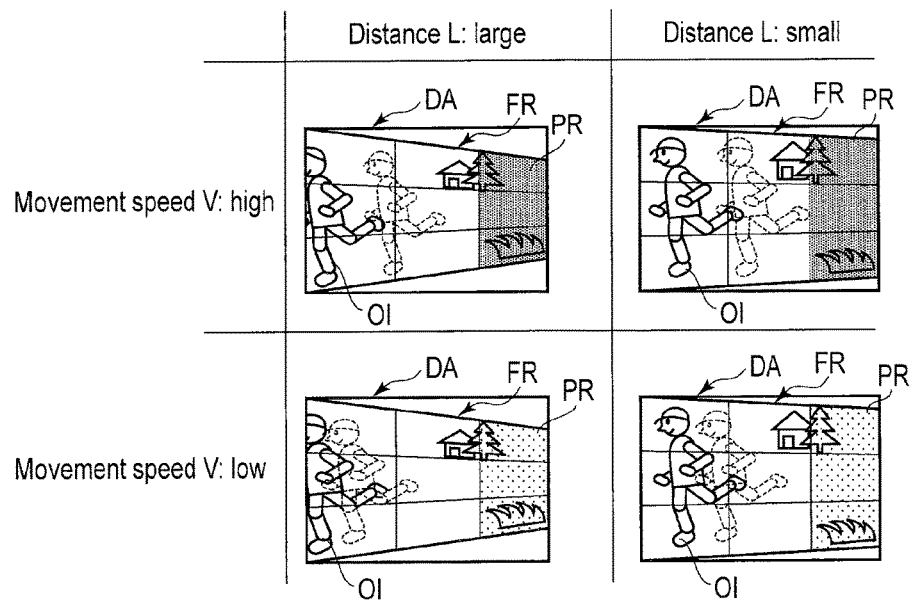
F I G. 6 2

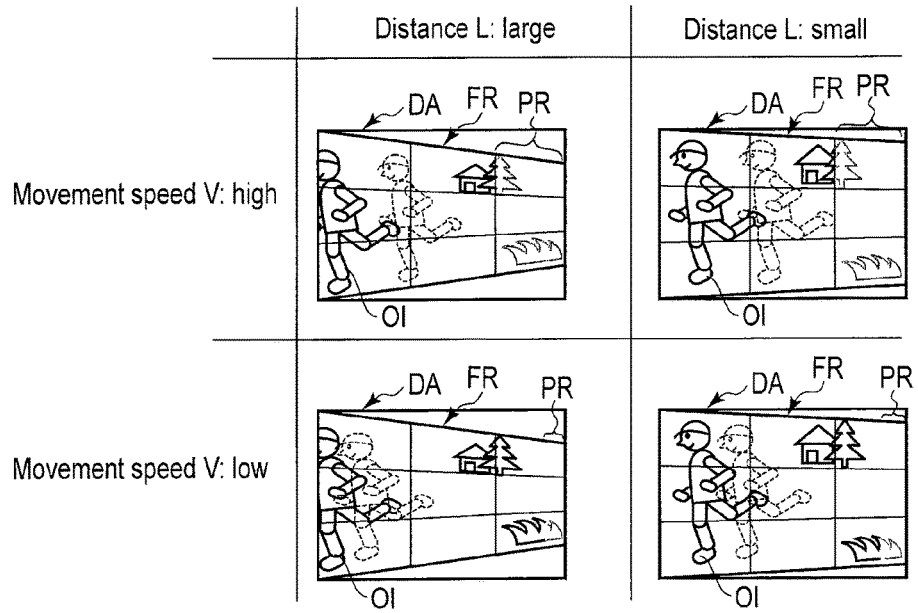
F I G. 63
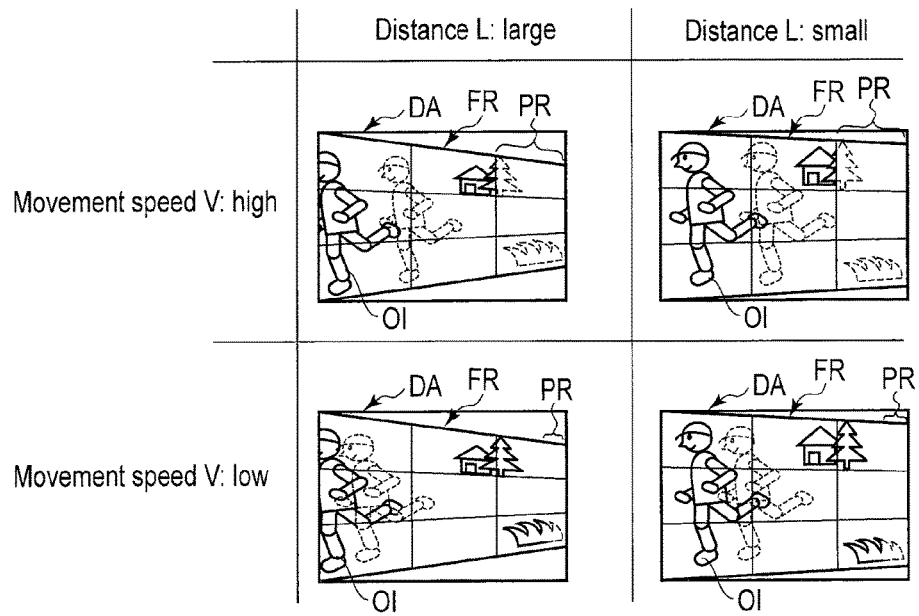
F I G. 64

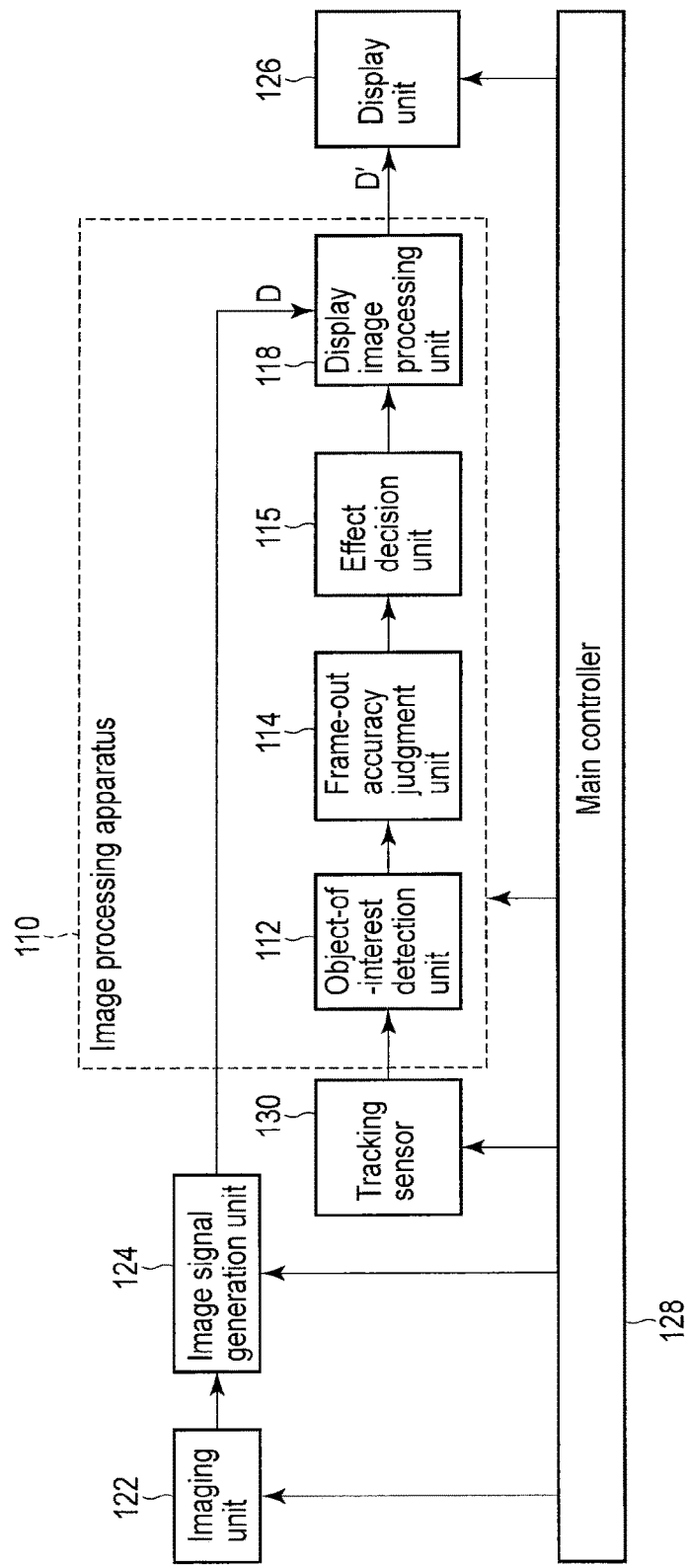
F I G. 6 8

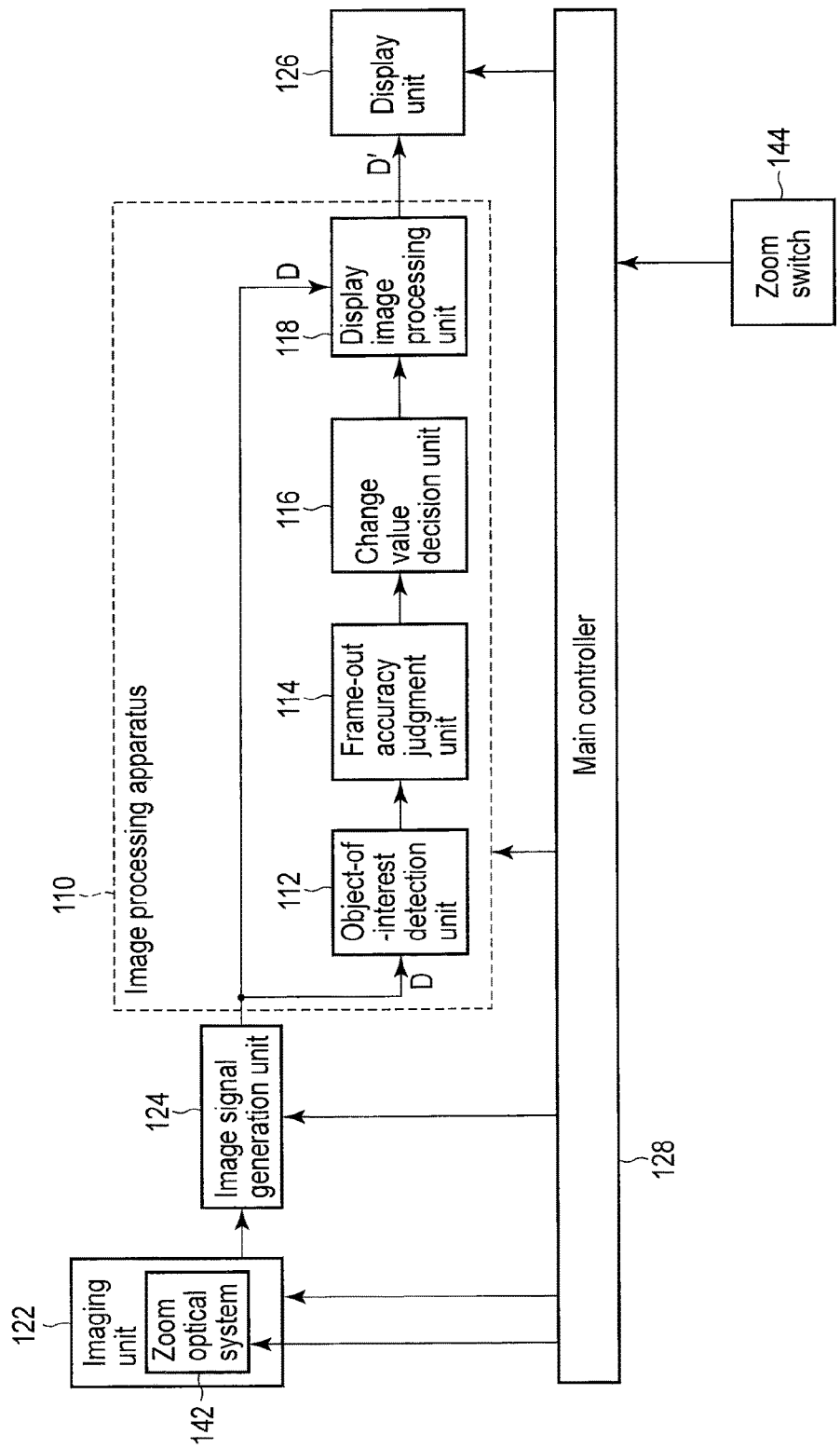
F I G. 70

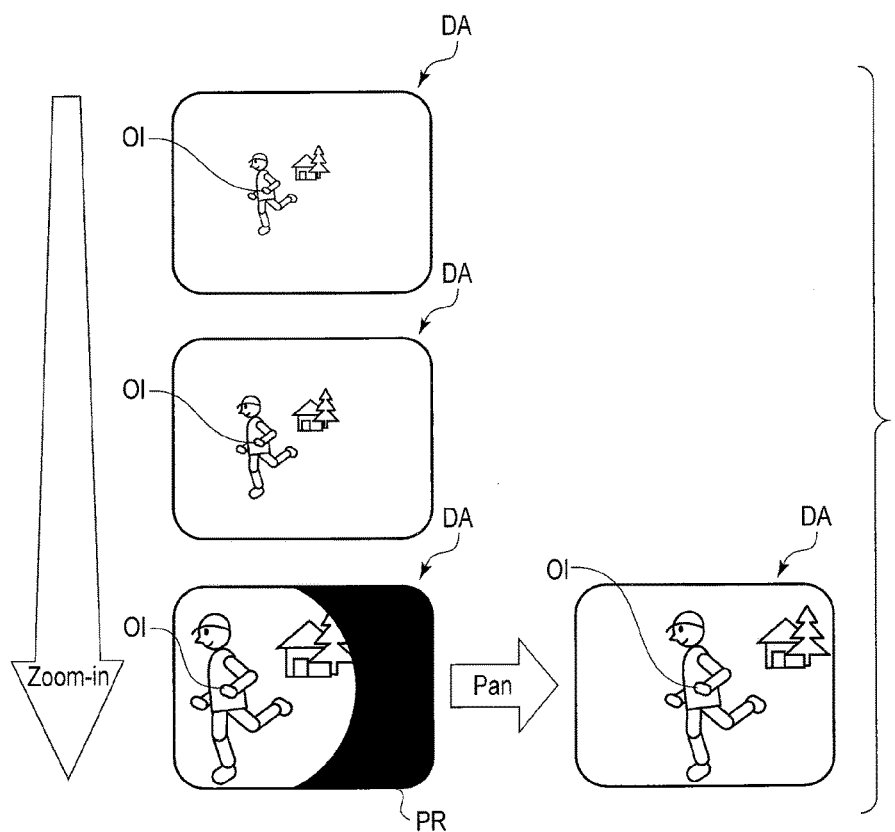
F I G. 72

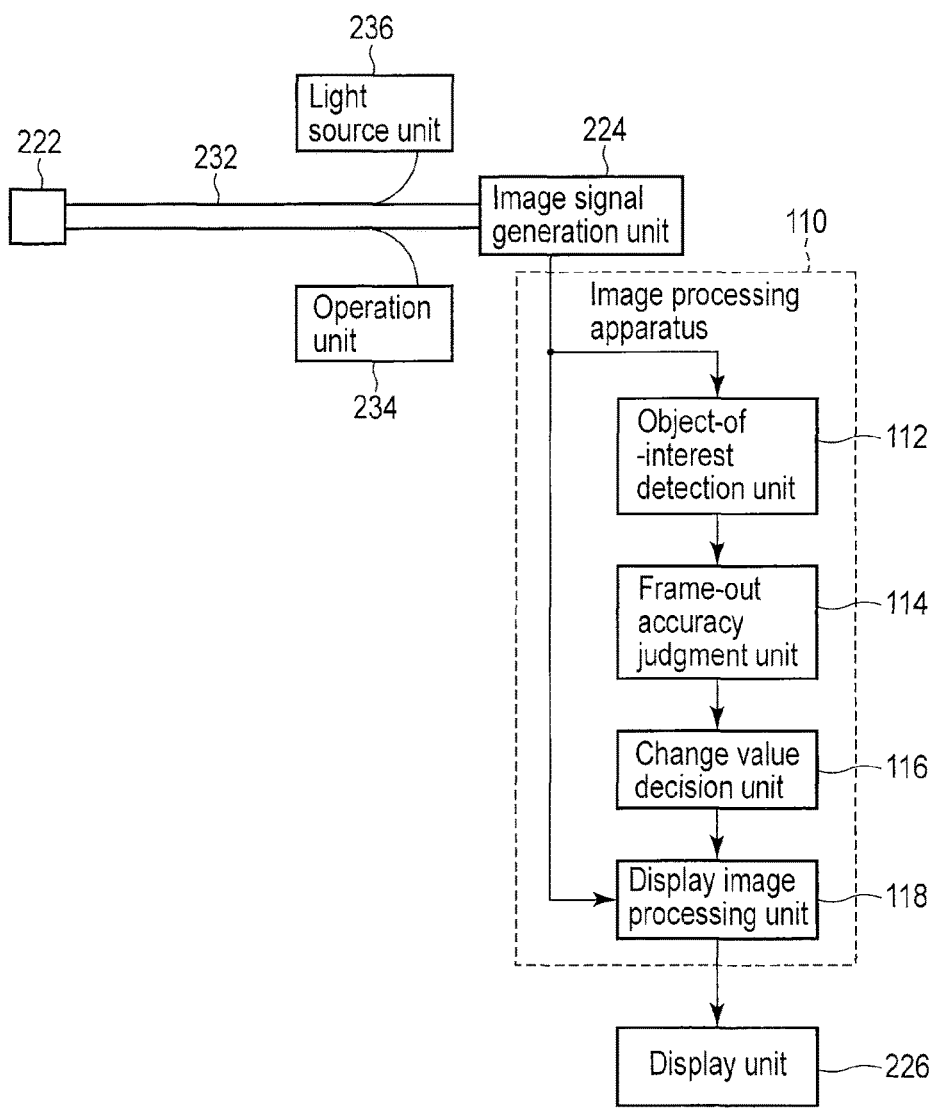
F I G. 74

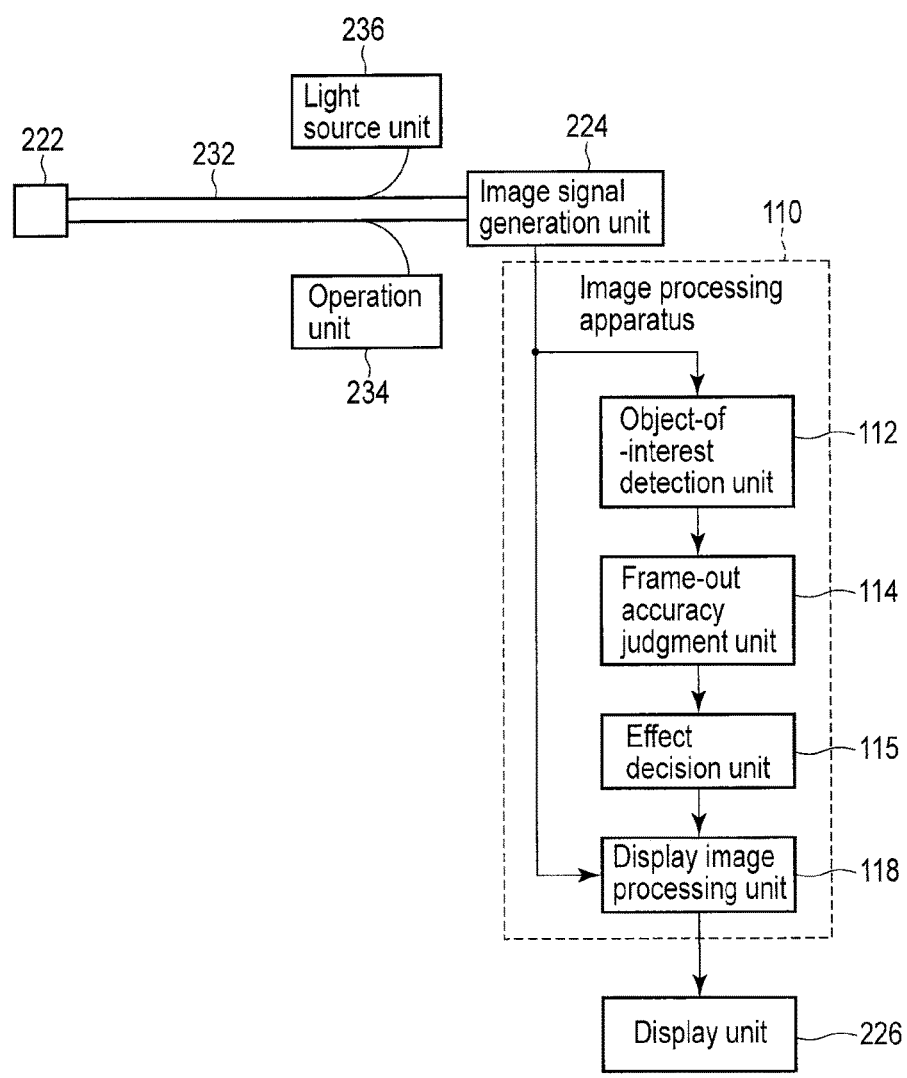
F I G. 75

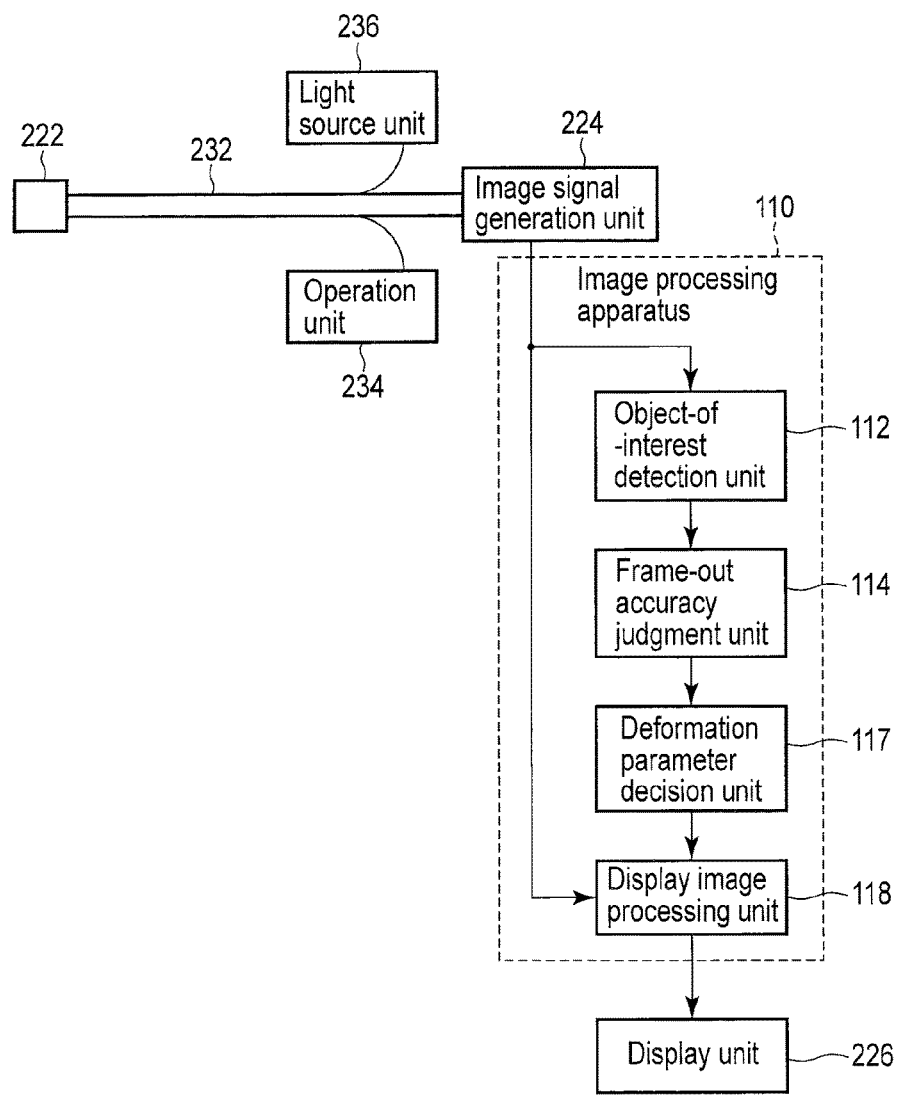
F I G. 7 6

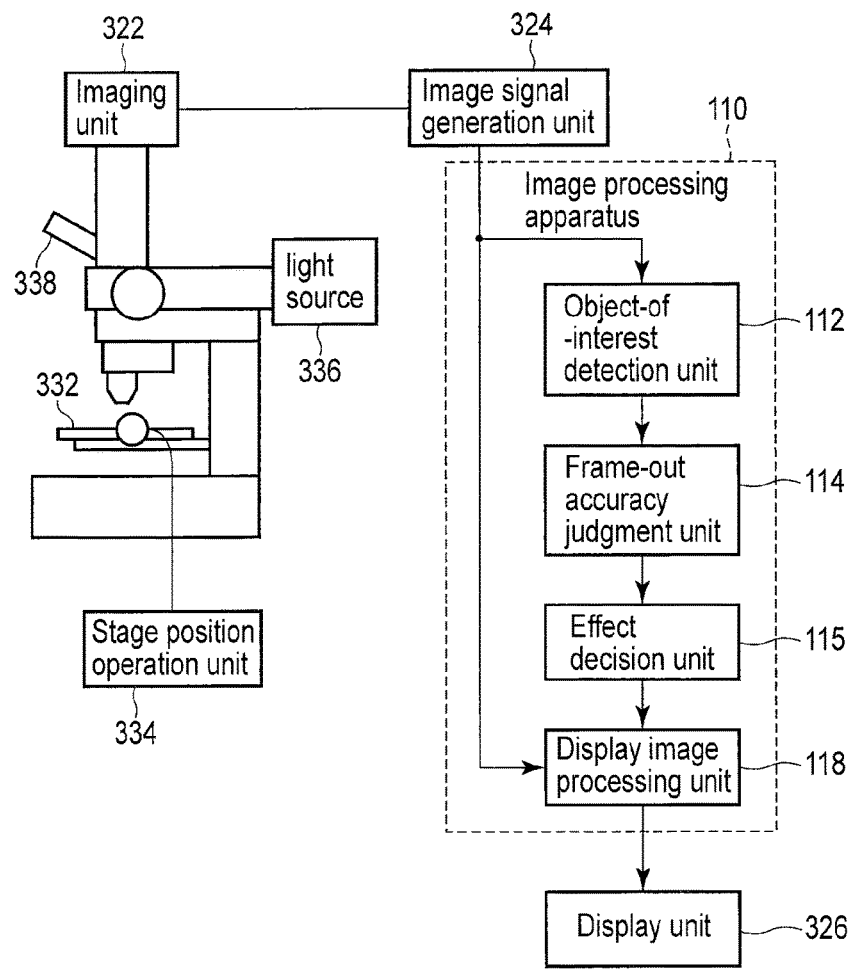
F I G. 7 8

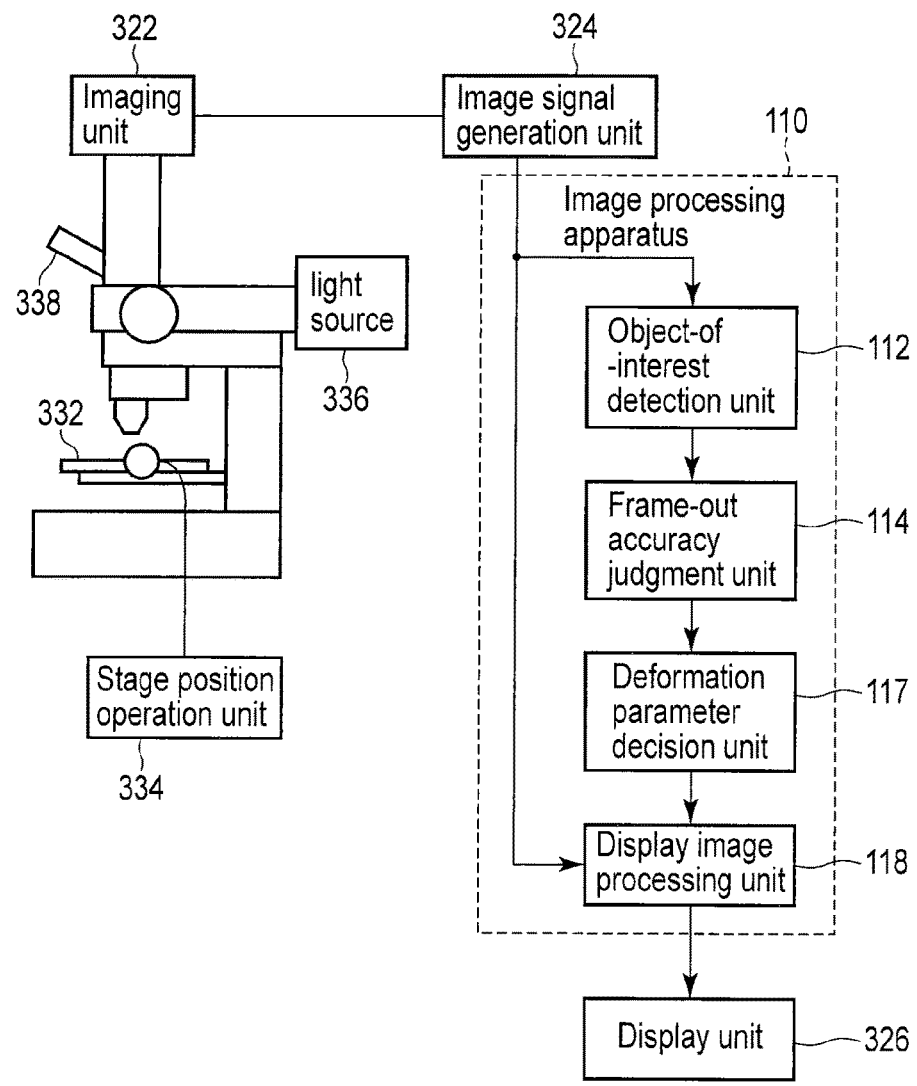
F I G. 79

IMAGE PROCESSING APPARATUS, IMAGE DISPLAY APPARATUS AND IMAGING APPARATUS HAVING THE SAME, IMAGE PROCESSING METHOD, AND COMPUTER-READABLE MEDIUM STORING IMAGE PROCESSING PROGRAM FOR DISPLAYING AN IMAGE HAVING AN IMAGE RANGE ASSOCIATED WITH A DISPLAY AREA

CROSS REFERENCE TO RELATED APPLICATIONS

This application is a divisional of U.S. application Ser. No. 13/287,679 filed Nov. 2, 2011, and is based upon and claims the benefit of priority from prior Japanese Patent Applications No. 2010-246528, filed Nov. 2, 2010; No. 2010-246529, filed Nov. 2, 2010; No. 2011-013696, filed Jan. 26, 2011; and No. 2011-231886, filed Oct. 21, 2011; and the entire contents of all of which are incorporated herein by reference.

BACKGROUND OF THE INVENTION

1. Field of the Invention

The present invention relates to an image processing apparatus, an image display apparatus and an imaging apparatus having the same, an image processing method, and an image processing program.

2. Description of the Related Art

When imaging an object of interest using, e.g., a digital camera, the object of interest cannot be surely imaged unless this object of interest is present within the imaging range. Therefore, there has been known a technology that effects display for guiding a user so that an object of interest can be placed within the imaging range.

For example, Japanese Patent No. 4029174 discloses a camera adopting the following technology. That is, according to this technology, a camera extracts a part of a contour of an object of interest based on luminance distribution of an image that is obtained when the camera is aimed at a subject to be imaged, and it compares a position of the contour with a predetermined appropriate range to judge whether the composition is good. When the composition is determined to be poor, the camera outputs a warning and displays an indication of which one of up, down, left, and right directions the camera should be aimed in to provide the appropriate composition in a display unit provided separately from an image display apparatus.

Further, Jpn. Pat. Appln. KOKAI Publication No. 2008-278480 discloses an imaging apparatus adopting the following technology. That is, according to this technology, the imaging apparatus displays a wide-angle image and an image, which shows an enlarged imaging range of a part of the wide-angle image, in parallel. This apparatus detects a position of an object of interest and informs a user of a direction the imaging apparatus should be aimed in so that the object of interest can be arranged within the enlarged image.

Furthermore, Jpn. Pat. Appln. KOKAI Publication No. 2007-129480 discloses an imaging apparatus adopting the following technology. That is, according to this technology, a moving image, which is being acquired, is displayed in a screen of a display unit. This apparatus traces movement of an object of interest and displays, e.g., a guide that shows a direction in which the object of interest, which has moved to the outside of the screen, is present when the traced object of interest deviates from the range of a screen of the display unit and has an arrow pattern and the like in the display unit while being superimposed on the moving image.

BRIEF SUMMARY OF THE INVENTION

According to an aspect of the invention, an image processing apparatus which receives an image signal and generates a display image having an image range associated with a display area of a display unit from an image based on the image signal includes a position-of-interest calculating unit which calculates a position of interest as a position of an object of interest in the image based on the image signal; a frame-out accuracy calculation unit which calculates a frame-out accuracy representing an accuracy that the position of interest deviates from the image range based on the position of interest and the image range; an alteration variable decision unit which decides a processing variable of alteration processing performed with respect to the image based on the image signal in conformity with the frame-out accuracy; and an image alteration unit which performs the alteration processing with respect to the image based on the image signal in conformity with the decided processing variable to generate a signal of the display image.

According to an aspect of the invention, an image display apparatus includes the above mentioned image processing apparatus; and the display unit which displays the display image generated by the image processing apparatus.

According to an aspect of the invention, an imaging apparatus includes the above mentioned image processing apparatus; and an imaging unit which performs imaging to generate the image signal that is input to the image processing apparatus.

According to an aspect of the invention, an image processing method of generating a display image having an image range associated with a display area of a display unit from an image based on an input image signal includes: calculating a position of interest which is a position of an object of interest in the image based on the image signal; calculating a frame-out accuracy representing an accuracy that the position of interest deviates from the image range based on the position of interest and the image range; deciding a processing variable of alteration processing performed with respect to the image based on the image signal in conformity with the frame-out accuracy; and performing the alteration processing with respect to the image based on the image signal in conformity with the decided processing variable to generate a signal of the display image.

According to an aspect of the invention, a computer-readable medium stores an image processing program being executed by a computer and configured to generate a display image having an image range associated with a display area of a display unit from an image based on an input image signal, the program controlling the computer to execute functions including: calculating a position of interest which is a position of an object of interest in the image based on the image signal; calculating a frame-out accuracy representing an accuracy that the position of interest deviates from the image range based on the position of interest and the image range; deciding a processing variable of alteration processing performed with respect to the image based on the image signal in conformity with the frame-out accuracy; and performing the alteration processing with respect to the image based on the image signal in conformity with the decided processing variable to generate a signal of the display image.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a view showing an image example created by the image processing apparatus according to the first embodiment of the present invention, which is also a view for explaining that the change processing is not performed with respect to an image when the object of interest is present at the center;

FIG. 6 is a view showing an image example created after the change processing executed by the image processing apparatus according to the first embodiment of the present invention and also showing a display state corresponding to a state in which deviation of the object of interest is large;

FIG. 7 is a view showing an image example created after the change processing executed by the image processing apparatus according to the first embodiment of the present invention, which is also an image example after the change processing in a situation in which the object of interest further deviates;

FIG. 12A is a view showing a first example of an image created after change processing executed by an image processing apparatus according to a second modification of the first embodiment of the present invention, the change processing relating to a state of an object of interest;

FIG. 12B is a view showing a second example of an image created after change processing executed by the image processing apparatus according to the second modification of the first embodiment of the present invention, the change processing relating to a state of an object of interest;

FIG. 12C is a view showing a third example of an image created after change processing executed by the image processing apparatus according to the second modification of the first embodiment of the present invention, the change processing relating to a state of an object of interest;

FIG. 21 is a view showing an image example after adding an effect created by an image processing apparatus according to a second modification of the second embodiment of the present invention;

FIG. 22 is a view showing another image example after adding an effect created by the image processing apparatus according to the second modification of the second embodiment of the present invention;

FIG. 26 is a view showing an image example created by the image processing apparatus when the first embodiment and the second embodiment according to the present invention are combined with each other;

FIG. 27 is a block diagram showing a configuration example of a digital camera as an imaging apparatus including an image processing apparatus according to a third embodiment of the present invention;

FIG. 29A is a view showing an image example before deformation processing executed by the image processing apparatus according to the third embodiment of the present invention;

FIG. 29B is a view showing an image example after deformation processing executed by the image processing apparatus according to the third embodiment of the present invention;

FIG. 31 is a view showing an image example created after the deformation processing executed by the image processing apparatus according to the third embodiment of the present invention in another situation;

FIG. 32A is a view showing an image example before deformation processing executed by an image processing apparatus according to a first modification of the third embodiment of the present invention;

FIG. 32B is a view showing an image example after deformation processing executed by the image processing apparatus according to the first modification of the third embodiment of the present invention;

FIG. 33 is a view showing an image example after deformation processing executed by an image processing apparatus according to a second modification of the third embodiment of the present invention;

FIG. 34 is a view showing an image example created by the image processing apparatus when the first embodiment and the third embodiment according to the present invention are combined with each other;

FIG. 38A is a view showing an image example created after change processing executed by the image processing apparatus according to the fourth embodiment of the present invention, which is an example when a movement speed of an object of interest is low;

FIG. 38B is a view showing an image example created after the change processing executed by the image processing apparatus according to the fourth embodiment of the present invention, which is an example when the movement speed of the object of interest is high;

FIG. 39 is a flowchart showing a processing example of an image processing apparatus according to a fifth embodiment of the present invention;

FIG. 40A is a view showing an image example created after adding an effect executed by the image processing apparatus according to the fifth embodiment of the present invention, which is an example when an object of interest is moving at a speed that is higher than a predetermined speed;

FIG. 40B is a view showing an image example created after adding an effect executed by the image processing apparatus according to the fifth embodiment of the present invention, which is an example when an object of interest is moving at a speed that is lower than or equal to the predetermined speed;

FIG. 41A is a view showing an image example created after adding an effect executed by an image processing apparatus according to a first modification of the fifth embodiment of the present invention, which is an example when a movement speed of an object of interest is high;

FIG. 41B is a view showing an image example created after adding an effect executed by the image processing apparatus according to the first modification of the fifth embodiment of the present invention, which is a first example when the movement speed of the object of interest is low;

FIG. 41C is a view showing an image example created after adding an effect executed by the image processing apparatus according to the first modification of the fifth embodiment of the present invention, which is a second example when the movement speed of the object of interest is low;

FIG. 42 is a view showing an image example after adding an effect created by an image processing apparatus according to a second modification of the second embodiment of the present invention;

FIG. 43 is a view showing another image example after adding an effect created by an image processing apparatus according to a second modification of the second embodiment of the present invention;

FIG. 47 is a view showing an image example after change processing created by the image processing apparatus according to the seventh embodiment of the present invention;

FIG. 48 is a view showing another image example after change processing created by the image processing apparatus according to the seventh embodiment of the present invention;

FIG. 51 is a flowchart showing a processing example of an image processing apparatus according to a ninth embodiment of the present invention;

FIG. 54 is a view showing an image example after change processing created by the image processing apparatus according to the 10th embodiment of the present invention;

FIG. 59 is a view showing an image example after deformation processing created by the image processing apparatus according to the 12th embodiment of the present invention;

FIG. 60 is a view showing an image example created by an image processing apparatus when the 10th embodiment and the 12th embodiment according to the present invention are combined with each other, which is an example that change processing of filling a change region with a black color is also executed;

FIG. 61 is a view showing an image example created by the image processing apparatus when the 10th embodiment and the 12th embodiment according to the present invention are combined with each other, which is an example that change processing of changing luminance of the change region is also executed;

FIG. 62 is a view showing an image example created by the image processing apparatus when the 10th embodiment and the 12th embodiment according to the present invention are combined with each other, which is an example that change processing of changing luminance of the change region is also executed;

FIG. 63 is a view showing an image example created by the image processing apparatus when the 10th embodiment and the 12th embodiment according to the present invention are combined with each other, which is an example that change processing of changing resolution of the change region is also executed;

FIG. 64 is a view showing an image example created by the image processing apparatus when the 10th embodiment and the 12th embodiment according to the present invention are combined with each other, which is an example that change processing of changing sharpness of the change region is also executed;

FIG. 68 is a block diagram showing another configuration example of a digital camera as an imaging apparatus including an image processing apparatus according to a 13th embodiment of the present invention;

FIG. 70 is a block diagram showing a configuration example of a digital camera as an imaging apparatus including an image processing apparatus according to a 14th embodiment of the present invention;

FIG. 72 is a view showing an image example after change processing created by the image processing apparatus according to the 14th embodiment of the present invention;

FIG. 74 is a block diagram showing a configuration example of a endoscope as an imaging apparatus including an image processing apparatus according to a 15th embodiment of the present invention;

FIG. 75 is a block diagram showing another configuration example of a endoscope as an imaging apparatus including an image processing apparatus according to a 15th embodiment of the present invention;

FIG. 76 is a block diagram showing yet another configuration example of a endoscope as an imaging apparatus including an image processing apparatus according to a 15th embodiment of the present invention;

FIG. 78 is a block diagram showing another configuration example of a microscope as an imaging apparatus including an image processing apparatus according to a 15th embodiment of the present invention; and FIG. 79 is a block diagram showing yet another configuration example of a microscope as an imaging apparatus including an image processing apparatus according to a 15th embodiment of the present invention.

DETAILED DESCRIPTION OF THE INVENTION

First Embodiment

A first embodiment according to the present invention will be first described with reference to the drawings. In this embodiment, an image processing apparatus according to the present invention is applied to a digital camera.

Figure 1:
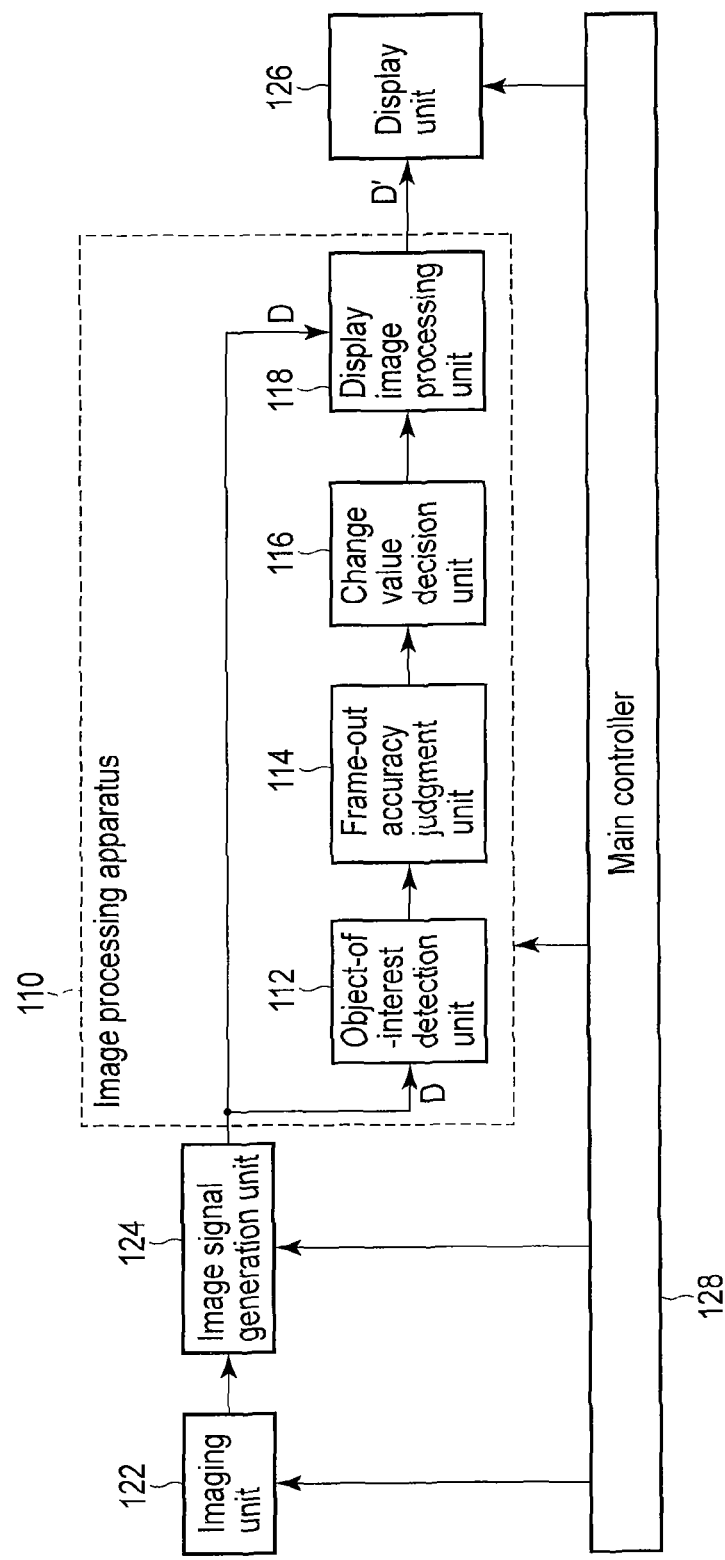
FIG. 1 is a block diagram showing a configuration example of a digital camera as an imaging apparatus including an image processing apparatus according to a first embodiment of the present invention.

FIG. 1 shows a configuration of a digital camera as an imaging apparatus including an image processing apparatus according to this embodiment. As shown in the drawing, this digital camera includes an image processing apparatus 110 according to this embodiment. The image processing apparatus 110 has an object-of-interest detection unit 112, a frame-out accuracy judgment unit 114, a change value decision unit 116, and a display image processing unit 118. Further, this digital camera includes an imaging unit 122, an image signal generation unit 124, a display unit 126, and a main controller 128. It is to be noted that, although not shown in particular, this digital camera naturally includes an operation unit, a recording unit, and others equal to those in a digital camera.

The imaging unit 122 converts a subject image formed by, e.g., a non-illustrated lens into an electrical signal based on photoelectric conversion and performs digital conversion with respect to this electrical signal to create raw data. The imaging unit 122 outputs the created raw data to the image signal generation unit 124. The image signal generation unit 124 executes processing, e.g., full-colorization, color balance adjustment, gradation adjustment, noise removal, edge enhancement, amplification, and others to generate an image signal (image data D).

The image data D created by the image signal generation unit 124 is input to the image processing apparatus 110. The object-of-interest detection unit 112 in the image processing apparatus 110 specifies a position of an object of interest in an image represented by the image data D. Here, the object-of-interest detection unit 112 can specify a position of the object of interest using, e.g., a known template matching technology. For example, this unit can recognize a face or a person and specify a position of the face or the person which is the object of interest. Further, it can extract a contour in an image and obtains its motion vector to trace a position of the object of interest. The object-of-interest detection unit 112 outputs the specified position of the object of interest to the frame-out accuracy judgment unit 114.

The position of the object of interest specified by the object-of-interest detection unit 112 is input to the frame-out accuracy judgment unit 114. The frame-out accuracy judgment unit 114 calculates an accuracy and a frame-out direction related to the occurrence of frame-out of the object of interest from an image range based on information of the position of the object of interest input from the object-of-interest detection unit 112, the image range corresponding to, e.g., an imaging range where the imaging unit 122 performs imaging and also a region of an image displayed in the display unit 126. The frame-out accuracy judgment unit 114 outputs the calculated accuracy and direction that the frame-out of the object of interest from the image range occurs to the change value decision unit 116.

The change value decision unit 116 receives from the frame-out accuracy judgment unit 114 the accuracy and the direction related to the occurrence of frame-out of the object of interest from the image range. The change value decision unit 116 decides a processing region which is a region that is changed in a display image and a change made to the processing region based on the accuracy and the direction related to the occurrence of frame-out of the object of interest from the image range input from the frame-out accuracy judgment unit 114. The change value decision unit 116 outputs the decided processing region and change applied to the processing region to the display image processing unit 118.

The display image processing unit 118 receives the processing region and the change applied to the processing region input from the change value decision unit 116. Further, the display image processing unit 118 receives the image data D from the image signal generation unit 124. The display image processing unit 118 executes change processing with respect to the processing region to create changed image data D'. The display image processing unit 118 outputs the changed image data D' to the display unit 126.

The display unit 126 displays a live view display image in accordance with a video signal based on the changed image data D' output from the display image processing unit 118. The display unit 126 also displays various kinds of images, e.g., an indication concerning any other operation. The main controller 128 is connected to the respective units of this digital camera and controls the respective units.

As described above, the object-of-interest detection unit 112 functions as, e.g., a position-of-interest calculation unit, the frame-out accuracy judgment unit 114 functions as, e.g., a frame-out accuracy calculation unit, the change value decision unit 116 functions as, e.g., an alteration variable decision unit and a change processing decision unit, and the display image processing unit 118 functions as, e.g., an image alteration unit. Further, the imaging unit 122 and the image signal generation unit 124 function as, e.g., an imaging unit which performs imaging to generate an image signal that is input to the image processing apparatus, and the display unit 126 functions as, e.g., a display unit which displays a display image generated by the image processing apparatus. Furthermore, for example, the image data D functions as an image signal, and the changed image data D' functions as a display image.

An operation of this embodiment will now be described with reference to the drawings. An outline of the operation of this embodiment will be first explained. In this embodiment, the object of interest is a person. The center of gravity of this person in an image is determined as a position of the object of interest. Based on this position of the object of interest, the image processing apparatus 110 determines a possibility of frame-out of the object of interest from the image range displayed in the display unit 126. The image processing apparatus 110 determines the possibility that the frame-out of the object of interest occurs based on a distance between the center of the image range and the position of the object of interest. That is, in this embodiment, the image processing apparatus 110 determines the possibility of the frame-out increases as the center of gravity of the object of interest gets away from the center of the image range. Further, in this embodiment, the image processing apparatus 110 determines that the frame-out of the object of interest may possibility occur in a direction extending from the center of the image range toward the center of gravity of the object of interest. When it is determined that the frame-out of the person as the object of interest may highly possibly occur, the image processing apparatus 110 performs the change processing with respect to a display image. In this embodiment, as the change processing, change processing of filling the vicinity of a position symmetrical to a position of the object of interest with respect the center of the image range with a black color is performed.

Each operation will now be described. The imaging unit 122 converts a subject image formed by, e.g., a non-illustrated lens into an electrical signal based on photoelectric conversion and performs digital conversion with respect to this electrical signal to create raw data. The imaging unit 122 outputs the created raw data to the image signal generation unit 124. The image signal generation unit 124 carries out processing such as full-colorization, color balance adjustment, gradation adjustment, noise removal, edge enhancement, or amplification to generate an image signal (the image data D). The image signal generation unit 124 outputs the generated image data D to the image processing apparatus 110.

Figure 2:
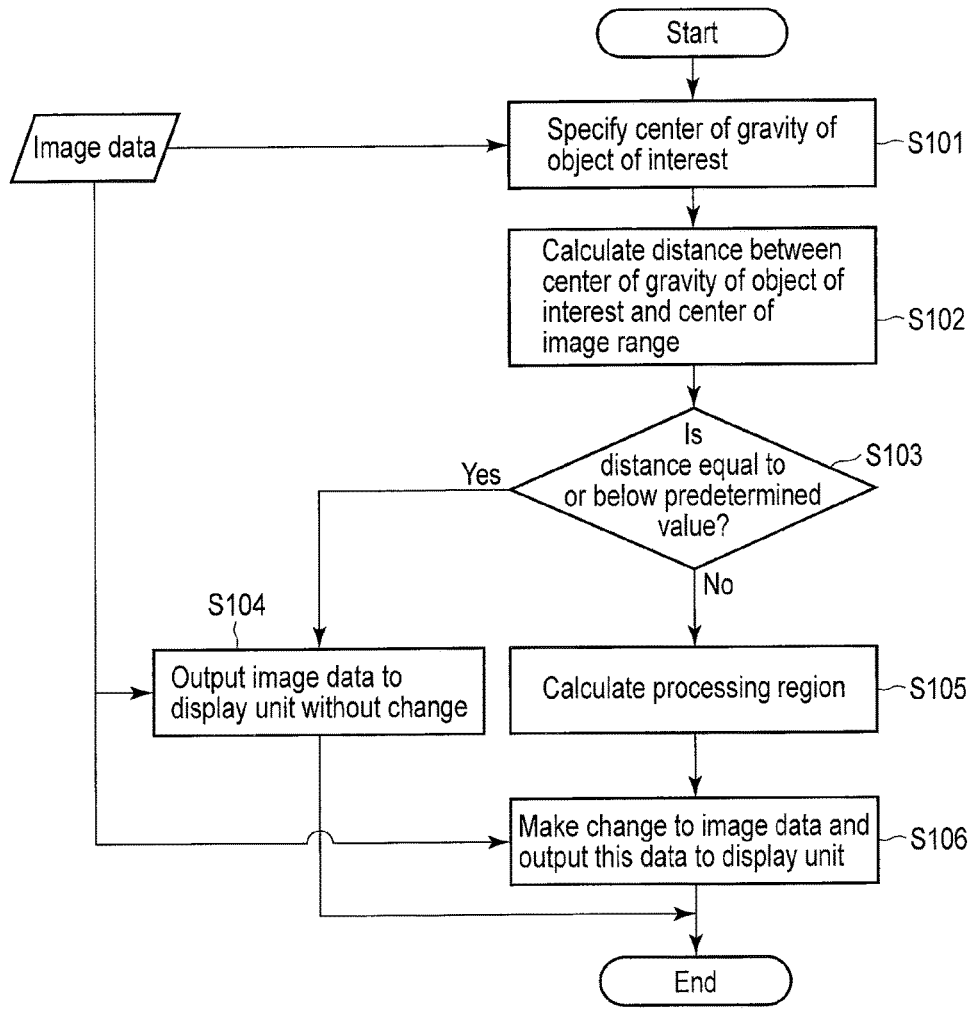
FIG. 2 is a flowchart showing a processing example of the image processing apparatus according to the first embodiment of the present invention.

The processing of the image processing apparatus 110 will now be described with reference to a flowchart depicted in FIG. 2. At a step S101, the object-of-interest detection unit 112 receives the image data D created by the image signal generation unit 124 and specifies a position of the object of interest which is a marked subject in an image represented by the image data D. In this embodiment, since the object of interest is a person, the object of interest detection unit 112 recognizes the person using a known template matching technique. The object of interest detection unit 112 specifies the center of gravity of the person in the image as the position of the object of interest. The object-of-interest detection unit 112 outputs the specified position of the object of interest to the frame-out accuracy judgment unit 114.

At the step S102, the frame-out accuracy judgment unit 114 calculates a distance between the center of the image range as a region of the image displayed in the display unit 126 and the center of gravity of the object of interest in the image represented by the image data D based on the position of the object of interest specified by the object-of-interest detection unit 112.

At a step S103, the frame-out accuracy judgment unit 114 judges whether the distance between the center of the image range and the center of gravity of the object of interest is equal to or below a predetermined value. When the distance between the center of the image range and the center of gravity of the object of interest is equal to or below the predetermined value, the frame-out accuracy judgment unit 114 determines that the frame-out does not occur and outputs a result of this judgment to the change value decision unit 116. At a step S104, the change value decision unit 116 decides not to execute the change processing with respect to the input image data D based on this result of the judgment. In response to this decision, the display image processing unit 118 directly outputs the image data D to the display unit 126 as the changed image data D'. As a result, the display unit 126 displays an image based on the changed image data D' which is the image data D.

On the other hand, at the step S103, when it is determined that the distance between the center of the image range and the center of gravity of the object of interest is not equal to or below the predetermined value, the frame-out accuracy judgment unit 114 outputs the distance between the center of the image range and the center of gravity of the object of interest and the position of the object of interest to the change value decision unit 116. At a step S105, the change value decision unit 116 decides a processing region which is a region where the display image is filled with a black color. Here, the processing region is determined as a region connected with the position symmetrical with the position of the object of interest with respect to the center of the display image. Furthermore, an area of the processing region is enlarged as the distance between the center of the image range and the center of gravity of the object of interest is increased. The change value decision unit 116 outputs the decided processing region and information indicating that the changing processing is to fill with the black color to the display image processing unit 118. As described above, for example, the distance between the center of the image range and the center of gravity of the object of interest functions as a frame-out accuracy representing an accuracy that the object of interest deviates from the image range.

At a step S106, the display image processing unit 118 executes the change processing with respect to the image in such a manner that the processing region calculated by the change value decision unit 116 in the display image is filled with the black color with respect to the image data D. The display image processing unit 118 outputs the changed image data D', which is data of the image after the change processing, to the display unit 126.

The display unit 126 displays the image after the change processing based on the changed image data D' input from the display image processing unit 118.

Figures 3, 4:
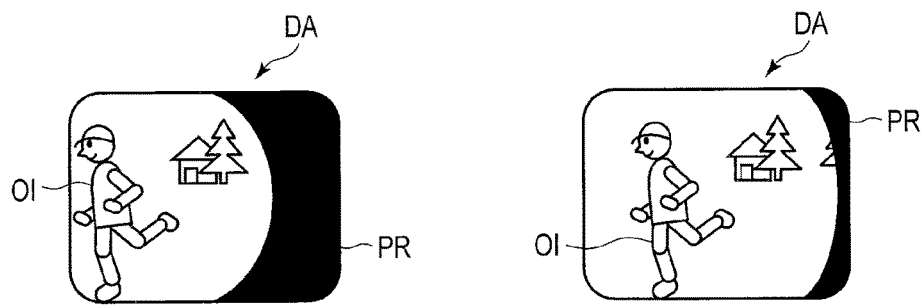
FIG. 3 is a view showing an image example after change processing executed by the image processing apparatus according to the first embodiment of the present invention.
FIG. 4 is a view showing an image example after the change processing executed by the image processing apparatus according to the first embodiment of the present invention, which is also a view for explaining that the change processing performed with respect to an image differs depending on a position of an object of interest.

FIG. 3 shows an image example after the change processing. In an image shown in FIG. 3, a person as an object of interest OI is biased to the left end of a display area DA. A distance between the object of interest OI and the center of the display area DA, i.e., the image range is greater than a predetermined value. At this time, a processing region PR associated with the distance between the object of interest OI and the center of the display image is set on the right side of the display area DA, which is a position symmetrical to the object of interest OI with respect to the center of the image range, and change of filling the processing region PR with a black color is carried out. This processing region PR is set to be enlarged as the distance between the center of the image range and the center of gravity of the object of interest OI is increased. Therefore, when the object of interest OI is close to the center of the image range as compared with the example shown in FIG. 3, the processing region PR is narrowed as shown in, e.g., FIG. 4.

For example, when a user again aims the digital camera in such a manner that the object of interest OI can be placed at the center of the display screen, the distance between the object of interest OI and the center of the display image is equal to or below the predetermined value. As a result, the display image processing unit 118 outputs the input image data to the display unit 126 without performing the change processing on this data at the step S104. At this time, the display unit 126 displays such an image having no portion filled with the black color as shown in FIG. 5, for example.

A situation in which the user holds the digital camera and confirms framing while observing the display unit 126 will now be considered. As described above, according to this embodiment, when the object of interest, e.g., a person is biased to an end of the display area, the display unit 126 displays an image in which a side of the display area opposed to the object of interest is changed to the black color. The user who observes the image having a portion changed to the black color in this manner pans the digital camera toward the object of interest side to eliminate the portion changed to the black color. As a result, the image displayed in the display unit 126 enters a state that is not subjected to the change processing.

As described above, according to this embodiment, the digital camera having the image processing apparatus 110 can guide the user in such a manner that the object of interest can be always placed within the display area. At this time, since a display image obtained by performing the change processing on the acquired image displayed in the display unit 126 shows a direction that the digital camera is aimed in, the user does not have to set a viewpoint to other positions than the display unit 126. Further, the image displayed in the display unit 126 is not complicated. That is, the user can take a picture while observing the display unit. The display image displayed here represents a result obtained by making a prediction of whether frame-out of the object of interest occurs. Therefore, according to this embodiment, the frame-out of the object of interest can be avoided.

It is to be noted that a state in which the overall object of interest is placed within the display image has been described in this embodiment, but the object of interest OI does not have to be placed within the display area DA as shown in, e.g., FIG. 6. That is, when the object-of-interest detection unit 112 can specify a position of the object of interest even if the position is present outside the image range displayed in the display unit 126, the image processing apparatus 110 can execute the same processing in accordance with the position of the object of interest outside the display image. A situation in which the range of an image acquired by the imaging unit 122 is wider than a region displayed in the display unit 126 corresponds to this case. That is, even if the entire object of interest is not present within the display image range but the entire object of interest falls within the range of an image acquired by the imaging unit 122, the object-of-interest detection unit 112 can specify the position of the object of interest. Furthermore, a situation in which the object-of-interest detection unit 112 can trace the object of interest and specify a position of this object if a part of the object of interest is partially included in the image data D corresponds to this case.

Moreover, when the object of interest is out of the image range as described above, the position of the object of interest OI may be indicated by a shape of the processing region PR as shown in FIG. 7.

The object-of-interest detection unit 112 is configured to receive the image signal (the image data D) processed by the image signal generation unit 124 in the description of this embodiment, but the raw data output from the imaging unit 122 may be directly input to the object-of-interest detection unit 112 as the image signal. In this case, the object-of-interest detection unit 112 may be configured to specify a position of the object of interest based on the raw data.

Further, in this embodiment, although the center of the image range is utilized as a reference for obtaining a positional relationship between the image range and the position of the object of interest, the present invention is not restricted to the center, and any other portion may be used as a reference. For example, a square including the center of the image range may be defined, and each side of the square may be determined as a reference to calculate a distance from a object of interest. Further, a circle including the center of the image range is defined, and a distance from the object of interest may be calculated based on a circumference of the circle. Furthermore, although the position of the object of interest is determined as the center of gravity of the object of interest, the present invention is not restricted thereto. For example, when the object of interest is a person, a position of a face may be determined as the position of the object of interest, a rim of the person in an image may be determined as the position of the object, or any other reference may be provided as the position. Moreover, the object of interest is not restricted to a person, and it may be understandably an animal, a vehicle, or any other matter. Additionally, although the method of detecting the object of interest by the object-of-interest detection unit 112 is exemplified by the template matching in the description of this embodiment, any method can be adopted as long as it is a method that can extract the object of interest from an image.

Further, the color that fills the processing region is the black color in this embodiment, but it may be a white color or any other color as a matter of course. Furthermore, the predetermined value used for the judgment at the step S103 may be set to 0, and a threshold value may not be provided for the judgment on whether the change processing is to be executed.

First Modification of First Embodiment

A first modification of the first embodiment according to the present invention will now be described. Here, a difference of this modification from the first embodiment will be explained, and like reference numerals denote like parts to omit description thereof. In the first embodiment, as shown in FIG. 3, the change of an image made by the display image processing unit 118 at the step S106 is a change of filling the processing region calculated by the change value decision unit 116 with the black color. On the other hand, in this modification, any other change is made to the inside of the processing region.

Figure 8:
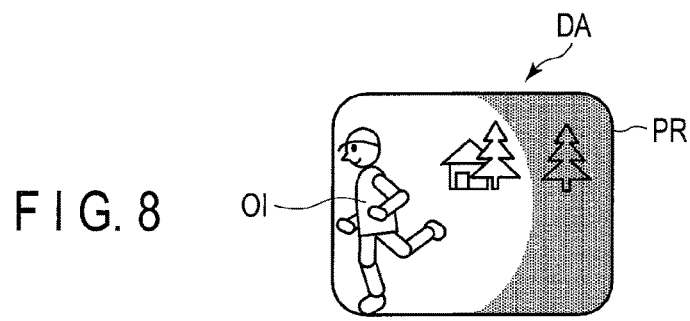
FIG. 8 is a view showing an image example after change processing executed by the image processing apparatus according to a first modification of the first embodiment of the present invention.
Figure 9:
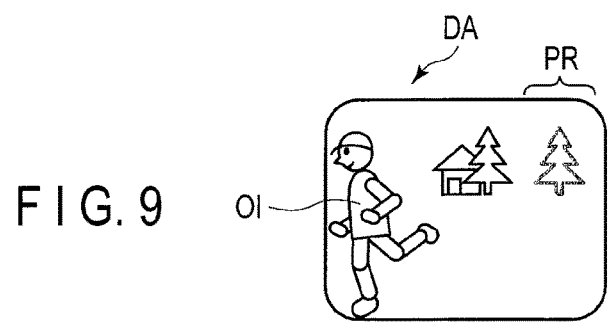
FIG. 9 is a view showing another image example after change processing executed by the image processing apparatus according to the first modification of the first embodiment of the present invention.
Figure 10:
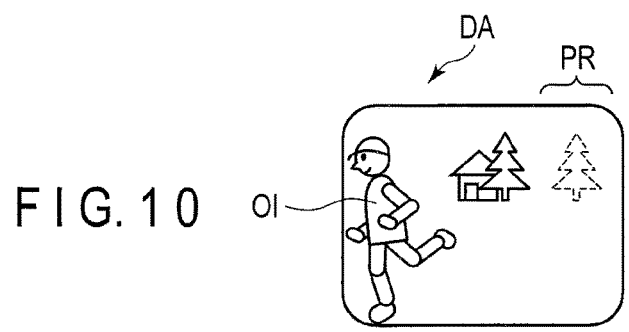
FIG. 10 is a view showing yet another image example after change processing executed by the image processing apparatus according to the first modification of the first embodiment of the present invention.
Figure 11:
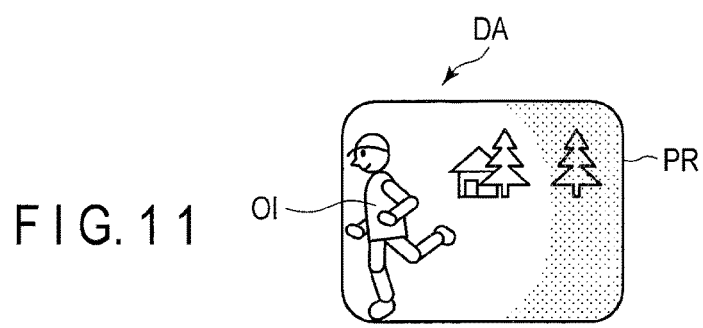
FIG. 11 is a view showing another image example after change processing executed by the image processing apparatus according to the first modification of the first embodiment of the present invention.

As an example of this modification, as shown in FIG. 8, luminance of a processing region PR in a display image is decreased by a predetermined amount. As another example of this modification, as shown in FIG. 9, resolution of the processing region PR is decreased by a predetermined amount. To decrease the resolution, for example, values of four pixels adjacent to each other may be averaged, and the obtained value may be assigned to the pixel values of these four pixels. Moreover, as still another example of this modification, as shown in FIG. 10, sharpness of the processing region PR is decreased by a predetermined amount. To decrease the sharpness, for example, shading processing for changing an intensity of a low-pass filter can be executed. Additionally, as yet another example of this modification, as shown in FIG. 11, a contrast of the processing region PR is decreased by a predetermined amount. To decrease the contrast, for example, a difference between a high-luminance signal and a low-luminance signal can be decreased. Further, as a further example of this modification, chroma is decreased by a predetermined amount to realize display close to gray. Furthermore, as a still further example of this modification, a hue is changed by a predetermined amount.

As described above, various changes may be made to a display image; e.g., the decrease of luminance, the decrease of resolution, the decrease of sharpness, the decrease of contrast, the decrease of chroma, or the change of a hue. A type of change to be used may be decided in advance, or a type of change input from, e.g., a user may be used. Further, the change value decision unit 116 may decide a type of change based on predetermined judgment criteria.

In this modification, at the step S105, the change value decision unit 116 calculates a processing region like the first embodiment. The change value decision unit 116 outputs the calculated processing region to the display image processing unit 118. Furthermore, the change value decision unit 116 outputs information indicating that the change processing is filling with the black color in the first embodiment, but a type of change and a predetermined amount of change, e.g., a decrease amount of luminance are output to the display image processing unit 118 instead. At the step S106, the display image processing unit 118 executes the change processing with respect to a display image based on the processing region, the type of change, and the amount of change input from the change value decision unit 116. For example, at the step S106, the display image processing unit 118 executes processing of reducing luminance in the processing region by an amount of change. Any other processing other than the processing executed by the change value decision unit 116 at the step S105 and the processing performed by the display image processing unit 118 at the step S106 is equal to that in the first embodiment.

According to this modification, likewise, when the object of interest gets away from the center of the image range, the image in the display area is changed. As a result, a user who holds the digital camera and confirms framing while observing the display unit 126 pans the digital camera having the image processing apparatus 110 in a direction that the object of interest moves to the center of the display unit so that a portion having a changed image can be eliminated. Consequently, an image displayed in the display unit 126 enters a state that is not subjected to the change processing. As described above, according to this embodiment, the digital camera having the image processing apparatus 110 can guide the user so that the object of interest can be always placed within the display area.

It is to be noted that the luminance, the resolution, the sharpness, the contrast, the chroma, the hue, and others are examples of the change processing performed with respect to an image, and any other processing may be executed. Additionally, the luminance, the resolution, the sharpness, the contrast, and the chroma may be increased instead of being decreased. Further, a change of the luminance and the like in the processing region does not have to be uniform. For example, a gradation type change may be added to an image so that a degree of change differs depending on each position.

Furthermore, in regard to types of the change, one of the above-described types of changes alone does not have to be used, and two or more types may be combined. That is, the resolution may be decreased while decreasing the luminance in the processing region. In this manner, arbitrary two types selected from the luminance, the resolution, the sharpness, the contrast, the chroma, the hue, and others may be changed at the same time.

Second Modification of First Embodiment

A second modification of the first embodiment according to the present invention will now be described. Here, a difference of this modification from the first embodiment will be explained, and like reference numerals denote like parts to omit description thereof. In the first embodiment, when deciding a processing region where a display image is filled with the black color at the step S105, the change value decision unit 116 decides the processing region as a region associated with a position symmetrical to the object of interest with respect to the center of the display image. On the other hand, in this modification, the processing region is decided in such a manner that a distance from the object of interest becomes uniform.

In this modification, for example, as shown in FIG. 12A, FIG. 12B, and FIG. 12C, the change value decision unit 116 decides a processing region in such a manner that a distance from the center of gravity of a person who is the object of interest OI to an edge of the processing region PR becomes fixed as a predetermined distance dis_1. Operations other than that of deciding the processing region executed by the change value decision unit 116 at the step S105 are equal to those in the first embodiment.

This modification can obtain the same effects as those of the first embodiment and the first modification.

Further, this modification can be combined with the first modification of the first embodiment. That is, like this modification, at the step S105, in the processing region decided by the frame-out accuracy judgment unit 114 based on a distance from the object of interest, luminance may be decreased or increased, resolution may be decreased or increased, sharpness may be decreased or increased, contrast may be decreased or increased, chroma may be decreased or increased, a hue may be changed, or these changes may be combined like the first modification.

Third Modification of First Embodiment

A third modification of the first embodiment according to the present invention will now be described. Here, a difference of this modification from the first modification of the first embodiment will be explained, and like reference numerals denote like parts to omit description thereof. In the first modification of the first embodiment, at the step S105, the change value decision unit 116 calculates a processing region in accordance with a position of the object of interest with respect to the center of an image range. At the step S106, the display image processing unit 118 changes luminance, resolution, sharpness, contrast, chroma, or a hue in the processing region by a predetermined amount decided by the change value decision unit 116. On the other hand, in this embodiment, the change value decision unit 116 fixes an area of the processing region but varies a change amount of the luminance, the resolution, the sharpness, the contrast, the chroma, or the hue in the processing region in accordance with a position of the object of interest with respect to the center of the image range.

Figure 13:
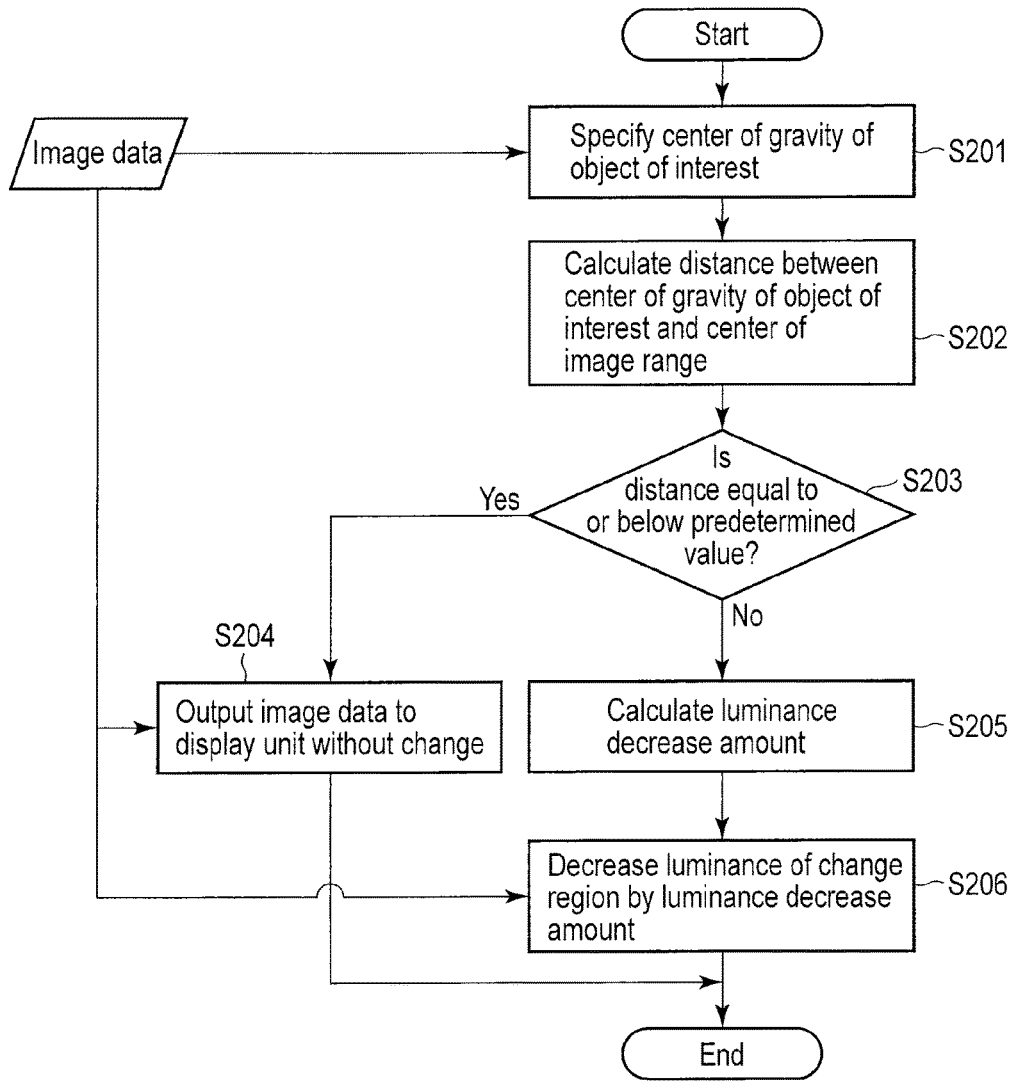
FIG. 13 is a flowchart showing a processing example of an image processing apparatus according to a third modification of the first embodiment of the present invention.

Here, an example of changing the luminance in the processing region will be explained. In this modification, an operation of the image processing apparatus 110 is as shown in a flowchart depicted in FIG. 13. Here, processing steps from a step S201 to a step S204 are equal to the processing steps from the step S101 to the step S104 in the first embodiment and its first modification described with reference to FIG. 2, respectively.

In this modification, when it is determined that a distance is not equal to or below a predetermined value at the step S203, the change value decision unit 116 calculates luminance decrease amount in accordance with a position of the object of interest with respect to the center of an image range at the step S205. For example, in this modification, the luminance decrease amount is raised as the distance from the center of the image range to the center of gravity of the object of interest is increased. The change value decision unit 116 outputs the calculated luminance decrease amount to the display image processing unit 118. The processing region is determined as a region associated with a position symmetrical to a position of the object of interest with respect to the center of a display image, and an area of this region is set to a predetermined value. The change value decision unit 116 also outputs the decided processing region to the display image processing unit 118.

At the step S206, the display image processing unit 118 executes processing of reducing luminance in the processing region input from the change value decision unit 116 in an image represented by image data D by the luminance decrease amount input from the change value decision unit 116. The display image processing unit 118 outputs change image data D' obtained by reducing the luminance in the processing region to the display unit 126.

Figure 14A:
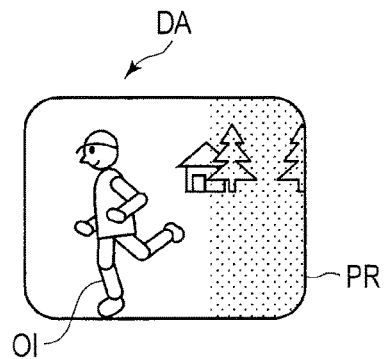
FIG. 14A is a view showing a first example of an image created after change processing executed by the image processing apparatus according the third modification of the first embodiment of the present invention when a position of an object of interest is close to the center of an image range.
Figure 14B:
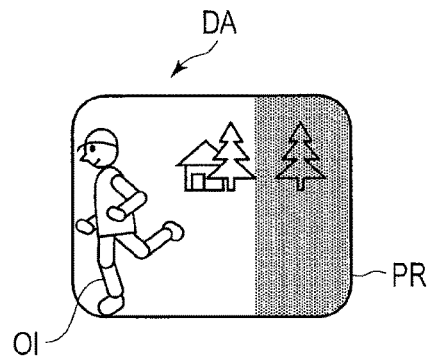
FIG. 14B is a view showing a second example of an image created after the change processing executed by the image processing apparatus according to the third modification of the first embodiment of the present invention when the position of the object of interest is far from the center of the image range.

Based on the above-described operation, the display unit 126 displays such an image as depicted in FIG. 14A or FIG. 14B, for example. That is, as shown in FIG. 14A, a decrease of the luminance in the processing region PR is small when the distance from object of interest OI to the center of a display area DA is small. On the other hand, as shown in FIG. 14B, the luminance in the processing region PR is greatly decreased and a dark image is displayed when the distance from the object of interest OI to the center of the display area is increased.

Although the example of reducing the luminance in the processing region has been described in this modification, the luminance may be increased. Furthermore, resolution, sharpness, contrast, chroma, or a hue may be likewise changed. Moreover, these elements may be combined.

According to this modification, when the object of interest is moved away from the center of the display area, an image in the processing region is changed and, for example, luminance of this image is lowered. As a result, a user who holds the digital camera and confirms framing while observing the display unit pans the digital camera in a direction along which the object of interest gets closer to the center of the display area in such a manner that a change in image can be weakened. When the object of interest gets closer to the center of the display area, the image displayed in the display unit 126 enters a state that is not subjected to the change processing. As described above, according to this embodiment, the digital camera having the image processing apparatus 110 can guide the user so that the object of interest can be always placed in the display area.

Second Embodiment

Figure 15:
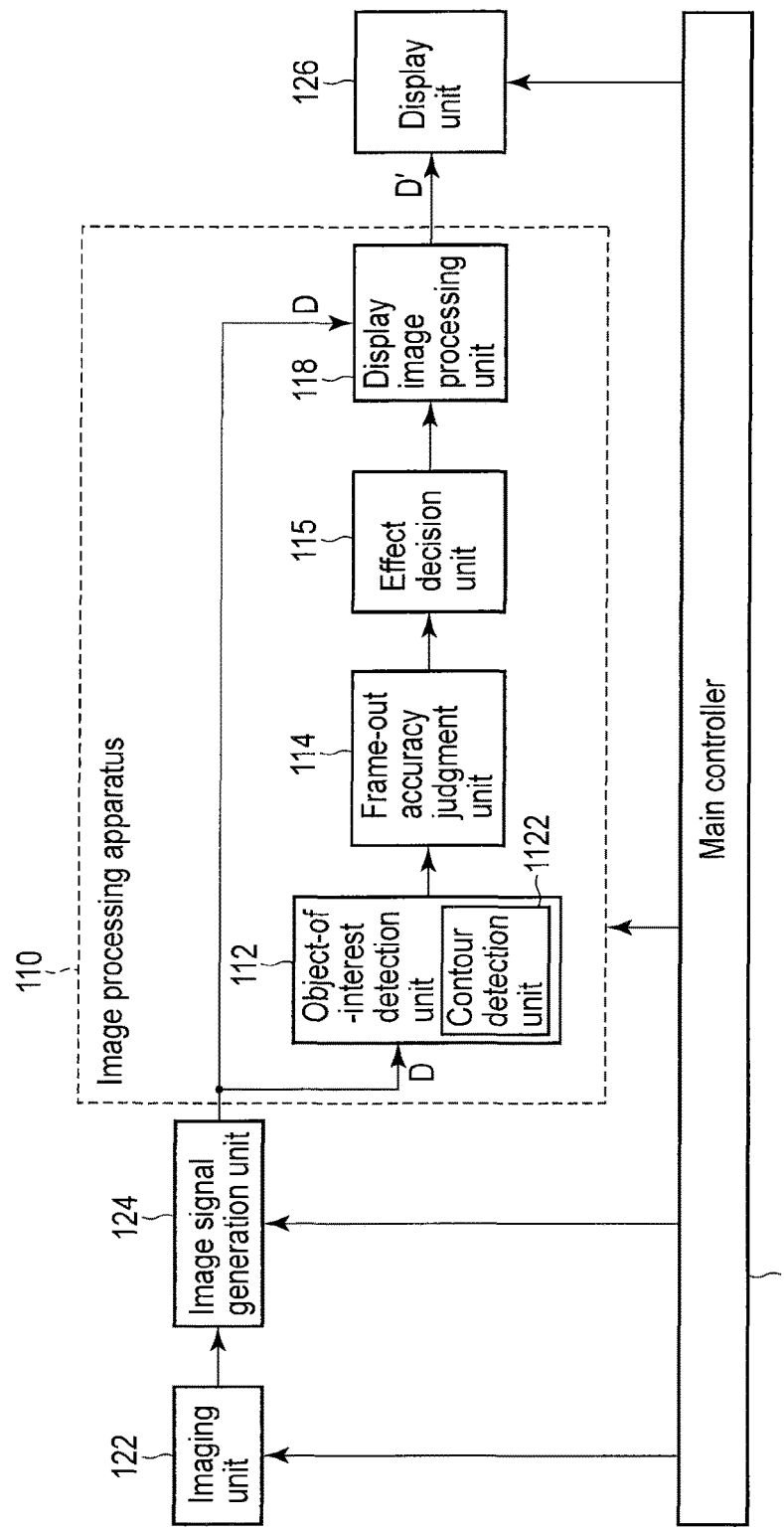
FIG. 15 is a block diagram showing a configuration example of a digital camera as an imaging apparatus including an image processing apparatus according to a second embodiment of the present invention.

A second embodiment according to the present invention will now be described. Here, a difference from the first embodiment will be explained, and like reference numerals denote like parts to omit description thereof. As shown in FIG. 15 illustrating a configuration, an effect decision unit 115 is provided to a digital camera according to this embodiment in place of the change value decision unit 116. Any other structures are equal to those in the first embodiment. This effect decision unit 115 functions as, e.g., a processing decision unit which is an alteration variable decision unit and decides information concerning an image process performed with respect to a region relating to a position of a subject of interest, i.e., an effect added to an image.

A configuration different from the first embodiment will now be described hereinafter. A position of an object of interest specified by an object-of-interest detection unit 112 is input to a frame-out accuracy judgment unit 114. The frame-out accuracy judgment unit 114 calculates an accuracy about occurrence of frame-out of the object of interest from an image range which is an imaging range where imaging unit 122 carries out imaging and a region of an image displayed by a display unit 126. The frame-out accuracy judgment unit 114 outputs the calculated accuracy that the frame-out of the object of interest occurs to the effect decision unit 115.

The effect decision unit 115 receives the accuracy related to the occurrence of frame-out of the object of interest from the image range from the frame-out accuracy judgment unit 114. The effect decision unit 115 decides an image process for allowing a user to recognize a possibility of the frame-out of the object of interest from the image range, i.e., an effect which is to be added to an image based on the accuracy related to the occurrence of frame-out of the object of interest from the image range input from the frame-out accuracy judgment unit 114. The effect decision unit 115 outputs information of the decided effect to a display image processing unit 118.

The display image processing unit 118 receives information of the decided effect from the effect decision unit 115. Further, the display image processing unit 118 receives image data D from an image signal generation unit 124. The display image processing unit 118 adds the effect to an image based on the image data D to create changed image data D'. The display image processing unit 118 outputs the changed image data D' to the display unit 126.

As described above, for example, the effect decision unit 115 functions as a process decision unit which sets a change region around a representative point of the object of interest in an image based on the image signal and decides image processing executed with respect to the changed region. Furthermore, the effect decision unit 115 functions as an alteration variable decision unit which decides a processing variable of alteration processing performed with respect to an image based on the image signal.

An outline of an operation of this embodiment will now be described. In this embodiment, like the first embodiment, for example, the object of interest is determined as a person, and the center of gravity of the person as the object of interest in an image is determined as a position of the object of interest. An image processing apparatus 110 judges a possibility that frame-out of the object of interest from an image range displayed in the display unit 126 occurs based on the position of the object of interest. When it is determined that the distance between the center of the image range and the position of the object of interest is large and the frame-out of the person as the object of interest highly possibly occurs, the image processing apparatus 110 adds an effect to a display image. In this embodiment, for example, the effect is an elliptic line surrounding the object of interest with a center of the gravity of the object of interest at the center. More specifically, in the image, luminance or chroma of a pixel associated with the elliptic line is changed or a pixel associated with the elliptic line is converted into a predetermined color to create changed image data D'. Further, a prepared template image corresponding to the elliptic line may be superimposed in such a manner that the center of this image can conform to the center of the gravity of the object of interest.

Each operation will now be described in detail. Like the first embodiment, the imaging unit 122 converts a subject image into an electrical signal by photoelectric conversion, performs digital conversion with respect to this electrical signal to create raw data, and outputs this data to the image signal generation unit 124. The image signal generation unit 124 generates an image signal (image data D) from the raw data input from the imaging unit 122 and outputs this image data D to the image processing apparatus 110.

Figure 16:
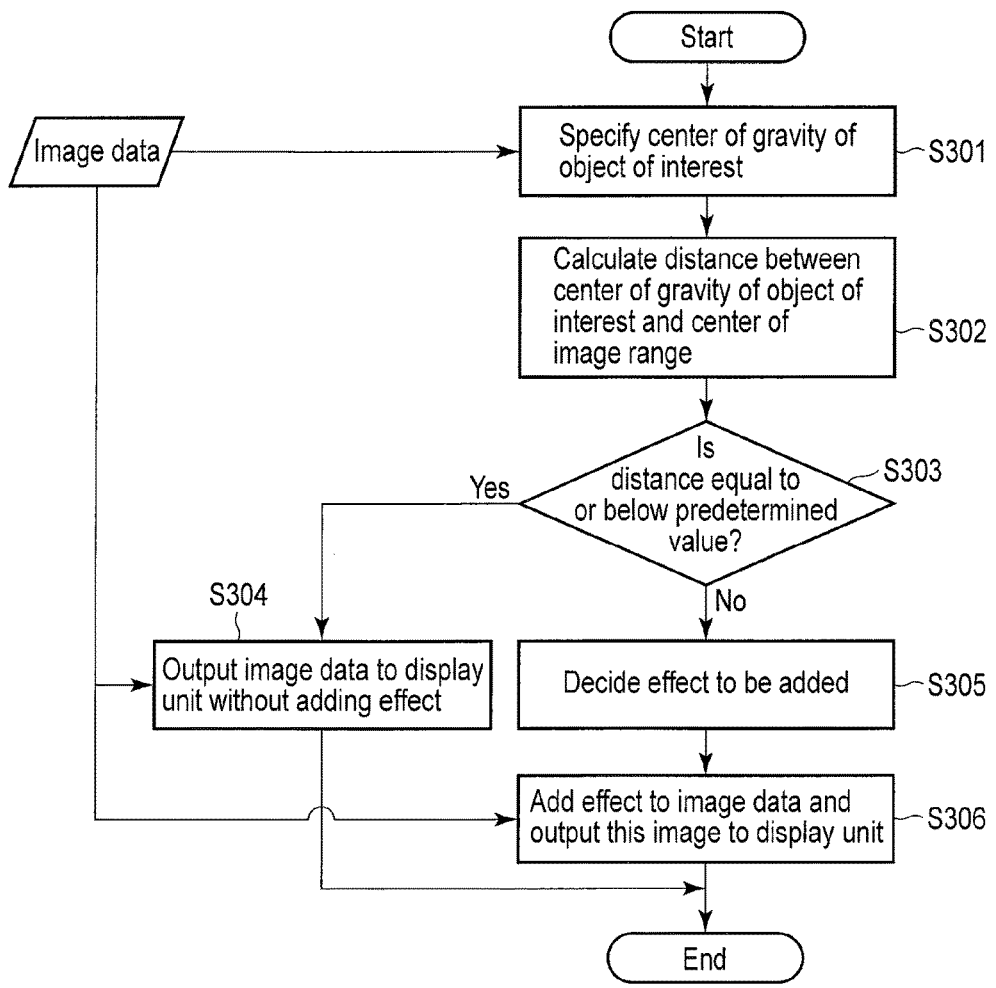
FIG. 16 is a flowchart showing a processing example of the image processing apparatus according to the second embodiment of the present invention.

Processing of the image processing apparatus 110 will now be described with reference to a flowchart depicted in FIG. 16. Here, processing of a step S301 to a step S303 is equal to the processing of the step S101 to the step S103 in the first embodiment explained with reference to FIG. 2.

When the frame-out accuracy judgment unit 114 determines that a distance between the center of an image range and the center of gravity of the object of interest is equal to or below a predetermined value at the step S303, the effect decision unit 115 decides not to add the effect to the input image data D at a step S304. In response to this decision, the display image processing unit 118 directly outputs the image data D to the display unit 126 as changed image data D'. As a result, the display unit 126 displays an image based on the changed image data D' which is the image data D.

When it is determined that the distance between the center of the image range and the center of gravity of the object of interest is not equal to or below the predetermined value at the step S303, the frame-out accuracy judgment unit 114 determines that the frame-out occurs and outputs information indicative of the frame-out to the effect decision unit 115. In response to this determination result, the effect decision unit 115 decides to add the effect to the display image at a step S305. Here, the effect is elliptic lines surrounding the object of interest with a center of the gravity of the object of interest at the center. The effect decision unit 115 outputs the decision to add the effect and information of the elliptic line which is the effect to be added to the display image processing unit 118. As described above, for example, the distance between the center of the image range and the center of gravity of the object of interest functions as a frame-out accuracy representing an accuracy that the object of interest deviates from the image range.

The display image processing unit 118 adds the effect to the input image data D based on the information input from the effect decision unit 115 to create the changed image data D' at a step S306. The display image processing unit 118 outputs the created changed image data D' to the display unit 126.

The display unit 126 displays an image with the effect based on the changed image data D' input from the display image processing unit 118.

Figures 17, 18:
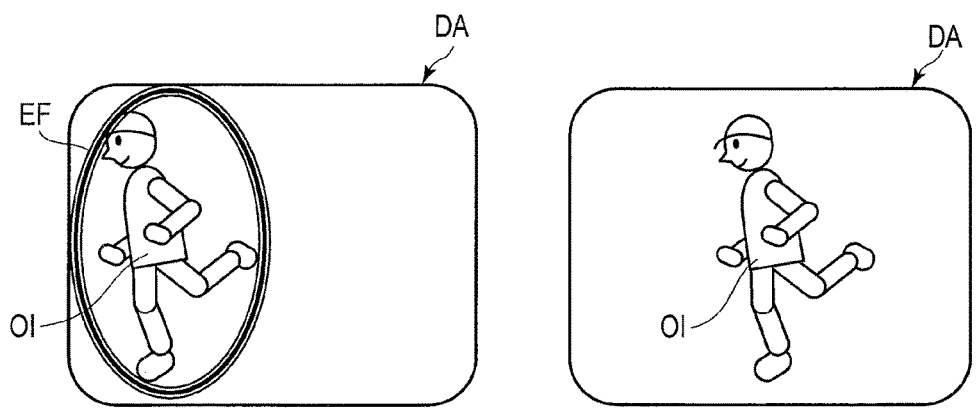
FIG. 17 is a view showing an image example after adding an effect created by the image processing apparatus according to the second embodiment of the present invention.
FIG. 18 is a view showing an image example created by the image processing apparatus according to the second embodiment of the present invention, which is also a view for explaining that the effect is not added to an image when an object of interest is present near the center.

FIG. 17 shows an image example having the effect added thereto. In the image depicted in FIG. 17, a person who is an object of image OI is biased to a left end of a display area DA of the display unit 126. A distance between the center of gravity of the object of interest OI and the center of the display area DA, i.e., an image range is larger than a predetermined value. At this time, effect EF which is elliptic lines surrounding the object of interest OI with a center of the gravity of the object of interest OI at the center is added. In the example shown in FIG. 17, the effect is three black elliptic lines, and the middle line is thicker than the other lines. That is, at the step S305, the effect decision unit 115 specifies pixels corresponding to the above-described elliptic lines as a change region and outputs information indicative of blacking the pixels to the display image processing unit 118. Although the elliptic lines are described as the black color, any other color can be adopted as a matter of course, or a so-called half-transparent effect for making a change while partially leaving information of the image data D may be displayed. In this manner, the effect decision unit 115 sets the pixels corresponding to the elliptic lines, i.e., the change region in the image and decides processing, e.g., changing a color to the black color with respect to this change region.

For example, when a user again points the digital camera in such a manner that the object of interest OI can be placed at the center of the display area DA, the distance between the center of gravity of the object of interest OI and the center of the display area DA becomes equal to or below the predetermined value. As a result, the display image processing unit 118 outputs the image data to the display unit 126 without adding the effect to the input image data at the step S304. At this time, for example, such an image having no effect as shown in FIG. 18 is displayed in the display area DA of the display unit 126.

A situation in which a user holds the digital camera and confirms framing while observing the display unit 126 will now be considered. As described above, according to this embodiment, when the object of interest, e.g., a person is biased to an end of the display area, the display unit 126 displays an ellipse around the object of interest. The user who is observing such an image in which the object of interest emphasized by the ellipse can pan the digital camera to the object-of-interest side. As a result, the image displayed in the display unit 126 enters a state in which the ellipse is not shown.

As described above, according to this embodiment, the digital camera having the image processing apparatus 110 can guide a user so that the object of interest can be always placed within the display area. At this time, the display image obtained by adding the effect to the captured image displayed in the display unit 126 indicates a possibility of occurrence of the frame-out, and hence the user does not have to aim a viewpoint at any position other than the display unit 126. For example, when various subjects are present within the image range and the user may not notice the object of interest, there can be obtained a result that the object of interest is emphasized by the effect and the user pays attention to the object of interest when the object of interest is placed at an end of the image range. It is to be noted that the display image displayed here shows a result obtained by predicting whether the frame-out of the object of interest occurs. Therefore, according to this embodiment, the digital camera having the image processing apparatus 110 can avoid the occurrence of the frame-out of the object of interest.

Figure 19:
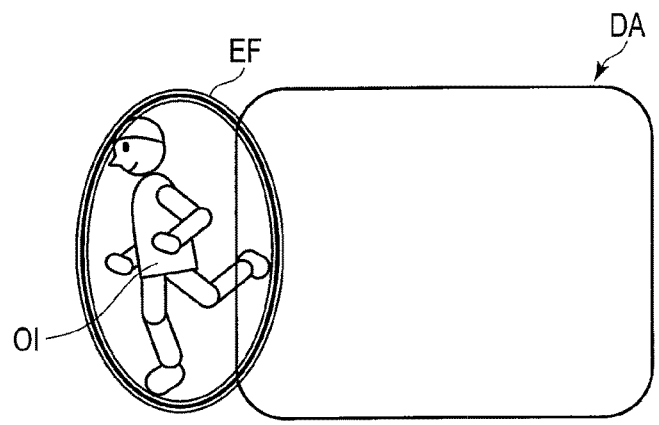
FIG. 19 is a view showing an image example after adding the effect created by the image processing apparatus according to the second embodiment of the present invention in another situation.

The image processing apparatus 110 according to this embodiment may be configured to function in a state that only a part of the object of interest OI is present in the display area DA, i.e., the image range like the situation described with reference to FIG. 6 and FIG. 7 in the first embodiment. In this state, for example, as shown in FIG. 19, a part of the effect EF alone is displayed in the display area DA. When the object-of-interest detection unit 112 can specify a position of the object of interest outside the image range, this image processing apparatus 110 can execute the same processing in accordance with the position of the object of interest outside the image range. Furthermore, like the first embodiment, raw data output from the imaging unit 122 may be directly input to the object-of-interest detection unit 112 as an image signal, and the object-of-interest detection unit 112 may be configured to specify a position of the object of interest based on the raw data. Moreover, in this embodiment, although the center of the image range is utilized as a reference for obtaining a positional relationship between the image range and the position of the object of interest, the present invention is not restricted to the center, and any other part may be determined as a reference. Additionally, in this embodiment, an accuracy of occurrence of the frame-out is determined based on the predetermined value or a lower value, i.e., binarization, but two or more threshold values may be provided and three or more conditions may be set to add different effects depending on each case.

First Modification of Second Embodiment

Figure 20A:
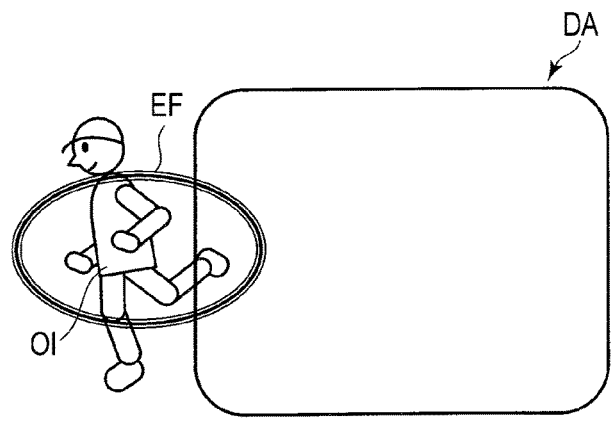
FIG. 20A is a view showing a first example of an image after adding an effect created by an image processing apparatus according to a first modification of the second embodiment of the present invention.
Figure 20B:
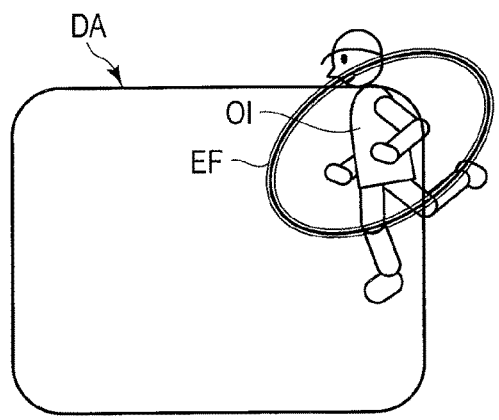
FIG. 20B is a view showing a second example of an image after adding an effect created by an image processing apparatus according to a first modification of the second embodiment of the present invention.

A first modification of the second embodiment according to the present invention will now be described. Here, a difference from the second embodiment will be described, and like reference numerals denote like parts to omit explanation thereof. In the second embodiment, the effect is added based on a distance between the center of gravity of the object of interest and the center of the image range. On the other hand, in this modification, the effect is added based on a direction of the center of gravity of the object of interest with respect to the center of the image range in addition to the distance between the center of gravity of the object of interest and the center of image range. For example, as an example of this modification, as shown in FIG. 20A and FIG. 20B, a long axis of an ellipse as the effect EF coincides with a line connecting the center of gravity of the object of interest OI and the center of an image range (a display area DA).

Since the major axis of the ellipse as the effect coincides with the line connecting the center of gravity of the object of interest with the center of the image range as described above, processing is executed as described below in this modification. When a distance between the center of the image range and the center of gravity of the object of interest is not equal to or below a predetermined value in the judgment at the step S303, the frame-out accuracy judgment unit 114 outputs a judgment result indicative of occurrence of the frame-out to the effect decision unit 115. The frame-out accuracy judgment unit 114 further outputs a position of the object of interest to the effect decision unit 115.

The effect decision unit 115 decides to add the effect to a display image at the step S305.

Furthermore, the effect decision unit 115 decides the ellipse which is the effect as follows. A major axis of the ellipse as the effect is conformed to a line connecting the object of interest to the center of the image range. At the step S305, the effect decision unit 115 outputs information concerning the thus decided effect to the display image processing unit 118.

At a step S306, the display image processing unit 118 adds the effect of the ellipse whose major axis is conformed to the line connecting the center of gravity of the object of interest to the center of the image range with respect to input image data D based on the information input from the effect decision unit 115. The display image processing unit 118 outputs changed image data D' which is data of an image having the effect added thereto to the display unit 126. Any other processing is the same as the processing according to the first embodiment.

According to this modification, likewise, when the object of interest is biased to an end of the display area DA, the display unit 126 displays the ellipse as the effect EF around the object of interest OI. Moreover, this ellipse indicates the center of the image range. Therefore, a user who is observing an image in which the object of interest is emphasized by such an ellipse can recognize a direction to which the object of interest deviates from the center of the image range. As a result, the user can pan the digital camera so that the object of interest can move to the center of the image range. As described above, according to this embodiment, the digital camera having the image processing apparatus 110 can guide the user so that the object of interest can be placed within the display area.

Second Modification of Second Embodiment

A second modification of the second embodiment according to the present invention will now be described. Here, a difference from the second embodiment will be described, and like reference numerals denote like parts to omit explanation thereof. In the second embodiment, the effect added to a display image is an ellipse. On the other hand, in this modification, an effect of a line associated with a shape of the object of interest is added. As an example of this modification, a line parallel to a contour line and/or a line along the contour line of the object of interest OI is shown as the effect EF around the object of interest as shown in FIG. 21.

To display the effect of the above-described line, the object-of-interest detection unit 112 has a contour extraction unit 1122 as shown in FIG. 15. This contour extraction unit 1122 extracts a contour of the object of interest in an image represented by image data D. The object-of-interest detection unit 112 may be configured to obtain a motion vector of the contour between frames based on a detected position of the object of interest or a time-series variation of the contour extracted by the contour extraction unit 1122, thereby tracing the position of the object of interest. In this manner, the contour extraction unit 1122 functions as a contour extraction unit that extracts the contour of the object of interest.

In this modification, the image processing apparatus 110 executes processing as follows. At the step S301, the object-of-interest detection unit 112 specifies a position of the object of interest in an image represented by the image data D. Additionally, the contour extraction unit 1122 in the object-of-interest detection unit 112 uses a technology concerning known edge extraction to extract a contour of the object of interest. The object-of-interest detection unit 112 outputs the specified position of the object of interest and the contour to the frame-out accuracy judgment unit 114.

When it is determined that a distance between the center of an image range and the center of gravity of the object of interest is not equal to or below a predetermined value at the step S303, the frame-out accuracy judgment unit 114 outputs a judgment result indicative of occurrence of the frame-out to the effect decision unit 115. Additionally, the frame-out accuracy judgment unit 114 outputs information of the contour of the object of interest to the effect decision unit 115. The effect decision unit 115 decides to add the effect to the display image at the step S305. Here, the effect is a plurality of lines parallel to contour lines and/or lines along the contour lines of objects of interest placed around the object of interest. The effect decision unit 115 outputs to the display image processing unit 118 a decision to add the effect and information of the plurality of lines as the effect to be added.

The display image processing unit 118 adds the effect input from the effect decision unit 115 to the input image data D at the step S306. The display image processing unit 118 outputs to the display unit 126 changed image data D' as data of an image having the effect added thereto. Any other processing is the same as the processing according to the first embodiment.

According to this modification, likewise, when the object of interest is biased to an end of the display area, the display unit 126 displays lines parallel to the contour line and/or lines along the contour line around the object of interest. Therefore, a user who is observing an image in which the object of interest is emphasized in this manner can pan the digital camera so that the object of interest can move to the center of the image range. According to this embodiment, the digital camera having the image processing apparatus 110 can guide a user so that the object of interest can be always placed within the display area.

It is to be noted that the effect that is the line parallel to the contour line and/or the line along the contour line of the object of interest displayed around the object of interest may change with time. FIG. 22 schematically shows an example where the effect EF around the object of interest OI periodically changes its intensity. Such a temporal change of the effect is not restricted to this modification, and it can be likewise adopted in the effect of an ellipse or any other shape. When the effect is temporally changed in this manner, it is possible to obtain a result that a position of the object of interest is further emphasized and a user can readily notice.

Third Modification of Second Embodiment

Figure 23A:
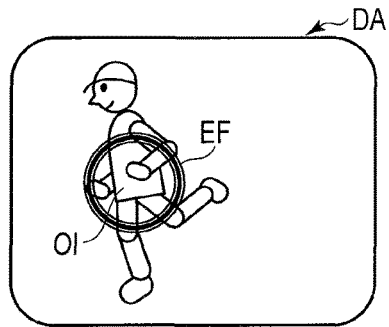
FIG. 23A is a view showing a first example of an image after adding an effect created by an image processing apparatus according a third modification of the second embodiment of the present invention when a position of an object of interest is close to the center of an image range.
Figure 23B:
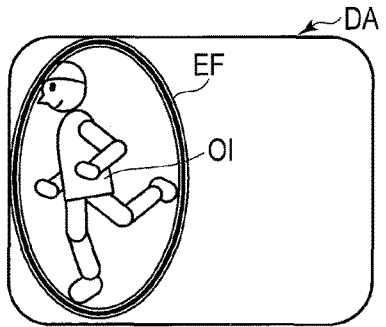
FIG. 23B is a view showing a first example of an image after adding an effect created by the image processing apparatus according the third modification of the second embodiment of the present invention when the position of the object of interest is far from the center of the image range.

A third modification of the second embodiment according to the present invention will now be described. Here, a difference from the second embodiment will be described, and like reference numerals denote like parts to omit explanation thereof. In the second embodiment, the effect added to a display image is the same irrespective of a position of an object of interest when the position of the object of interest is apart from the center of an image range beyond a predetermined value. On the other hand, in this modification, an area of an ellipse as the effect changes in accordance with a distance between a position of the object of interest and the center of the image range. FIG. 23A and FIG. 23B show an example of an image displayed in this modification. An area of an ellipse as the effect EF is set to be relatively small when the position of the object of interest OI is relatively close to the center of the image range (a display area DA) as shown in FIG. 23A, and the area of the ellipse as the effect EF is set to be relatively large when the position of the object of interest OI is relatively far from the center of the image range as shown in FIG. 23B. In other words, an area of a portion surrounded by the ellipse as the effect EF is small in FIG. 23A and large in FIG. 23B.

To display the above-described effect whose area changes in accordance with a distance between a position of the object of interest and the center of the image range, the following processing is executed in this modification. When it is determined that a distance between the center of gravity of the object of interest and the center of the image range is not equal to or below a predetermined value at the step S303, the frame-out accuracy judgment unit 114 outputs to the effect decision unit 115 a judgment result indicative of occurrence of the frame-out and the distance between the center of gravity of the object of interest and the center of the image range.

At the step S305, the effect decision unit 115 decides to add the effect to a display image. Here, the effect is an elliptic line surrounding the object of interest with a center of the gravity of the object of interest at the center. An area of a portion surrounded by the ellipse becomes large as a distance between the center of the image range and the center of gravity of the object of interest increases. The effect decision unit 115 outputs to the display image processing unit 118 a decision to add the effect and information of the elliptic line as the effect to be added.

The display image processing unit 118 adds the effect input from the effect decision unit 115 with respect to input image data D at the step S306. The display image processing unit 118 outputs changed image data D' which is data of an image having the effect added thereto to the display unit 126. Any other processing is the same as the processing according to the first embodiment.

According to this modification, likewise, when the object of interest is biased to an end of a display area, the display unit 126 displays the ellipse around the object of interest. A user who is observing such an image in which the object of interest is emphasized by the ellipse can pan the digital camera so that the object of interest can move to the center of the image range. Here, an area of a portion surrounded by this ellipse represents a distance from the center of the image range to the center of gravity of the object of interest. A probability that the frame-out of the object of interest occurs becomes higher as the distance from the center of the image range to the center of gravity of the object of interest increases. Therefore, the user can intuitively know how high the probability that the frame-out of the object of interest occurs is from an area of the portion surrounded by the ellipse, i.e., how far the center of gravity of the object of interest is distanced from the center of the image range. As described above, according to this modification, the digital camera having the image processing apparatus 110 can guide the user so that the object of interest can be always placed within the display range. It is to be noted that a size of the ellipse may be linearly changed in accordance with a distance, gradually changed in accordance with each predetermined distance, or continuously and nonlinearly changed.

Figure 24A:
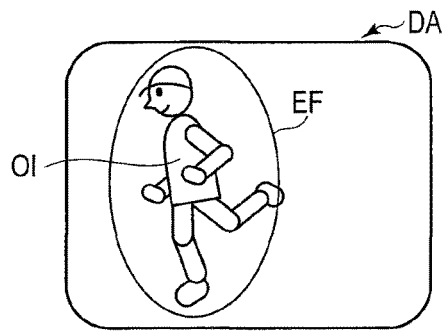
FIG. 24A is a view showing a second example of an image after adding an effect created by the image processing apparatus according the third modification of the second embodiment of the present invention when a position of an object of interest is close to the center of an image range.
Figure 24B:
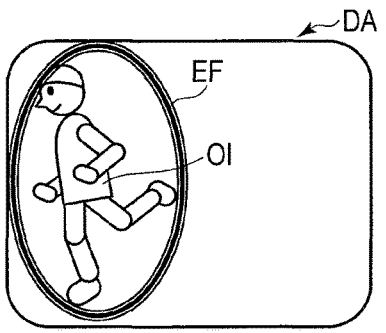
FIG. 24B is a view showing a second example of an image after adding an effect created by the image processing apparatus according the third modification of the second embodiment of the present invention when the position of the object of interest is far from the center of the image range.

Further, a pattern of the effect may be changed instead of changing an area of the portion surrounded by the ellipse of the effect in accordance with a distance between a position of the object of interest and the center of the image range. For example, a thickness or a type of the line of the effect may be changed. In this example, the line of the ellipse of the effect EF is relatively thin when a position of the object of interest OI is relatively close to the center of the image range as shown in FIG. 24A, and the line of the ellipse of the effect EF is relatively thick when a position of the object of interest OI is relatively far from the center of the image range as shown in FIG. 24B. In other words, pixels corresponding to the elliptic line, i.e., an area of a change region where an image is changed is small in FIG. 24A and large in FIG. 24B.

Further, a color or density of the line may be changed in place of changing, e.g., a thickness or a type of the elliptic line. That is, the effect decision unit 115 decides, e.g., pixels corresponding to a predetermined elliptic line, and decides to execute a process to change the pixels to a thin color when a position of the object of interest is relatively close to the center of the image range, or decides to execute processing to change the pixels to a dense color when the position of the object of interest is relatively far from the image range. In other words, the effect decision unit 115 changes a degree of processing in accordance with a distance between a position of the object of interest and the center of the image range. Furthermore, both a thickness of the line and a color or density of the line may be changed in accordance with a distance between a position of the object of interest and the center of the image range. The thickness, the type, the color and the density of the line described above will be referred to as a pattern of the line.

Figure 25A:
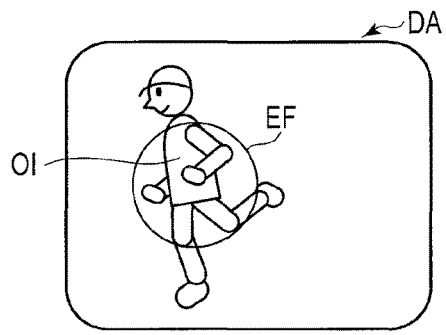
FIG. 25A is a view showing a third example of an image after adding an effect created by the image processing apparatus according the third modification of the second embodiment of the present invention when a position of an object of interest is close to the center of an image range.
Figure 25B:
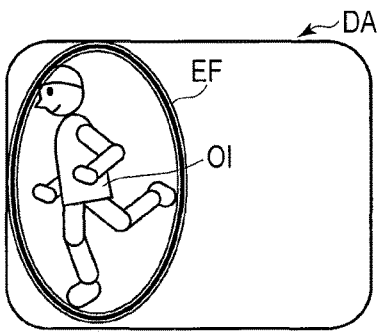
FIG. 25B is a view showing a third example of an image after adding an effect created by the image processing apparatus according the third modification of the second embodiment of the present invention when the position of the object of interest is far from the center of the image range.

Like an example depicted in FIG. 25A and FIG. 25B, both an area of a portion surrounded by the ellipse of the effect EF and a pattern of the line may be changed in accordance with a distance between a position of the object of interest OI and the center of the image range. As shown in FIG. 25A, when a position of the object of interest OI is relatively close to the center of the image range, an area of the portion surrounded by the ellipse of the effect EF is relatively small, and a thickness and a type of the line area are relatively small. As shown in FIG. 25B, when a position of the object of interest OI is relatively far from the center of the image range, an area of the portion surrounded by the ellipse of the effect EF is relatively large, and a thickness and a type of the line are relatively large. Since the effect EF is set in this manner, an impact of the effect is small when the object of interest OI is placed near the center of the image range and the camera does not have to be panned much, and hence the object of interest OI can be easily seen, and a user can concentrate on a photo opportunity.

It is to be noted that a predetermined value used in the judgment at the step S303 may be set to 0, and a threshold value is not provided for the judgment on whether the change processing is to be executed. That is, an area of a portion surrounded by the effect or a pattern of the line may be changed.

This modification can be combined with the first modification. That is, the effect indicating a distance between the center of the image range and the center of gravity of the object of interest may be displayed while indicating a position of the object of interest with respect to the image range. Further, this modification can be combined with the second modification. That is, a pattern such as an area of a portion surrounded by a line parallel to a contour line and/or a line along the contour line of the object of interest or a thickness of this line may be changed.

Furthermore, this embodiment and its various modifications can be combined with the first embodiment to be used. That is, like the first embodiment, the change processing may be carried out and the effect may be added to a part of an image. In this case, the change value decision unit 116 according to the first embodiment or the effect decision unit 115 according to this embodiment has functions of both the change value decision unit 116 and the effect decision unit 115, and the display image processing unit 118 performs a change of an image according to the first embodiment and addition of the effect according to the second embodiment with respect to image data D. As a result, for example, such an image as shown in FIG. 26 is created.

Third Embodiment

A third embodiment according to the present invention will now be described. Here, a difference from the first embodiment will be described, and like reference numerals denote like parts to omit explanation thereof. As shown in FIG. 27, in a digital camera according to this embodiment, a deformation parameter decision unit 117 is provided in place of the change value decision unit 116 in the first embodiment. Any other structure is equal to that in the first embodiment.

A configuration different from the first embodiment will now be described hereinafter. A position of an object of interest specified by an object-of-interest detection unit 112 is input to a frame-out accuracy judgment unit 114. The frame-out accuracy judgment unit 114 calculates an accuracy related to the occurrence of frame-out of the object of interest and a direction of the frame-out from, e.g., an image range which is an imaging range where an imaging unit 122 performs imaging and a region of an image displayed by a display unit 126 based on information of the position of the object of interest input from the object-of-interest detection unit 112. The frame-out accuracy judgment unit 114 outputs the calculated accuracy and direction related to the occurrence of the frame-out of the object of interest and the position of the object of interest to the deformation parameter decision unit 117.

The deformation parameter decision unit 117 receives the accuracy and the direction related to the occurrence of frame-out of the object of interest from the image range and the position of the object of interest from the frame-out accuracy judgment unit 114. The deformation parameter decision unit 117 decides a deformation parameter of deformation performed with respect to a display image based on the accuracy and the direction related to the occurrence of frame-out of the object of interest from the image range and the position of the object of interest input from the frame-out accuracy judgment unit 114. The deformation parameter decision unit 117 outputs the decided deformation parameter to the display image processing unit 118.

The display image processing unit 118 receives the deformation parameter from the deformation parameter decision unit 117. Further, the display image processing unit 118 receives image data D from an image signal generation unit 124. The display image processing unit 118 performs deformation processing on the image data D to create deformed image data D'. The display image processing unit 118 outputs the deformed image data D' to the display unit 126.

In this manner, for example, the deformation parameter decision unit 117 functions as a deformation parameter decision unit that decides a deformation parameter used for geometrically converting an image premised on an image signal based on a frame-out accuracy. Furthermore, the deformation parameter decision unit 117 functions as an alteration variable decision unit that decides a processing variable for alteration processing performed with respect to an image premised on an image signal based on a frame-out accuracy.

An operation of this embodiment will now be described. In this embodiment, like the first embodiment, for example, a person is determined as an object of interest, and the center of gravity of the person, which is the object of interest in an image, is determined as a position of the object of interest. Based on the position of the object of interest, an image processing apparatus 110 judges a possibility that the frame-out of the object of interest from an image range displayed in the display unit 126 occurs. The image processing apparatus 110 makes a judgment on the possibility that the frame-out of the object of interest occurs based on a distance between the center of the image range and a position of the object of interest. That is, in this embodiment, the image processing apparatus 110 determines that an accuracy that the frame-out occurs becomes higher as the center of gravity of the object of interest is distanced from the center of the image range. When the person as the object of interest is determined to have a high accuracy of the frame-out, the image processing apparatus 110 performs deformation processing with respect to a display image. In this embodiment, as the deformation processing, geometric conversion is carried out. In the geometric conversion, a side opposing a side closest to the object of interest in a contour of the display image having a rectangular shape is shortened, resulting in that the display image is deformed into a trapezoidal shape.

Each operation will now be described in detail with reference to the drawing. Like the first embodiment, an imaging unit 122 converts a subject image into an electrical signal based on photoelectric conversion, carries out digital conversion with respect to this electrical signal to create raw data, and outputs this data to the image signal generation unit 124. The image signal generation unit 124 generates an image signal (image data D) from the raw data input from the imaging unit 122 and outputs this image data D to the image processing apparatus 110.

Figure 28:
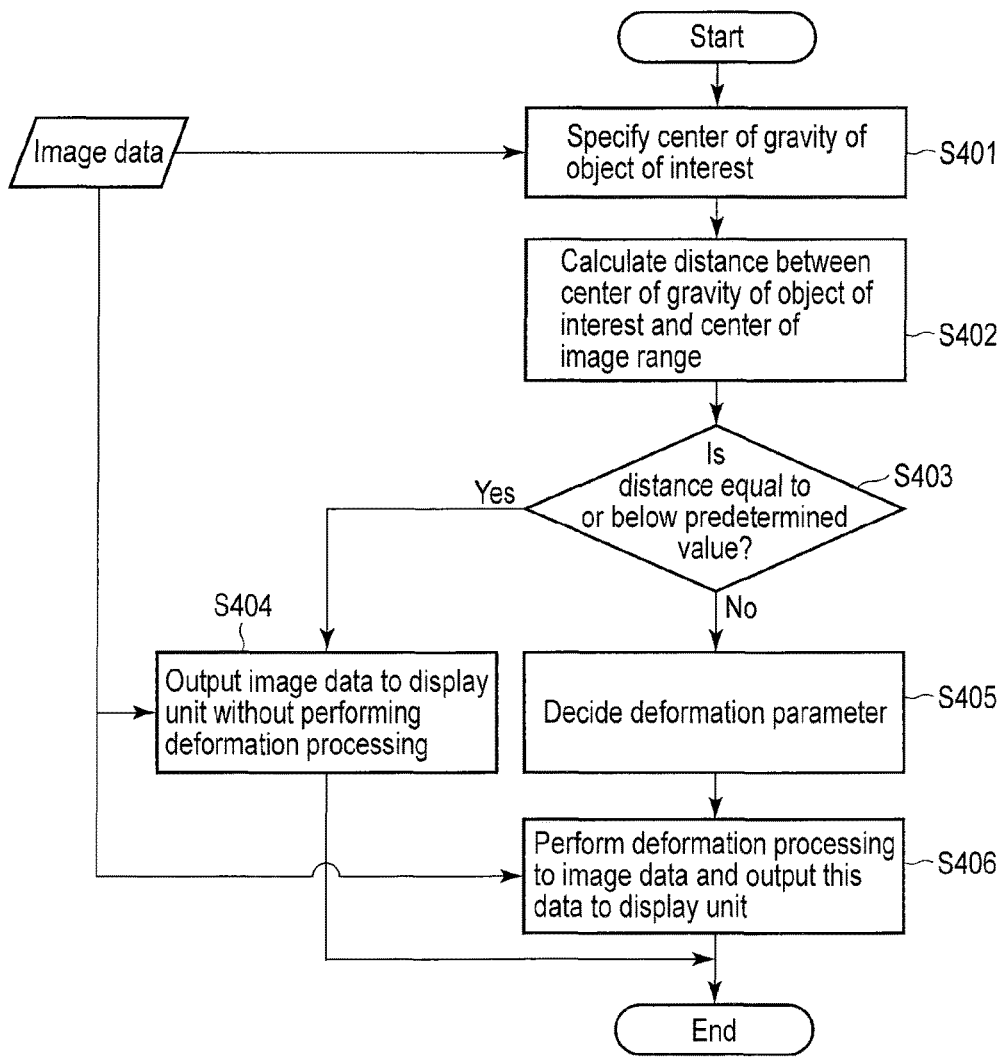
FIG. 28 is a flowchart showing a processing example of the image processing apparatus according to the third embodiment of the present invention.

Processing of the image processing apparatus 110 will now be described with reference to a flowchart depicted in FIG. 28. Here, processing of a step S401 to a step S403 is equal to the processing of the step S101 to the step S103 in the first embodiment explained with reference to FIG. 2.

When the frame-out accuracy judgment unit 114 determines that a distance from the center of the image range and the center of gravity of the object of interest is equal to or below a predetermined value at a step S403, the deformation parameter decision unit 117 decides not to carry out the deformation processing with respect to the input image data D in accordance with this judgment result. In response to this decision, the display image processing unit 118 directly outputs the image data D to the display unit 126 as changed image data D'. As a result, the display unit 126 displays an image based on the changed image data D' which is the image data D.

When it is determined that the distance between the center of the image range and the center of gravity of the object of interest is not equal to or below the predetermined value at the step S403, the frame-out accuracy judgment unit 114 determines that the frame-out occurs and outputs this judgment result to the deformation parameter decision unit 117. Moreover, the frame-out accuracy judgment unit 114 outputs the distance between the center of the image range and the center of gravity of the object of interest and the position of the object of interest to the deformation parameter decision unit 117. In response to this judgment result, the deformation parameter decision unit 117 decides a deformation parameter of the deformation processing carried out with respect to a display image at a step S405. The deformation parameter decision unit 117 outputs the decided deformation parameter to the display image processing unit 118. In this embodiment, the display image processing unit 118 carries out the deformation processing of deforming a rectangular display image into a trapezoidal shape. Here, geometric conversion, i.e., deformation for shortening a side opposing a side which is the closest to the object of interest in a contour is performed with respect to the display image. Further, a length of the side to be reduced is set in such a manner that this side becomes shorter as the distance between the center of the image range and the center of gravity of the object of interest increases. That is, at the step S405, the deformation parameter decision unit 117 decides which one of four sides, i.e., upper, lower, left, and right sides is to be reduced and a reduction ratio of the side to be reduced and outputs this decision result to the display image processing unit 118. As descried above, for example, the distance between the center of the image range and the center of gravity of the object of interest functions as a frame-out accuracy representing an accuracy that the object of interest deviates from the image range.

At a step S406, the display image processing unit 118 carries out the deformation processing, which is geometric conversion of an image, to the input image data D based on the deformation parameter decided by the deformation parameter decision unit 117 in the display image. That is, the display image processing unit 118 shortens the reduction target side decided by the deformation parameter decision unit 117 in the rectangular image based on the image data D at the reduction ratio decided by the deformation parameter decision unit 117, thereby deforming the entire image into a trapezoidal shape. The outside of this trapezoid is determined as a region including no image information, and it is displayed in, e.g., a black color or a white color. In this manner, the display image processing unit 118 creates deformed image data D' representing this image. The display image processing unit 118 outputs the created deformed image data D' to the display unit 126.

The display unit 126 displays an image after the deformation processing based on the deformed image data D' input from the display image processing unit 118.

Here, FIG. 29A and FIG. 29B show image examples before and after the deformation processing. FIG. 29A shows an image based on the image data D before the deformation processing. In this drawing, a person who is an object of interest OI is biased to a left end of a display area DA, and a distance between the object of interest OI and the center of the display area DA, i.e., the image range is greater than a predetermined value. At this time, the display image processing unit 118 executes the deformation processing based on the decision of the deformation parameter decision unit 117. Here, the deformation parameter decision unit 117 decides to shorten the right side which is a side opposing the left side of an image as a side that is the closest to the object of interest. Further, the deformation parameter decision unit 117 decides a reduction ratio of the right side to be shortened based on the distance between the object of interest OI and the center of the image range. That is, the display image processing unit 118 performs geometric conversion of distorting the entire image to shorten the right side of the image in FIG. 29A at the reduction ratio to form a frame FR of the image into a trapezoidal shape, thereby creating such an image as depicted in FIG. 29B. In this manner, the display image processing unit 118 creates the deformed image data D'. That is, the image processing apparatus 110 changes a shape of the frame of the image based on the input image data D into the trapezoidal shape. It is to be noted that lines that divide the image into three parts in vertical and horizontal directions are lines that help show the deformation of the image in FIG. 29A and FIG. 29B, and they are not included in the image concerning the image processing apparatus 110. This is also applied to the following examples.

Figure 30A:
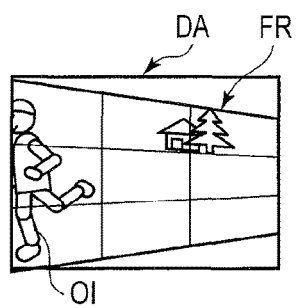
FIG. 30A is a view showing a first example of an image created after the deformation processing executed by the image processing apparatus according to the third embodiment of the present invention, which is also a view for explaining that the deformation processing performed with respect to an image differs depending on a position of an object of interest.
Figure 30B:
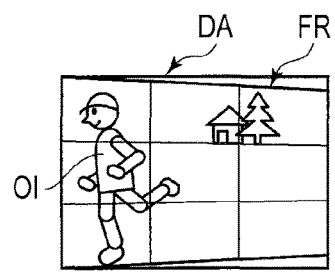
FIG. 30B is a view showing a second example of an image created after the deformation processing executed by the image processing apparatus according to the third embodiment of the present invention, which is also a view for explaining that the deformation processing performed with respect to an image differs depending on a position of an object of interest.
Figure 30C:
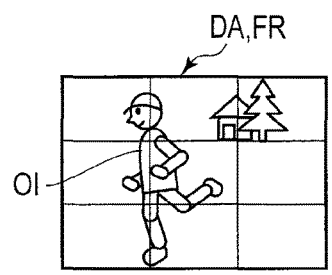
FIG. 30C is a view showing a third example of an image created after the deformation processing executed by the image processing apparatus according to the third embodiment of the present invention, which is also a view for explaining that the deformation processing performed with respect to an image differs depending on a position of an object of interest.

The reduction ratio decided by the deformation parameter decision unit 117 increases, i.e., makes the side shorter as the distance between the center of the image range and the center of gravity of the object of interest increases. Therefore, distortion of the display image is reduced as the object of interest OI gets closer to the center of the image range. For example, as shown in FIG. 30A, when the object of interest OI is biased to the left side of the image range, a shape of the frame FR of the image is in a state that two parallel sides (a left side and a right side) have greatly different lengths. A user again aims the digital camera from this state in such a manner that the object of interest OI can be placed at the center of the display screen. As a result, when the object of interest OI moves closer to the center of the image range from the state depicted in FIG. 30A, a difference between the two parallel sides of the frame FR of the image becomes smaller than that in FIG. 30A as depicted in FIG. 30B. Moreover, when the object of interest OI is placed at the center of the display screen, the display image enters a state that is not subjected to the deformation processing as shown in FIG. 30C.

A situation where the user holds the digital camera and confirms framing while observing the display unit 126 will now be considered. As described above, according to this embodiment, for example, when the object of interest like a person is biased to the end of the display area, the display unit 126 displays an image deformed into a trapezoidal shape. The user who is observing such a deformed image pans the digital camera to the object of interest side to eliminate the distortion of the image. As a result, the image displayed in the display unit 126 enters an undeformed state. As described above, according to this embodiment, the digital camera having the image processing apparatus 110 can guide the user so that the object of interest can be always placed within the display area. At this time, an image displayed in the display unit 126, i.e., a display image obtained by deforming an acquired image shows a direction that the digital camera should be aimed in, and hence the user does not have to set a viewpoint at any position other than the display unit 126. Further, the image displayed in the display unit 126 is not complicated. That is, the user can take a picture while observing the display unit. It is to be noted that the display image displayed here shows a result of predicting whether the frame-out of the object of interest occurs. Therefore, according to this embodiment, occurrence of the frame-out of the object of interest can be avoided.

Although the image is deformed into the trapezoidal shape to shorten the side opposing the side that is the closest to the object of interest in the description of this embodiment, the image may be deformed into the trapezoidal shape so that the side which is the closest to the object of interest can be shortened. Furthermore, the present invention is not restricted to the deformation into the trapezoid, and it is possible to carry out deformation processing of, e.g., shortening a side far from the object of interest in upper and lower sides and shortening a side far from the object of interest in left and right sides at the same time.

Like the situation described in the first embodiment with reference to FIG. 6 and FIG. 7, a state that only a part of the object of interest OI is placed in the display area DA, i.e., the image range may be allowed. For example, as shown in FIG. 31, when the object-of-interest detection unit 112 can specify a position of the object of interest even though the position is provided outside the image range displayed in the display unit 126, the image processing apparatus 110 can execute the same processing in accordance with the position of the object of interest OI provided outside the display image range.

Further, like the first and second embodiments, raw data output from the imaging unit 122 may be directly input to the object-of-interest detection unit 112 as an image signal, and the object-of-interest detection unit 112 may be configured to specify a position of the object of interest based on this raw data. Furthermore, although the center of the image range is used as a reference for obtaining a positional relationship between the image range and a position of the object of interest in this embodiment, the present invention is not restricted to the center, and any other portion may be determined as the reference. Moreover, the object of interest is not restricted to a person, and it may be an animal, a vehicle, or something else as a matter of course. Additionally, although the template matching has been described as an example of the method for detecting the object of interest by the object-of-interest detection unit 12 in the explanation of this embodiment, any method can be adopted as long as the object of interest can be extracted from an image. Additionally, although the accuracy that the frame-out occurs is either the predetermined value or below, i.e., binarized in this embodiment, two or more threshold values may be provided, three or more conditions may be set, and different types of deformation processing may be carried out in accordance with each case. Further, the predetermined value used for the judgment at the step S403 may be set to 0, and providing a threshold value may be avoided in the judgment on whether the deformation processing is to be executed.

First Modification of Third Embodiment

A first modification of the third embodiment according to the present invention will now be described. Here, a difference from the third embodiment will be described, and like reference numerals denote like parts to omit explanation thereof. As shown in FIG. 29B, at the step S406, in the third embodiment, the deformation of an image executed by the display image processing unit 118 is deformation processing of shortening a side opposing a side that is the closest to an object of interest in a contour of a display image based on a deformation parameter decided by the deformation parameter decision unit 117 and thereby deforming the display image into a trapezoidal shape. On the other hand, in this modification, a frame of the display image is not deformed, and the display image is expanded or shrunk to be distorted.

For example, in this modification, in a perpendicular direction of a side, which is the closest to an object of interest, in a contour of a display image, the image is expanded or shrunk in accordance with a distance from the side which is the closest to the object of interest. Here, in this modification, an image is shrunk in a perpendicular direction of a side which is the closest to the object of interest when getting closer to this side, and the image can be expanded in the perpendicular direction of this side when getting further away from the same. For example, a situation in which an object of interest OI is biased to a left side of a display area DA in such an image as depicted in FIG. 32A will now be considered. At this time, the side which is closest to the object of interest OI is a left side in FIG. 32A. Therefore, the image processing apparatus shrinks a left-side image and expands a right-side image in the image along a perpendicular direction of the left side, i.e., a left-right direction to create such an image as depicted in FIG. 32B. In this manner, the image processing apparatus 110 expands/ shrinks an image based on input image data D, shrinks a part of this image, and expands the other part of the same.

The present invention is not restricted to such a modification, and an image may be expanded in the perpendicular direction of the side which is the closest to the object of interest when getting closer to the object of interest, and the image may be shrunk in the perpendicular direction of this side when getting further away from the object of interest. Furthermore, the present invention is not restricted to expanding/shrinking an image in the left-right direction or the up-down direction, the image may be deformed to be shrunk in both the left-right direction and the up-down direction at the same time. Moreover, instead of expanding or shrinking an image in accordance with a distance from the side which is the closest to the object of interest, for example, an image in a region which is distanced from the side which is the closest to the object of interest by a predetermined distance alone may be expanded or shrunk. Additionally, a ratio of the expansion/shrinkage may be changed in accordance with a distance between the object of interest and the side which is the closest to the object of interest.

For example, to display such an image as depicted in FIG. 32B in the display unit 126, in this modification, at the step S405, the deformation parameter decision unit 117 decides deformation parameters including a region where an image is expanded/shrunk and a direction and a ratio of the expansion/shrinkage based on a distance between the center of the image range and the center of gravity of the object of interest and a position of the object of interest input from the frame-out accuracy judgment unit 114. The deformation parameter decision unit 117 outputs this decided result to the display image processing unit 118.

At the step S406, the display image processing unit 118 executes the deformation processing with respect to the image in regard to the input image data D based on the deformation parameters decided by the deformation parameter decision unit 117 in a display image. That is, the display image processing unit 118 expands/shrinks the image in the direction of the expansion/shrinkage at the ratio of the expansion/shrinkage decided by the deformation parameter decision unit 117 in accordance with each region where the image is expanded/shrunk in the image based on the image data D. In this manner, the display image processing unit 118 creates deformed image data D' representing this image. The display image processing unit 118 outputs the created deformed image data D' to the display unit 126. Any other operation is equal to that in the third embodiment.

In this modification, likewise, the image in the display area is deformed as the object of interest is distanced from the center of the image range. As a result, a user who holds the digital camera and confirms framing while observing the display unit 126 pans the digital camera having the image processing apparatus 110 in a direction along which the object of interest moves to the center of the display area in such a manner that the deformation of the image can be eliminated. Consequently, the image displayed in the display unit 126 enters an undeformed state. As described above, according to this modification, the digital camera having the image processing apparatus 110 can guide a user so that the object of interest can be always placed within the display area.

Second Modification of Third Embodiment

A second modification of the third embodiment according to the present invention will now be described. In this modification, deformation of an image which is a combination of the deformation of an image in the third embodiment and the deformation of an image in its first modification is carried out. That is, in this modification, a side opposing a side which is the closest to an object of interest is shortened to deform a contour of a display image into a trapezoidal shape, and an image is expanded/shrunk in a perpendicular direction of the side which is the closest to the object of interest in accordance with a distance from the side which is the closest to the object of interest. That is, the image processing apparatus 110 creates, e.g., such an image as depicted in FIG. 33.

In this modification, like the third embodiment and its first modification, at the step S405, the deformation parameter decision unit 117 decides parameters used for deforming a contour of a display image, i.e., which one of four sides, i.e., upper, lower, left, and right sides is to be shortened and a ratio of reduction for the side to be shortened. Further, the deformation parameter decision unit 117 decides parameters used for expanding/shrinking an image, i.e., a region where the image is expanded/shrunk and a direction and a ratio for the expansion/shrinkage. At the step S406, the display image processing unit 118 carries out the deformation processing with respect to an image in regard to input image data D based on the deformation parameters decided by the deformation parameter decision unit 117 to create deformed image data D'. Any other operation is equal to that in the third embodiment. Further, in regard to the deformation of a display image, the deformation may be carried out to enable definition by linear transformation like projective deformation.

This embodiment can obtain the same effects as those of the third embodiment and its first modification.

Figure 35:
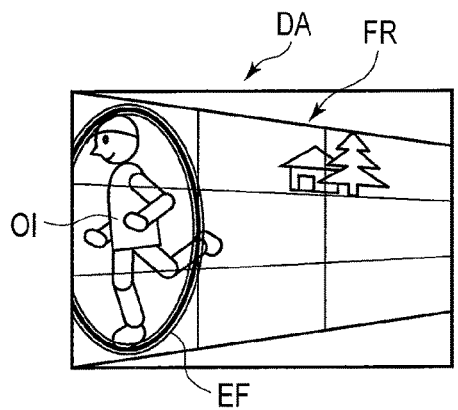
FIG. 35 is a view showing an image example created by the image processing apparatus when the second embodiment and the third embodiment according to the present invention are combined with each other.
Figure 36:
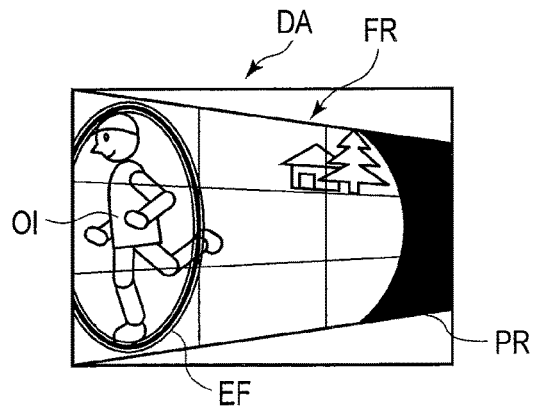
FIG. 36 is a view showing an image example created by the image processing apparatus when the first embodiment, the second embodiment and the third embodiment according to the present invention are combined with each other.

This embodiment and its various modifications can be combined with the first embodiment and/or the second embodiment to be used. That is, like the first embodiment, a part of an image can be subjected to the change processing and the deformation processing. In this case, the change value decision unit 116 in the first embodiment or the deformation parameter decision unit 117 in this embodiment has functions of both the change value decision unit 116 and the deformation parameter decision unit 117, and the display image processing unit 118 executes the change processing for an image according to the first embodiment and the deformation processing according to this embodiment with respect to the image data D. As a result, for example, such an image as depicted in FIG. 34 is created. Likewise, the effect decision unit 115 or the deformation parameter decision unit 117 can be configured to have functions of both the effect decision unit 115 and the deformation parameter decision unit 117 by combining this embodiment with the second embodiment. That is, the image processing apparatus 110 may be configured in such a manner that the deformation processing can be executed and the effect can be added to an image to create such an image as depicted in FIG. 35. Furthermore, the change processing according to the first embodiment, the addition of the effect according to the second embodiment, and the deformation processing according to this embodiment may be combined with each other. That is, the image processing apparatus 110 may be configured to have functions of the effect decision unit 115, the change value decision unit 116, and the deformation parameter decision unit 117, thereby creating such an image as depicted in FIG. 36, for example.

Fourth Embodiment

A fourth embodiment according to the present invention will now be described. Here, a difference from the first embodiment will be explained, and like reference numerals denote like parts to omit description thereof. Like the first embodiment, a digital camera according to this embodiment has a configuration depicted in FIG. 1. A change value decision unit 116 according to this embodiment decides various kinds of parameters for change processing carried out with respect to image data D based on a frame-out accuracy obtained by a frame-out accuracy decision unit 114 like the first embodiment. A display image processing unit 118 executes the change processing with respect to the image data D based on the decision of the change value decision unit 116.

In the first embodiment, the frame-out accuracy decision unit 114 calculates a distance between the center of image range and the center of gravity of an object of interest and decides the accuracy related to the occurrence of frame-out of the object of interest from the image range using the calculated distance as a reference. On the other hand, in this embodiment, the frame-out accuracy decision unit 114 calculates a temporal change of a position of the object of interest based on an image represented by the image data D, i.e., a relative movement speed of the object of interest in the image and determines that the accuracy that the frame-out occurs is high when the temporal change (the relative movement speed V) of the position of the object of interest is large. Moreover, in this embodiment, a moving direction of the object of interest is a direction in which the frame-out of the object of interest possibly occurs.

Figure 37:
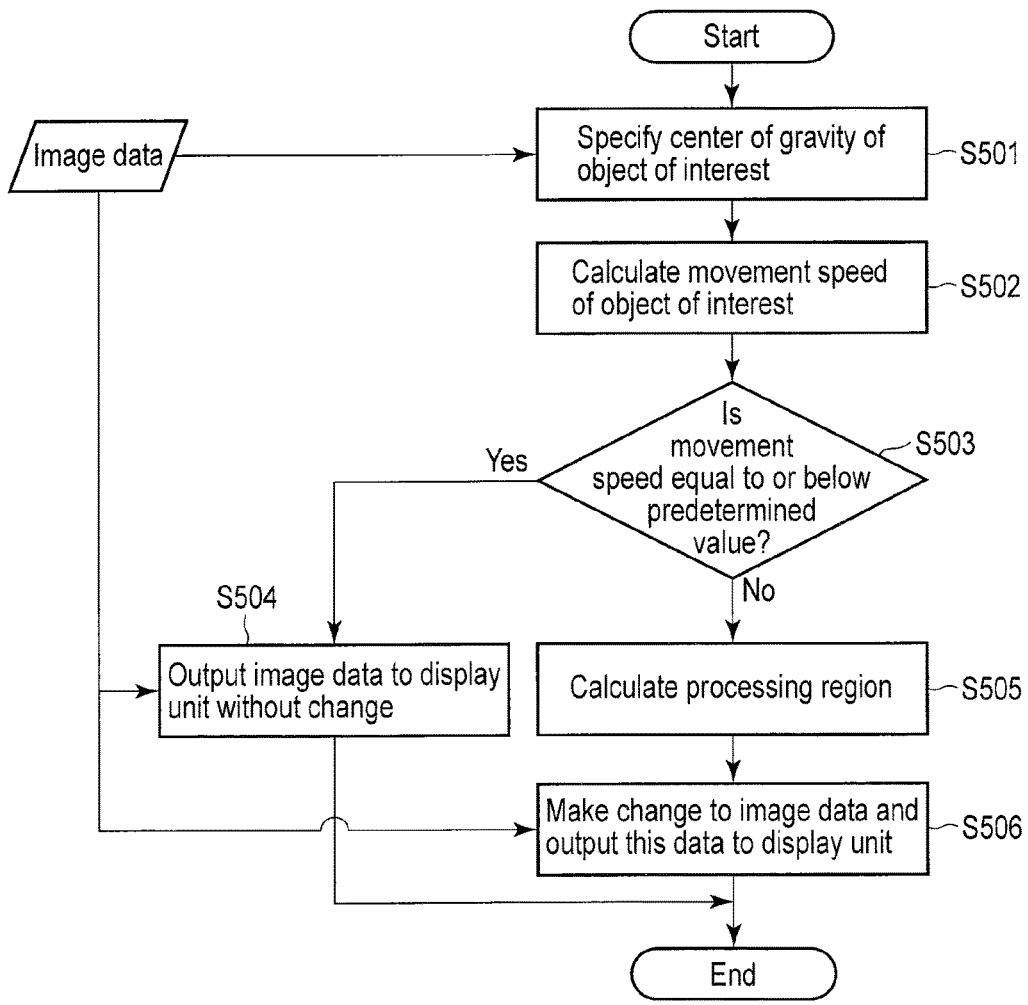
FIG. 37 is a flowchart showing a processing example of an image processing apparatus according to a fourth embodiment of the present invention.

FIG. 37 shows a flowchart for explaining an operation of the image processing apparatus 110 according to this embodiment. As shown in this drawing, like the step S101 in the first embodiment, image data D created by an image signal generation unit 124 is input to an object-of-interest detection unit 112 at a step S501. The object-of-interest detection unit 112 specifies a position of the object of interest which is a subject at the center of attention in an image represented by the image data D. The object-of-interest detection unit 112 outputs the specified position of the object of interest to the frame-out accuracy judgment unit 114.

At a step S502, the frame-out accuracy judgment unit 114 calculates a temporal change of a position of the object of interest in the image, i.e., a relative movement speed (which will be simply referred to as a movement speed hereinafter) of the object of interest based on the position of the object of interest specified by the object-of-interest detection unit 112. Therefore, the frame-out accuracy judgment unit 114 must be configured to include a memory that stores a position of the object of interest in previous image data, or a main controller 128 must be configured to hold information of a position of the object of interest in previous image data and to supply this information to the frame-out accuracy judgment unit 114.

At a step S503, the frame-out accuracy judgment unit 114 judges whether the movement speed of the object of interest is equal to or below a predetermined value. When the movement speed of the object of interest is equal to or below the predetermined value, the frame-out accuracy judgment unit 114 determines that the frame-out does not occur and outputs this judgment result to the change value decision unit 116. Like the step S104 in the first embodiment, at a step S504, the change value decision unit 116 decides not to execute the change processing on the input image data D. The display image processing unit 118 outputs the image data D which is not changed to a display unit 126 as changed image data D'. As a result, the display unit 126 displays an image based on the changed image data D' which is the image data D.

On the other hand, when the temporal change of the position of the object of interest is not equal to or below the predetermined value at the step S503, the change value decision unit 116 decides a processing region where a display image is filled with a black color at a step S505. Here, the processing region is determined as a region associated with the opposite side of the moving direction of the object of interest with respect to the center of the display image. For example, the right side of the display image is determined as the processing region when the object of interest is moving in the left direction, and the left side of the display image is determined as the processing region when the object of interest is moving in the right direction. Likewise, the lower side of the display image is determined as the processing region when the object of interest is moving upward, and the opposite side of the moving direction of the object of interest with respect to the center of the display image is determined as the processing region when the object of interest is obliquely moving. An area of the processing region is enlarged as the movement speed of the object of interest is increased. The change value decision unit 116 outputs the decided processing region to the display image processing unit 118. Additionally, the change value decision unit 116 outputs information indicating that the change processing involves filling with the black color to the display image processing unit 118. As described above, for example, the temporal change of the position of the object of interest functions as a frame-out accuracy representing an accuracy that the object of interest deviates from the image range.

Like the step S106 in the first embodiment, at a step S506, the display image processing unit 118 performs the change processing on the image to fill the processing region in the display image calculated by the change value decision unit 116 with the black color and thereby creates changed image data D' which is data of an image obtained after the change processing. The display image processing unit 118 outputs the changed image data D' to the display unit 126. Any other configuration and operation of the digital camera according to this embodiment are equal to those in the first embodiment.

According to this embodiment, the display unit 126 displays such images as depicted in FIG. 38A and FIG. 38B, for example. That is, when the object of interest OI is moving in the left direction, the right side of the display area is set as a processing region PR and filled with the black color. It is to be noted that, in FIG. 38A and FIG. 38B, a level of a distance between a person as the object of interest OI drawn in a solid line and a person drawn in a broken line represents a level of a speed. This is also applied to the following description. When the movement speed of the object of interest OI is relatively low, an area of the processing region PR is relatively small as shown in FIG. 38A. On the other hand, when the movement speed of the object of interest OI is relatively high, as shown in FIG. 38B, the area of the processing region PR is relatively large.

In this embodiment, likewise, when the object of interest is moving, an image in the processing region is changed in accordance with the speed. As a result, a user who holds the digital camera and confirms framing while observing the display unit 126 pans the digital camera to trace the movement of the object of interest in such a manner that the change of the image can be decreased. When the relative movement of the object of interest with respect to the display image becomes small, the image displayed in the display unit 126 enters an unchanged state. As described above, the digital camera having the image processing apparatus 110 can guide the user to trace the moving object of interest so that the object of interest can be constantly placed within the display area. It is to be noted that the display image displayed in the digital camera shows a result obtained by predicting whether the frame-out of the object of interest occurs. Therefore, according to this embodiment, the occurrence of the frame-out of the object of interest can be avoided.

Further, like the first modification of the first embodiment, the image processing apparatus 110 can be configured to fill the processing region with any other color than the black color and can be configured to change one or more selected from luminance, resolution, sharpness, contrast, chroma, and a hue. Furthermore, like the second modification of the first embodiment, the processing region may be associated with a distance from the object of interest instead of being associated with the opposite side of the moving direction of the object of interest with respect to the center of the display image. For example, the distance from the object of interest to the frame of the processing region may be shortened when the movement speed of the object of interest is high, and the distance from the object of interest to the frame of the processing region may be increased when the movement speed of the object of interest is low.

Moreover, like the third modification of the first embodiment, a change amount of luminance, resolution, sharpness, contrast, chroma, or a hue of processing region may be changed in accordance with the movement speed of the object of interest. In this case, at the step S505, the change value decision unit 116 calculates a change amount of a change that is made to the processing region based on the movement speed of the object of interest in place of calculating the processing region. At the step S506, the display image processing unit 118 changes one or more selected from luminance, resolution, sharpness, contrast, chroma, and a hue by the change amount calculated by the change value decision unit 116. Furthermore, the predetermined value used in the judgment at the step S503 may be determined as 0 without setting a threshold value for the judgment on whether the change processing is to be executed.

In any case, the same effect as that of each modification of the first embodiment can be obtained.

Fifth Embodiment

A fifth embodiment according to the present invention will now be described. Here, a difference from the second and fourth embodiments will be described, and like reference numerals denote like parts to omit explanation thereof. A digital camera according to this embodiment has a configuration depicted in FIG. 15 like the second embodiment. An effect decision unit 115 according to this embodiment decides various kinds of parameters of an effect added to image data D based on a frame-out accuracy obtained by a frame-out accuracy judgment unit 114 like the second embodiment. A display image processing unit 118 adds the effect to the image data D based on the decision of the effect decision unit 115.

In this embodiment, the frame-out accuracy decision unit 114 calculates a temporal change of a position of an object of interest in an image range represented by image data D, i.e., a relative movement speed of the object of interest in the image range and determines that an accuracy that frame-out occurs is high as the temporal change of the position of the object of interest is large.

FIG. 39 shows a flowchart for explaining an operation of the image processing apparatus 110 according to this embodiment. As shown in the drawing, processing of a step S601 to a step S603 according to this embodiment is equal to the processing of the step S501 to the step S503 according to the fourth embodiment. However, the change value decision unit 116 in the fourth embodiment is substituted by an effect decision unit 115 in this embodiment.

When the frame-out accuracy decision unit 114 determines that a distance between the center of the image range and the center of gravity of the object of interest is equal to or below a predetermined value at a step S603, the effect decision unit 115 decides not to add an effect to input image data D in accordance with this judgment result at a step S604. In response to this decision, the display image processing unit 118 directly outputs the image data D to a display unit 126 as changed image data D'. As a result, the display unit 126 displays an image based on the changed image data D' as the image data D.

When it is determined that the temporal change of the position of the object of interest is not equal to or below the predetermined value at the step S603, the frame-out accuracy judgment unit 114 determines that the frame-out occurs and outputs this judgment result to the effect decision unit 115. The effect decision unit 115 decides to add the effect to a display image in accordance with this judgment result at a step S605. Here, the effect is an elliptic line surrounding the object of interest with a center of the gravity of the object of interest at the center. The effect decision unit 115 outputs the decision to add the effect and information of the elliptic line which is the effect to be added to the display image processing unit 118. In this manner, for example, the temporal change of the position of the object of interest functions as the frame-out accuracy indicative of an accuracy that the object of interest deviates from the image range.

Like the step S306 of the second embodiment, the display image processing unit 118 adds the effect input from the effect decision unit 115 to the input image data to create changed image data D' at a step S606. The display image processing unit 118 outputs the changed image data D' to the display unit 126. The display unit 126 displays an image having the effect added thereto based on the changed image data D' input from the display image processing unit 118. Any other structure and operation of the digital camera according to this embodiment are equal to those of the second embodiment.

According to this embodiment, the display unit 126 displays such images as depicted in FIG. 40A and FIG. 40B, for example. That is, when a person who is the object of the interest OI is moving faster than a predetermined speed, an ellipse as the effect EF is displayed around the object of interest OI as shown in FIG. 40A. On the other hand, when a movement speed of the object of interest OI is equal to or below a predetermined value, the effect EF is not displayed as depicted in FIG. 40B. It is to be noted that an open arrow in each drawing is given to show that the object of interest OI is moving, and it does not constitute a display image. Further, a thickness of this open arrow represents a level of the movement speed, and the movement speed is higher as the arrow is thicker. This is also applied to subsequent drawings. Based on presence/absence of display of this effect, a photographer can be intuitively aware that the likelihood of occurrence of the frame-out of the object of interest is high. For example, when various subjects are present in the image range and a user may not be aware of movement of the object of interest, there can be obtained an effect that the user notices the object of interest emphasized by the effect when the object of interest moves.

According to this embodiment, likewise, when the object of interest is moving, the effect is added to the display image in accordance with a movement speed. As a result, the user who holds the digital camera and confirms framing while observing the display unit 126 can pan the digital camera in a direction which the movement of the object of interest is traced so that the effect can be eliminated. When relative movement of the object of interest to the display image is small, the image displayed in the display unit 126 enters an unchanged state. As described above, according to this embodiment, the digital camera having the image processing apparatus 110 can guide the user so that the object of interest can be always placed within the display area, i.e., the moving object of interest can be traced. It is to be noted that the display image displayed in the digital camera shows a result of predicting whether the frame-out of the object of interest occurs. Therefore, according to this embodiment, occurrence of the frame-out of the object of interest can be avoided.

It is to be noted that although the effect added to the display image is the ellipse in the description of this embodiment, it is possible to adopt an effect of lines corresponding to a shape of the object of interest. For example, a line parallel to a contour line of the object of interest and/or a line along the contour line can be displayed around the object of interest like the second modification of the second embodiment. In this case, at a step S601, the object of interest detection unit 112 specifies a position of the object of interest in an image represented by the image data D, and a contour extraction unit 1122 in the object-of-interest detection unit 112 extracts a contour of this object of interest. The object-of-interest detection unit 112 outputs the specified position and contour of the object of interest to the frame-out accuracy judgment unit 114. Further, when the movement speed of the object of interest is not equal to or below the predetermined value in the judgment at the step S603, the frame-out accuracy judgment unit 114 determines that the frame-out occurs and outputs this judgment result and information of the contour of the object of interest to the effect decision unit 115. The effect decision unit 115 decides to add the effect, which is a line parallel to the contour line and/or a line along the contour line of the object of interest, around the object of interest at the step S605.

First Modification of Fifth Embodiment

A first modification of the fifth embodiment according to the present invention will now be described. Here, a difference from the fifth embodiment will be described, and like reference numerals denote like parts to omit explanation thereof. In the fifth embodiment, when a movement speed of the object of interest is higher than a predetermined value, the effect added to a display image is the same irrespective of a level of this speed. On the other hand, in this modification, the effect is changed in accordance with a movement speed of the object of interest.

FIG. 41A, FIG. 41B, and FIG. 41C show examples of a display image when the effect is changed in accordance with a movement speed of such an object of interest. For example, when a movement speed of an object of interest OI is lower than that in FIG. 41A, an area of a portion surrounded by an ellipse as an effect EF is reduced as shown in FIG. 41B. Alternatively, for example, when a movement speed of the object of interest OI is lower than that in FIG. 41A, a pattern of the ellipse as the effect EF is changed to vary an area of the effect, e.g., thin the line as shown in FIG. 41C and/or vary a degree of processing of the effect, e.g., lighten a color of the line. Moreover, both an area of a portion surrounded by the ellipse as the effect and a pattern of the line may be changed in accordance with a movement speed of the object of interest.

To display the effect that differs depending on each movement speed of the object of interest, the following processing is executed in this modification. At the step S603, when it is determined that a movement speed of the object of interest is not equal to or below a predetermined value, the frame-out accuracy judgment unit 114 determines that the frame-out occurs and outputs this judgment result and the movement speed of the object of interest to the effect decision unit 115.

The effect decision unit 115 decides to add the effect to the display image at the step S605. Here, the effect is an area or a pattern associated with a movement speed of the object of interest. The effect decision unit 115 outputs the decision of adding the effect and information of the elliptic line as the effect to be added to the display image processing unit 118.

At the step S606, the display image processing unit 118 adds the effect input from the effect decision unit 115 to input image data D. The display image processing unit 118 outputs changed image data D', which is data of an image having the effect added thereto, to the display unit 126. Any other processing is the same as the processing in the second embodiment.

According to this modification, likewise, when the object of interest is moving, the effect is added to a display image in accordance with the movement speed. Here, an area or a pattern of this elliptic represents the movement speed of the object of interest. A user can intuitively recognize the movement speed of the object of interest, i.e., the likelihood of the frame-out of object of interest from an area of a portion surrounded by the ellipse or a pattern of an elliptic line. As a result, a user who holds the digital camera and confirms framing while observing the display unit 126 can pan the digital camera in a direction in which the movement of the object of interest is traced so that the effect can be reduced. When relative movement of the object of interest to the display image is small, the image displayed in the display unit 126 enters an unchanged state. As described above, according to this embodiment, the digital camera having the image processing apparatus 110 can guide the user so that the object of interest can be always placed within the display area, i.e., the moving object of interest can be traced.

It is to be noted that the predetermined value used in the judgment at the step S603 may be set to 0 and a threshold may not be provided for the judgment on whether the change processing is to be executed. That is, an area of the effect may be changed in accordance with a movement speed of the object of interest without providing the threshold value.

Second Modification of Fifth Embodiment

A second modification of the fifth embodiment according to the present invention will now be described. Here, a difference of the modification from the fifth embodiment will be described, and like reference numerals denote like parts to omit explanation thereof. In the fifth embodiment, an effect associated with a movement speed of the object of interest is added, and a moving direction is not taken into consideration. In this modification, an effect indicative of a moving direction of the object of interest is added. As an example of this modification, as shown in FIG. 42, the effect EF is determined as an ellipse having an area that is large on the opposite side of a moving direction of the object of interest OI with respect to a barycentric position of the object of interest OI, i.e., a rear side of the moving direction of the object of interest.

To change a shape of the ellipse as the effect in accordance with a moving direction of the object of interest as descried above, the following processing is executed in this modification. When it is determined that a movement speed of the object of interest is not equal to or below a predetermined value at the step S603, the frame-out accuracy judgment unit 114 determines that the frame-out occurs and outputs this judgment result and the moving direction of the object of interest to the effect decision unit 115. The effect decision unit 115 decides to add an effect to a display image at the step S605. Further, at the step S605, the effect decision unit 115 decides a shape of the effect to be added in accordance with the moving direction of the object of interest and outputs this information to the display image processing unit 118. At the step S606, the display image processing unit 118 adds the effect to input image data D based on information of the effect input from the effect decision unit 115. The display image processing unit 118 outputs changed image data D', which is data of an image having the effect added thereto, to the display unit 126. Any other processing is the same as the processing in the second embodiment.

According to this modification, likewise, when the object of interest is moving, the effect is added to a display image in accordance with the movement speed. Here, a user can recognize the moving direction of the object of interest based on a shape of the effect to be added. As a result, the user can intuitively recognize the speed/moving direction of the subject and can naturally aim the digital camera in the direction of the subject. As a result, a user who holds the digital camera and confirms framing while observing the display unit 126 can pan the digital camera in a direction in which the movement of the object of interest is traced so that the effect can be reduced. When relative movement of the object of interest to the display image is small, the image displayed in the display unit 126 enters an unchanged state. As described above, according to this embodiment, the digital camera having the image processing apparatus 110 can guide the user so that the object of interest can be always placed within the display area, i.e., the moving object of interest can be traced.

Additionally, this modification can be combined with the first modification of the fifth embodiment. For example, as shown in FIG. 43, an area of a portion surrounded by the effect EF may be changed in accordance with the movement speed of the object of interest OI, and a shape of the effect EF may be changed in accordance with the moving direction of the same. In this case, operations in the first modification and the second modification of the fifth embodiment can be combined. That is, when it is determined that the movement speed of the object of interest is not equal to or below the predetermined value at the step S603, the frame-out accuracy judgment unit 114 determines that the frame-out occurs and outputs this judgment result, the movement speed of the object of interest, and the moving direction of the object of interest to the effect decision unit 115. At the step S605, the effect decision unit 115 decides to add an effect to the display image. Here, the effect is an area or a pattern associated with the moving speed of the object of interest, and it has a shape associated with the moving direction. The effect decision unit 115 outputs the decision to add the effect and information of an elliptic line as the effect to be added to the display image processing unit 118. When the first modification is combined with the second modification in this manner, the digital camera having the image processing apparatus 110 can perform display having the effect which enables recognizing the movement speed and the moving direction of the object of interest.

It is to be noted that the effect may temporally vary in the fifth embodiment and its modifications.

Further, this embodiment and its various modifications can be combined with the fourth embodiment. That is, the change processing may be performed with respect to a part of an image like the fourth embodiment, and the effect may be added like this embodiment. In this case, the change value decision unit 116 in the fourth embodiment or the effect decision unit 115 in this embodiment has functions of both the effect decision unit 115 and the change value decision unit 116, and the display image processing unit 118 performs a change in image according to the fourth embodiment and addition of the effect according to the fifth embodiment with respect to the image data D. As a result, for example, such an image as depicted in FIG. 26 is created.

Sixth Embodiment

A sixth embodiment according to the present invention will now be descried. Here, differences from the third and fourth embodiments will be described and like reference numerals denote like parts to omit explanation thereof. A digital camera according to this embodiment has a configuration shown in FIG. 27 like the third embodiment. A deformation parameter decision unit 117 according to this embodiment decides various kinds of parameters of deformation processing performed with respect to the image data D based on a frame-out accuracy obtained by a frame-out accuracy judgment unit 114 like the third embodiment. A display image processing unit 118 carries out the deformation processing with respect to the image data D based on the decision of the deformation parameter decision unit 117.

In this embodiment, the frame-out accuracy judgment unit 114 calculates a temporal change of a position of an object of interest in an image range represented by the image data D, i.e., a relative movement speed of the object of interest in the image range and determines that an accuracy that the frame-out occurs is high as the temporal change of the position of the object of interest is large. Furthermore, in this embodiment, a moving direction of the object of interest is a direction in which the frame-out of the object of interest may possibly occur.

Figure 44:
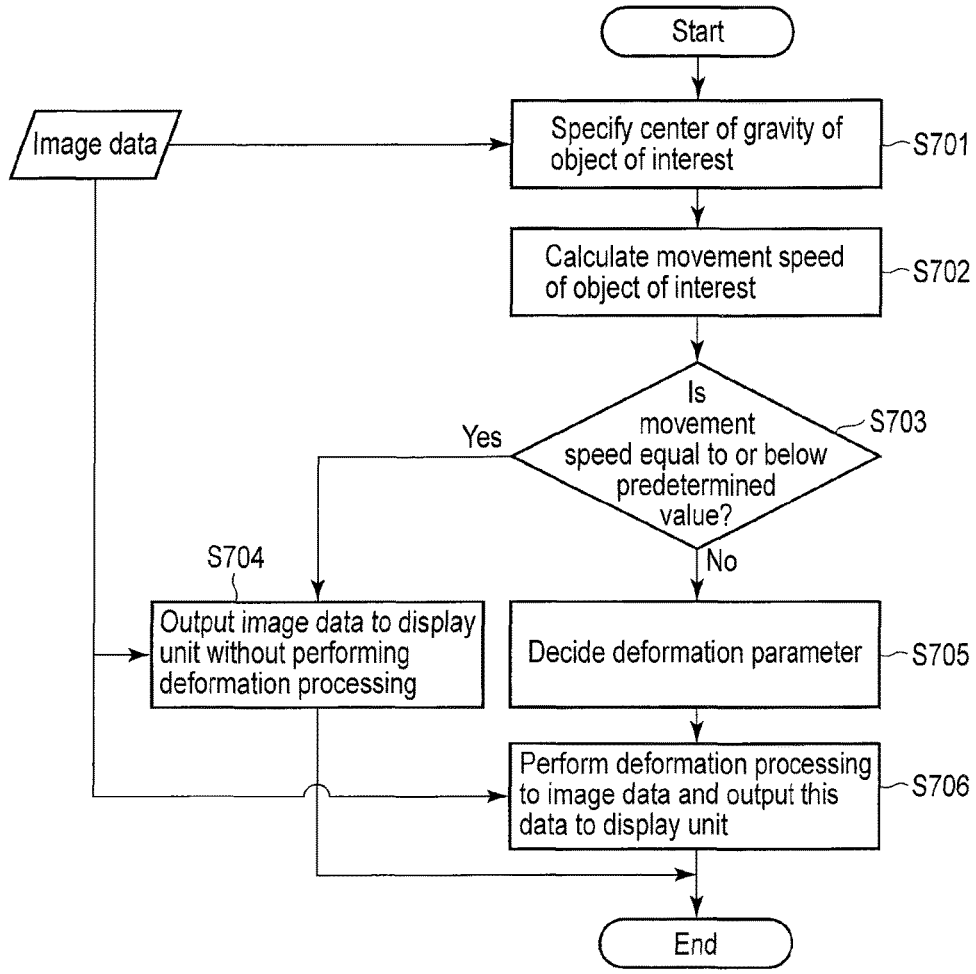
FIG. 44 is a flowchart showing a processing example of an image processing apparatus according to a sixth embodiment of the present invention.

FIG. 44 shows a flowchart for explaining an operation of an image processing apparatus 110 according to this embodiment. As shown in the drawing, processing of a step S701 to a step S703 according to this embodiment is equal to the processing of the step S501 to the step S503 in the fourth embodiment. However, the change value decision unit 116 in the fourth embodiment is substituted by the deformation parameter decision unit 117 in this embodiment.

When the frame-out accuracy judgment unit 114 determines that a distance between the center of the image range and the center of gravity of the object of interest is equal to or below a predetermined value at a step S703, the deformation parameter decision unit 117 decides not to perform the deformation processing with respect to the input image data D. In response to this decision, the display image processing unit 118 directly outputs the image data D to the display unit 126 as changed image data D'. As a result, the display unit 126 displays an image based on the changed image data D' which is the image data D.

When it is determined that a temporal change of a position of the object of interest is not equal to or below a predetermined value at the step S703, the deformation parameter decision unit 117 decides a deformation parameter of the deformation processing performed with respect to a display image at a step S705. In this embodiment, like the third embodiment, processing of shortening a rear side in a direction along which the object of interest is moving in a contour of a rectangular display image to deform the display image into a trapezoidal shape is executed as the deformation processing. Further, a length of the side to be shortened is reduced as a movement speed of the object of interest is increased. That is, the deformation parameter decision unit 117 decides which one of four sides, i.e., upper, lower, left, and right sides is the side to be shortened and a reduction ratio for the side to be shortened as deformation parameters and outputs this decision result to the display image processing unit 118. In this manner, for example, the temporal change of the position of the object of interest functions as a frame-out accuracy representing an accuracy that the object of interest deviates from the image range.

Like the step S406 in the third embodiment, the display image processing unit 118 performs the deformation processing with respect of an image of the input image data D based on the deformation parameters for the display image decided by the deformation parameter decision unit 117. That is, the display image processing unit 118 shortens the side to be reduced, which has been decided by the deformation parameter decision unit 117 with respect to the rectangular image based on the image data D, at the reduction ratio decided by the deformation parameter decision unit 117, thereby deforming the entire image to be distorted into a trapezoidal shape. In this manner, the display image processing unit 118 creates deformed image data D' representing this image. The display image processing unit 118 outputs the created deformed image data D' to the display unit 126. Any other structure and configuration of the digital camera according to this embodiment are equal to those in the first embodiment.

Figure 45A:
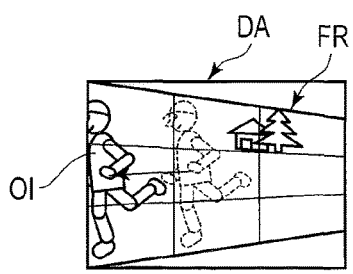
FIG. 45A is a view showing an image example created after the change processing executed by the image processing apparatus according to the sixth embodiment of the present invention, which is an example when a movement speed of an object of interest is high.
Figure 45B:
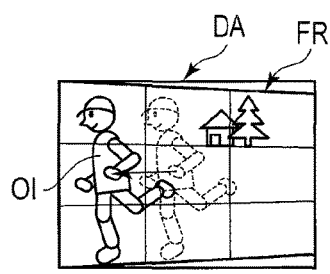
FIG. 45B is a view showing an image example created after the change processing executed by the image processing apparatus according to the sixth embodiment of the present invention, which is an example when the movement speed of the object of interest is low.

According to this embodiment, the display unit 126 displays such an image as shown in FIG. 45A or FIG. 45B, for example. That is, when the object of interest OI is moving in the left direction, the right side corresponding to the rear side of the object of interest is shortened, and an image is obtained by distorting the entire image so that a frame FR of the image becomes trapezoidal. Here, when a movement speed of the object of image OI is relatively high, a shape of the frame FR of the image is in a state that two parallel sides are greatly different from each other. On the other hand, when the movement speed of the object of interest OI is relatively low, as shown in FIG. 45B, a difference between lengths of the two parallel sides in the frame FR of the image is smaller than that in FIG. 45A.

In this embodiment, when the object of interest is moving, the contour of the image is deformed in accordance with the speed. As a result, a user who holds the digital camera and confirms framing while observing the display unit 126 pans the digital camera to trace the movement of the object of interest so that the distortion involved by expansion/shrinkage of the image can be reduced. When the relative movement of the object of interest is reduced with respect to a display image, the image displayed in the display unit 126 enters an undeformed state. As described above, according to this embodiment, the digital camera having the image processing apparatus 110 can guide the user to trace the moving object of interest so that the object of interest can be always placed within in the display area. It is to be noted that the display image displayed in the digital camera represents a result of predicting whether the frame-out of the object of interest occurs. Therefore, according to this embodiment, the frame-out of the object of interest can be avoided.

Furthermore, in this embodiment, like the first modification of the third embodiment, an image can be expanded or shrunk in a predetermined direction in accordance with a movement speed of the object of interest as shown in FIG. 32B like the first modification of the third embodiment. Moreover, an image may be expanded or shrunk in a predetermined direction in accordance with a movement speed of the object of interest while a contour of the image is deformed as shown in FIG. 33 like the second modification of the third embodiment. In any case, the same effect as that of each modification of the third embodiment can be obtained.

Additionally, this embodiment and its various modifications can be combined with the fourth embodiment and/or the fifth embodiment and used. That is, the change processing may be carried out like the fourth embodiment and the deformation processing may be effected like this embodiment with respect to a part of an image. In this case, the change value decision unit 116 in the fourth embodiment or the deformation parameter decision unit 117 in this embodiment has functions of both the change value decision unit 116 and the deformation parameter decision unit 117, and the display image processing unit 118 performs the change of image according to the fourth embodiment and the deformation processing according to this embodiment with respect to the image data D. As a result, for example, such an image as depicted in FIG. 34 is created. Likewise, the image processing apparatus 110 can be configured to perform the deformation processing and add the effect to an image so that such an image as depicted in FIG. 35 can be created by combining this embodiment with the fifth embodiment. Additionally, the image processing apparatus 110 may be configured to create such an image as depicted in FIG. 36 by combining the change processing according to the fourth embodiment and the addition of the effect according to the fifth embodiment with the deformation processing according to this embodiment, for example.

Seventh Embodiment

A seventh embodiment according to the present invention will now be described. Here, differences from the first and fourth embodiments will be described, and like reference numerals denote like parts to omit explanation thereof. Like the first embodiment, a digital camera according to this embodiment has the configuration shown in FIG. 1. A change value decision unit 116 according to this embodiment decides various kinds of parameters of change processing performed with respect to image data D based on a frame-out accuracy obtained by a frame-out accuracy judgment unit 114 like the first embodiment. A display image processing unit 118 carries out the change processing with respect to the image data D based on the decision of the change value decision unit 116.

In the first embodiment, an accuracy related to the occurrence of frame-out of the object of interest from the image range is determined based on a distance between the center of the image range and the center of gravity of the object of interest as a reference. Further, in the fourth embodiment, an accuracy related to the occurrence of frame-out of the object of interest from the image range is determined based on a relative movement speed of the object of interest with a display image determined as a reference. On the other hand, in this embodiment, an accuracy related to the occurrence of frame-out of the object of interest from the image range is determined based on parameters including both a distance between the center of the image range and the center of gravity of the object of interest and a relative movement speed of the object of interest with the display image determined as the reference.

Figure 46:
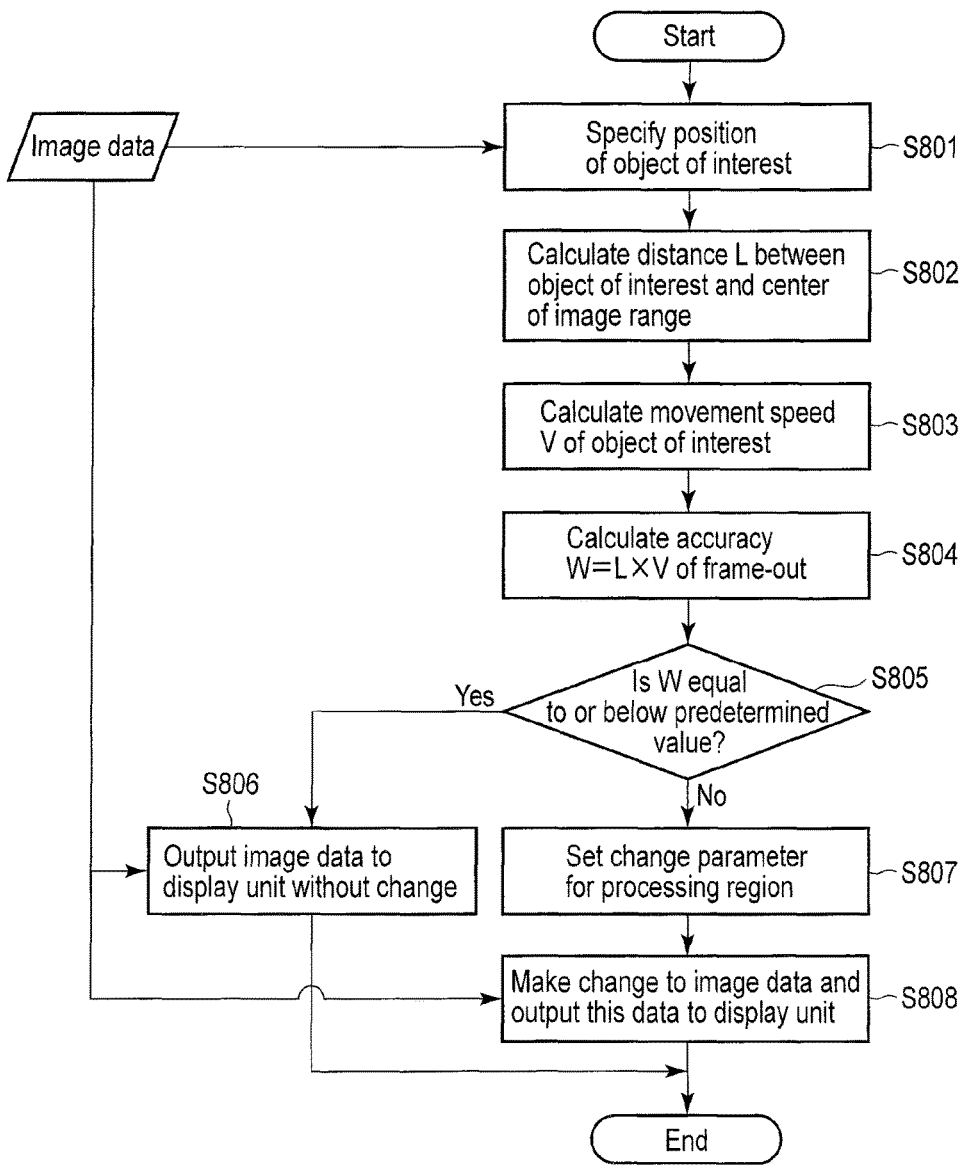
FIG. 46 is a flowchart showing a processing example of an image processing apparatus according to a seventh embodiment of the present invention.

FIG. 46 shows a flowchart for explaining an operation of the image processing apparatus 110 according to this embodiment. As shown in this drawing, like the step S101 in the first embodiment, an object-of-interest detection unit 112 receives image data D created by an image signal generation unit 124 at a step S801. The object-of-interest detection unit 112 specifies a position of the object of interest in an image represented by the image data D and outputs the specified position of the object of interest to the frame-out accuracy judgment unit 114.

At a step S802, the frame-out accuracy judgment b unit 114 calculates a distance L between the center of an image range of the image and the center of gravity of the object of interest based on the position of the object of interest specified by the object-of-interest detection unit 112. Furthermore, at a step S803, the frame-out accuracy judgment unit 114 calculates a temporal change of the position of the object of interest in the image, i.e., a relative movement speed V of the object of interest (which will be simply referred to as a movement speed V hereinafter) based on the position of the object of interest specified by the object-of-interest detection unit 112.

At a step S804, the frame-out accuracy judgment unit 114 calculates an accuracy W related to the occurrence of frame-out of the object of interest from the image range as a product of the distance L and the movement speed V, i.e., $W=L \times V$.

At a step S805, the frame-out accuracy judgment unit 114 judges whether the accuracy W of occurrence of the frame-out is equal to or below a predetermined value. When the accuracy W of occurrence of the frame-out is equal to or below the predetermined value, the frame-out accuracy judgment unit 114 determines that the frame-out does not occur and outputs its judgment result to the change value decision unit 116. Like the step S104 in the first embodiment, at a step S806, the change value decision unit 116 decides not to perform the change processing with respect to the input change data L. The display image processing unit 118 outputs the image data D which is not changed to a display unit 126 as changed image data D'. As a result, the display unit 126 displays an image based on the changed image data D' which is the image data D.

On the other hand, when it is determined that the accuracy W of occurrence of the frame-out is not equal to or below the predetermined value at the step S805, the change value decision unit 116 sets a parameter concerning a change of a processing region where the display image is changed at a step S807. Here, description will be given as to an example of decreasing luminance of the processing region concerning a position symmetrical to a position of the object of interest with respect to the center of the image range in the display image. Here, an area of the processing region where luminance of the display image is decreased is enlarged as the accuracy W of occurrence of the frame-out is increased. In this case, the change value decision unit 116 decides the processing region where the luminance of the display image is decreased at the step S807. The change value decision unit 116 outputs the decided processing region to the display image processing unit 118. Additionally, the change value decision unit 116 outputs a type of the change and an amount of the change, e.g., a decrease in luminance as type of the change and a predetermined amount as an amount of decreasing the luminance to the display image processing unit 118.

At a step S808, the display image processing unit 118 carries out the change processing with respect to input image data. For example, the luminance of the processing region decided by the change value decision unit 116 is decreased. This example shows a case that the luminance of the processing region is decreased in a gradation pattern so that an end side of the image range can have extremely low luminance and a central side of the image range can have relatively high luminance. Changed image data D' after the change processing is output to the display unit 126. Any other structure and operation of the digital camera according to this embodiment are equal to those in the first embodiment.

According to this embodiment, the display unit 126 displays such images as shown in FIG. 47, for example. That is, when the distance L between the center of the image range and the object of interest is large and the movement speed V of the object of interest is high in the display image, the accuracy W related to the occurrence of frame-out of the object of interest from the image range is high, and hence the processing region where the luminance in the display image is decreased is wide. Further, when the distance L is small and the movement speed V is low, the accuracy W is small, and hence the processing region where the luminance is lowered is narrow. When the distance L is small and the movement speed V is high, the accuracy W is moderate, and hence the processing region where the luminance is decreased is moderate. Furthermore, even when the distance L is large and the movement speed V is low, the accuracy W is moderate, and hence the processing region where the luminance is lowered is moderate.

According to this embodiment, an image in the processing region is changed in accordance with a product of a value concerning a position of the object of interest and a value concerning the movement speed. As a result, a user who holds the digital camera and confirms framing while observing the display unit 126 is guided to pan the digital camera so that the change of the image can be suppressed and relative movement of the object of interest with respect to the display image can become small in a direction which the object of interest moves to the center of the display area. Since the product of the value concerning the position of the object of interest and the value concerning the movement speed is determined as the accuracy related to the occurrence of frame-out of the object of interest from the image range, the accuracy can be more precisely evaluated as compared with a case that the accuracy related to the occurrence of frame-out of the object of interest from the image range is evaluated based on the position of the object of interest alone or the movement speed of the object of interest alone.

It is to be noted that the accuracy W related to the occurrence of frame-out of the object of interest from the image range is calculated as the simple product of the distance L and the movement speed V ($W=L \times V$) in the above description, but any kind of calculation can be used as long as the accuracy W is a function having a positive correlation of the distance L and the movement speed V in an arithmetic operation using L and V as arguments. For example, $W = A \times L^T \times V^S$ (A, T, and S are constants, respectively), a polynomial of L and V, and others can be adopted.

Furthermore, the predetermined value used in the judgment at the step S805 may be determined as 0, and a threshold value does not have to be provided for the judgment on whether the change processing is to be carried out.

Moreover, although the processing executed with respect to a display image is a change of luminance and a value that is changed in accordance with the accuracy W of the frame-out is an area of the processing region in the above description, the processing performed with respect to a display image may be filling with a black color, a change of resolution, sharpness, contrast, chroma, and a hue, or combinations of these factors, and the value that is changed in accordance with the accuracy W of the frame-out may be an amount of change of luminance, resolution, sharpness, contrast, chroma, and a hue.

For instance, FIG. 48 shows a display image example when an amount of change of luminance is changed in accordance with the accuracy W. In this drawing, when the distance L between the center of the image range and the object of interest is large and the movement speed V of the object of interest is high in the display image, the accuracy W related to the occurrence of frame-out of the object of interest from the image range is increased, and hence an amount of decrease in luminance of the processing region in the display image is large. Additionally, when the distance L is small and the movement speed V is low, the accuracy W is small, and hence the amount of decrease in luminance of the processing region is small. When the distance L is small and the movement speed V is high and when the distance L is large and the movement speed V is low, since the accuracy W is moderate, the amount of decrease in luminance of the processing region is moderate.

Eighth Embodiment

An eighth embodiment according to the present invention will now be described. Here, differences from the second and seventh embodiments will be described, and like reference numerals denote like parts to omit explanation thereof. A digital camera according to this embodiment has a configuration shown in FIG. 15 like the second embodiment. An effect decision unit 115 according to this embodiment decides various kinds of parameters of an effect added to image data D based on a frame-out accuracy obtained by a frame-out accuracy decision unit 114 like the second embodiment. A display image processing unit 118 adds the effect to the image data D based on the decision of the effect decision unit 115.

In this embodiment, the frame-out accuracy judgment unit 114 decides an accuracy related to the occurrence of frame-out of the object of interest from the image range based on parameters including both a distance between the center of gravity of the object of interest and the center of the image range and a movement speed of the object of interest in the image range represented by the image data D like the seventh embodiment.

Figure 49:
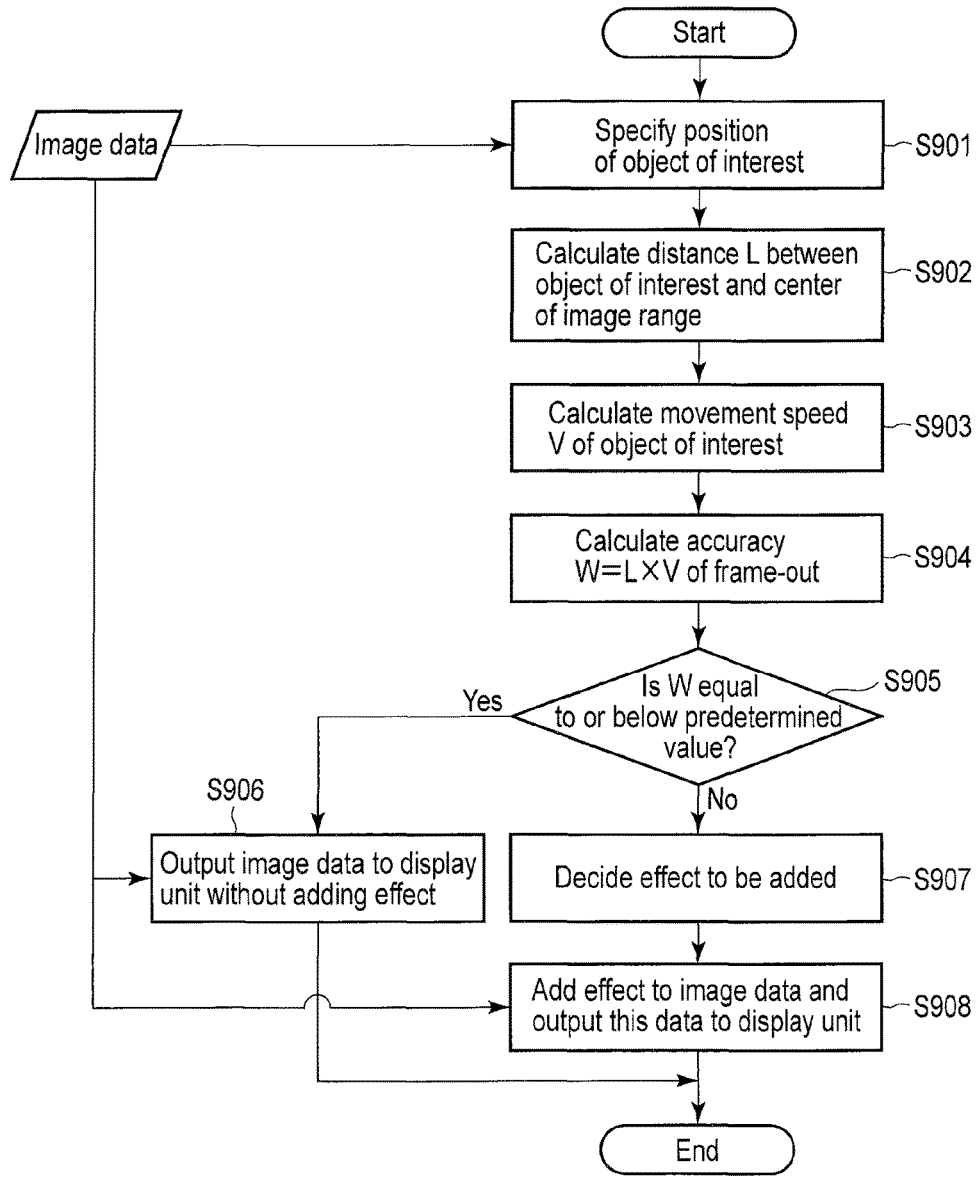
FIG. 49 is a flowchart showing a processing example of an image processing apparatus according to an eighth embodiment of the present invention.

FIG. 49 shows a flowchart for explaining an operation of an image processing apparatus 110 according to this embodiment. As shown in this drawing, processing of a step S901 to a step S905 according to this embodiment is equal to that of the step S801 to the step S805 according to the seventh embodiment, respectively. However, the change value decision unit 116 according to the seventh embodiment is substituted by an effect decision unit 115 in this embodiment.

When the frame-out accuracy decision judgment unit 114 determines that a distance between the center of the image range and the center of gravity of the object of interest is equal to or below a predetermined value at a step S905, the effect decision unit 115 decides not to add the effect to the input image data D. In response to this decision, the display image processing unit 118 directly outputs the image data D to the display unit 126 as changed image data D'. As a result, the display unit 126 displays an image based on the changed image data D' which is the image data D.

When it is determined that an accuracy W of occurrence of the frame-out is not equal to or below the predetermined value at the step S905, the frame-out accuracy judgment unit 114 determines that the frame-out occurs and outputs this judgment result to the effect decision unit 115. The effect decision unit 115 decides the effect to be added to a display image at a step S907. Here, an ellipse is displayed with the center of gravity of the object of interest at the center, and a line pattern of this ellipse is changed in accordance with the accuracy W of the frame-out. The effect decision unit 115 outputs the decided effect to the display image processing unit 118.

At a step S908, the display image processing unit 118 adds the effect to the input image data. Changed image data D' having the effect added thereto is output to a display unit 126. Any other structure and operation of the digital camera according to this embodiment are equal to those in the second embodiment.

Figure 50:
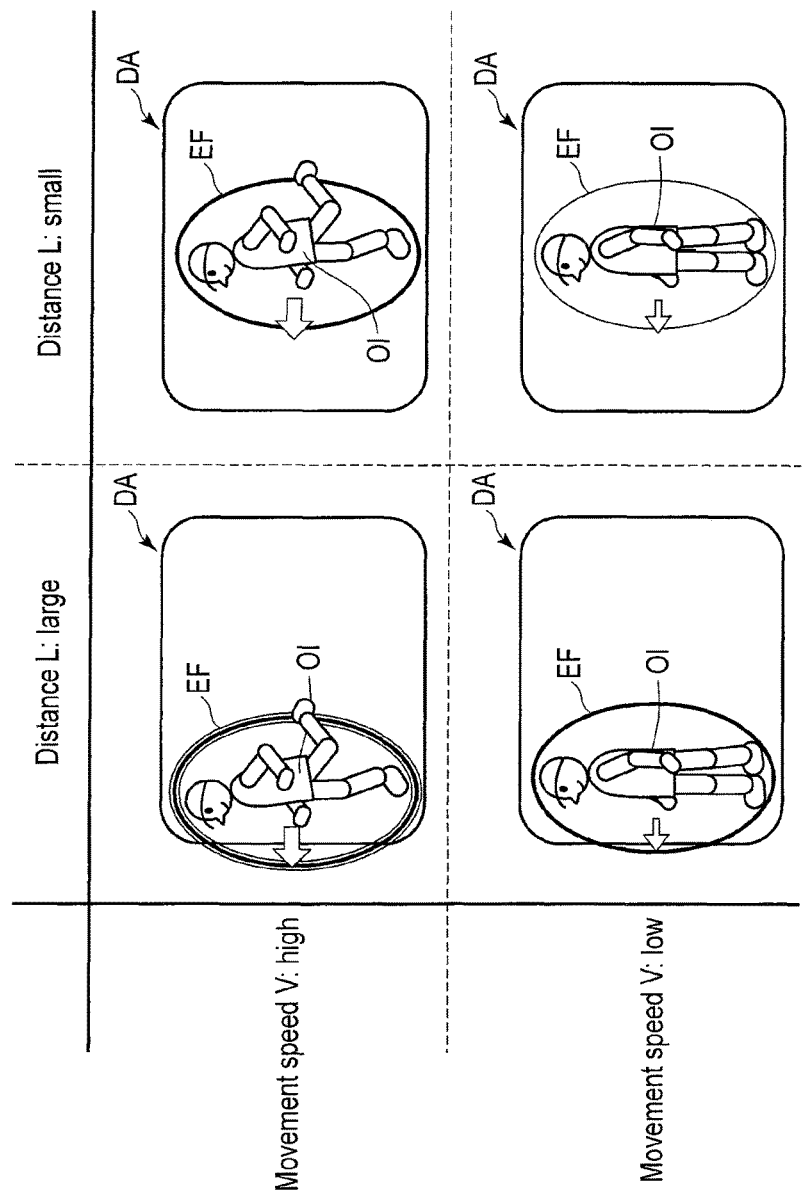
FIG. 50 is a view showing an image example after adding an effect created by the image processing apparatus according to the eighth embodiment of the present invention.

According to this embodiment, the display unit 126 displays such an image as depicted in FIG. 50. That is, when a distance L between the center of the image range and the object of interest OI is large and a movement speed V of the object of interest OI is high in an display image, since an accuracy W related to the occurrence of frame-out of the object of interest OI from the image range is high, an ellipse as the effect EF is indicated by a bold line in the display image. Further, when the distance L is small and the movement speed V is low, the accuracy W is low, the ellipse as the effect EF is indicated by a thin line. When the distance L is small and the movement speed V is high, since the accuracy W is moderate, the line of the ellipse as the effect EF is moderate. Furthermore, when the distance L is large and the movement speed V is low, since the accuracy W is likewise moderate, the line of the ellipse as the effect EF is moderate.

According to this embodiment, the effect displayed in the image varies depending on a product of a value concerning a position of the object of interest and a value concerning the movement speed. A user who holds the digital camera and confirms framing while observing the display unit 126 is guided to pan the digital camera in a direction that the object of interest moves to the center of a display area and a direction that relative movement of the object of interest with respect to the display image becomes small so that the effect can be suppressed. Since the product of the value concerning the position of the object of interest and the value concerning the movement speed is determined as the accuracy related to the occurrence of frame-out of the object of interest from the image range, the image processing apparatus 110 can precisely evaluate the accuracy as compared with a case that the accuracy related to the occurrence of frame-out of the object of interest from the image range is evaluated based on the position of the object of interest alone or the movement speed of the object of interest alone.

It is to be noted that, like the seventh embodiment, as the accuracy W related to the occurrence of frame-out of the object of interest from the image range, any calculation can be used as long as the accuracy W is a function having a position correlation with respect to the distance L and the movement speed V in an arithmetic operation using L and V as arguments. Moreover, the predetermined value used in the judgment of the step S905 may be set to 0, and a threshold value does not have to be provided for the judgment on whether change processing is to be effected.

Moreover, a pattern such as a color or density of the elliptic line as the effect may be changed in accordance with the accuracy W, or an area of a portion surrounded by the ellipse as the effect may be changed. Additionally, the effect is not restricted to the ellipse, and it may be a line parallel to a contour line and/or a line along the contour line of the object of interest, and any other shape may be adopted. Further, the effect may be changed with time.

Furthermore, this embodiment and its various kinds of modifications can be combined with the seventh embodiment to be used. That is, like the seventh embodiment, the change processing may be performed and the effect may be added to a part of an image. In this case, the change value decision unit 116 in the seventh embodiment or the effect decision unit 115 in this embodiment has functions of both the effect decision unit 115 and the change value decision unit 116, and the display image processing unit 118 makes a change of an image according to the seventh embodiment and addition of the effect according to the eighth embodiment with respect to the image data D. As a result, for example, an image having the effect EF added thereto and having the processing region PR subjected to the change processing is created as shown in FIG. 26, for example.

Ninth Embodiment

A ninth embodiment according to the present invention will now be described. Here, differences from the third and seventh embodiments will be described, and like reference numerals denote like parts to omit explanation thereof. A digital camera according to this embodiment has a configuration depicted in FIG. 27 like the third embodiment. A deformation parameter decision unit 117 according to this embodiment decides various kinds parameters of deformation processing performed with respect to image data D based on a frame-out accuracy obtained by a frame-out accuracy decision unit 114 like the third embodiment. A display image processing unit 118 carries out the deformation processing on the image data D based on the decision of the deformation parameter decision unit 117.

In this embodiment, the frame-out accuracy judgment unit 114 decides an accuracy related to the occurrence of frame-out of the object of interest from the image range based on parameters including both a distance between the center of gravity of the object of interest and the center of the image range and a movement speed of the object of interest in the image range represented by the image data D like the seventh embodiment.

FIG. 51 shows a flowchart for explaining an operation of an image processing apparatus 110 according to this embodiment. As shown in this drawing, processing of a step S1001 to a step S1005 according to this embodiment is equal to that of the step S801 to the step S805 according to the seventh embodiment, respectively. However, the change value decision unit 116 according to the seventh embodiment is substituted by a deformation parameter decision unit 117 in this embodiment.

When the frame-out accuracy decision judgment unit 114 determines that a distance between the center of the image range and the center of gravity of the object of interest is equal to or below a predetermined value at a step S1005, the deformation parameter decision unit 117 decides not to perform the deformation processing on the input image data D at a step S1006. In response to this decision, the display image processing unit 118 directly outputs the image data D to a display unit 126 as changed image data D'. As a result, the display unit 126 displays an image based on the changed image data D' which is the image data D.

When it is determined that the accuracy W that the frame-out occurs is not equal to or below the predetermined value in the judgment of the step S1005, the deformation parameter decision unit 117 sets a deformation parameter concerning deformation applied to a display image at a step S1007. Here, like the third embodiment, as the deformation processing, there is carried out processing of shortening a side opposing a side which is the closest to the object of interest in a contour of a rectangular display image to deform the entire display image into a trapezoidal shape. Further, the side to be shortened is reduced as the accuracy W that the frame-out occurs is increased. That is, the deformation parameter decision unit 117 decides as deformation parameters which one of fours sides, i.e., upper, lower, left, and right sides is the side to be shortened and a ratio of reducing the side to be shortened. The deformation parameter decision unit 117 outputs the decided deformation parameters to the display image processing unit 118.

At a step S1008, the display image processing unit 118 performs the deformation processing with respect to the input image data. The display image processing unit 118 outputs deformed image data D' after the deformation processing to the display unit 126. Any other configuration and operation of the digital camera according to this embodiment are equal to those in the third embodiment.

Figure 52:
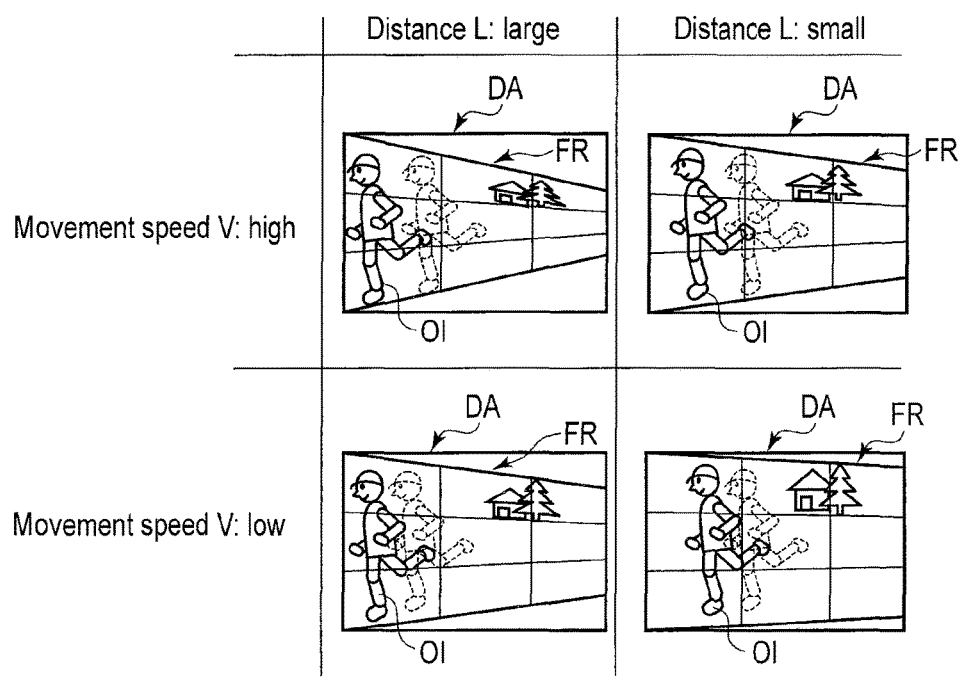
FIG. 52 is a view showing an image example after deformation processing created by the image processing apparatus according to the ninth embodiment of the present invention.

According to this embodiment, the display unit 126 displays such an image as depicted in FIG. 52. That is, when a distance L between the center of the image range and the object of interest OI is large and a movement speed V of the object of interest is high in an display image, since an accuracy W related to the occurrence of frame-out of the object of interest OI from the image range is high, distortion of the image is large. Further, when the distance L is small and the movement speed V is low, the accuracy W is low, and hence the distortion of the image is small. When the distance L is small and the movement speed V is high, since the accuracy W is moderate, the distortion of the image is moderate. Furthermore, when the distance L is large and the movement speed V is low, since the accuracy W is likewise moderate, the distortion of the image is moderate.

According to this embodiment, the image is deformed in accordance with a product of a value concerning a position of the object of interest and a value concerning the movement speed. As a result, a user who holds the digital camera and confirms framing while observing the display unit 126 is guided to pan the digital camera in a direction such that the object of interest moves to the center of a display area and a direction such that relative movement of the object of interest with respect to the display image becomes small so that the deformation of the image can be suppressed. Since the product of the value concerning the position of the object of interest and the value concerning the movement speed is determined as the accuracy related to the occurrence of frame-out of the object of interest from the image range, the accuracy can be more precisely evaluated as compared with a case that the accuracy related to the occurrence of frame-out of the object of interest from the image range is evaluated based on the position of the object of interest alone or the movement speed of the object of interest alone.

It is to be noted that, like the seventh embodiment, as the accuracy W related to the occurrence of frame-out of the object of interest from the image range, any calculation can be used as long as the accuracy W is a function having a positive correlation with respect to the distance L and the movement speed V in an arithmetic operation using L and V as arguments. Moreover, the predetermined value used in the judgment of the step S1005 may be set to 0, and a threshold value does not have to be provided for the judgment on whether deformation processing is to be effected.

Additionally, in the above description, in the contour of the rectangular display image, the side opposing the side which is the closest to the object of interest is shortened to deform the entire image into the trapezoidal shape like the third embodiment. The present invention is not restricted thereto, and the side corresponding to the rear side of a moving direction of the object of interest may be shortened to deform the display image into the trapezoidal shape. Further, like the first modification of the third embodiment, the image may be expanded or shrunk in a predetermined direction in accordance with a position of the object of interest, or the image may be expanded or shrunk in a predetermined direction in accordance with a moving direction. Furthermore, the image may be expanded or shrunk in a predetermined direction while deforming the contour of the image in accordance with a position or a moving direction of the object of interest like the second modification of the third embodiment.

Moreover, this embodiment and its various modifications can be combined with the seventh embodiment and/or the eighth embodiment to be used. That is, a part of an image can be subjected to the change processing like the seventh embodiment and the deformation processing like this embodiment. In this case, the change value decision unit 116 in the seventh embodiment or the deformation parameter decision unit 117 in this embodiment has functions of both the change value decision unit 116 and the deformation parameter decision unit 117, and the display image processing unit 118 executes the change processing for an image according to the seventh embodiment and the deformation processing according to this embodiment with respect to the image data D. As a result, for example, such an image as depicted in FIG. 34 is created. Likewise, the image processing apparatus 110 may be configured in such a manner that the deformation processing can be executed and the effect can be added to an image to create such an image as depicted in FIG. 35 by combining this embodiment with the eighth embodiment. Furthermore, the image processing apparatus 110 may be configured to create such an image as depicted in FIG. 36 by combining the change processing according to the seventh embodiment, the addition of the effect according to the eighth embodiment, and the deformation processing according to the ninth embodiment, for example.

10th Embodiment

A 10th embodiment according to the present invention will now be described. Here, a difference from the seventh embodiment will be described, and like reference numerals denote like parts to omit explanation thereof. In the seventh embodiment, the accuracy W related to the occurrence of frame-out of the object of interest from the image range as one parameter including parameters of both a distance L between the center of the image range and the center of gravity of the object of interest and a relative movement speed V of the object of interest based on a display image is represented when performing image change processing on the image range. On the other hand, in this embodiment, a first parameter is assigned to the distance L, and a second parameter is assigned to the relative movement speed V.

Figure 53:
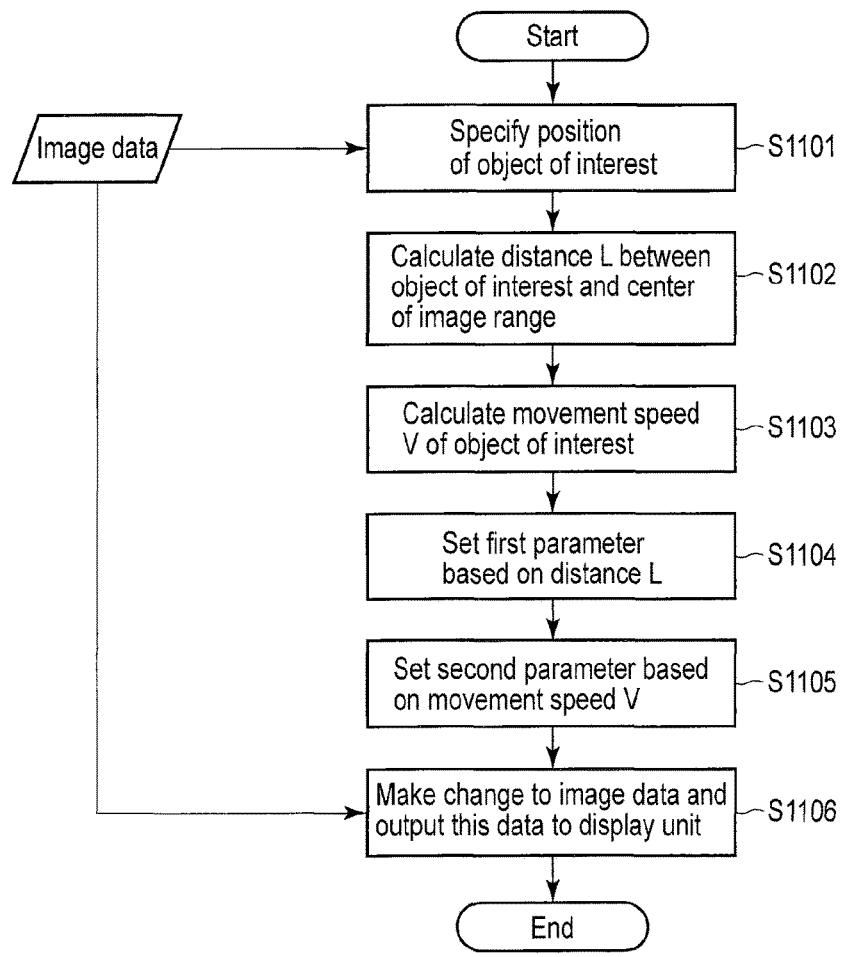
FIG. 53 is a flowchart showing a processing example of an image processing apparatus according to a 10th embodiment of the present invention.

FIG. 53 shows a flowchart for explaining an operation of an image processing apparatus 110 according to this embodiment. As shown in the drawing, like the step S801 in the seventh embodiment, an object-of-interest detection unit 112 receives image data D created by an image signal generation unit 124 at a step S1101. The object-of-interest detection unit 112 specifies a position of the object of interest in an image represented by the image data D and outputs the specified position of the object of interest to the frame-out accuracy judgment unit 114.

At a step S1102, the frame-out accuracy judgment unit 114 calculates a distance L between the center of an image range of the image and the center of gravity of the object of interest based on the position of the object of interest specified by the object-of-interest detection unit 112. Furthermore, at a step S1103, like the step S803 in the seventh embodiment, the frame-out accuracy judgment unit 114 calculates a temporal change V of the position of the object of interest in the image, i.e., a relative movement speed V of the object of interest (which will be simply referred to as a movement speed V hereinafter) based on the position of the object of interest specified by the object-of-interest detection unit 112.

A change value decision unit 116 sets the first parameter concerning a change that is made to a processing region of a display image based on the calculated distance L at a step S1104. Further, at a step S1105, the change value decision unit 116 sets the second parameter concerning a change that is made to the processing region of the display image based on the calculated movement speed V. The change value decision unit 116 outputs the set first parameter and second parameter to a display image processing unit 118.

The display image processing unit 118 performs change processing based on the first parameter and the second parameter with respect to the input image data D. The display image processing unit 118 outputs changed image data D' after the change processing to a display unit 126. Any other structure and operation of the digital camera according to this embodiment are equal to those in the seventh embodiment.

Here, for example, the change made to the display image is luminance of the display image, the first parameter that is changed in accordance with the distance L is an area of the processing region where the luminance is decreased, and the second parameter that is changed in accordance with the movement speed V is an amount of change of the luminance to be decreased. In this case, at the step S1104, an area of the processing region is set in such a manner that the area of the processing region is enlarged as the distance L is increased. Furthermore, at the step S1105, the amount of decreasing the luminance to be changed is increased as the movement speed V rises. As a result, for example, such a display image as shown in FIG. 54 is created. That is, the area of the processing region is relatively large when the distance L is relatively large, and the area of the processing region is relatively small when the distance L is relatively small. Moreover, the amount of change is relatively large (dark) when the movement speed V is relatively high, and the amount of change is relatively small (bright) when the movement speed V is relatively low.

According to this embodiment, since the change based on the distance L and the change based on the movement speed V are made to the display image, a user can simultaneously perceive information concerning the distance L and information concerning the movement speed V by observing the display image.

In the above-described example, although both the change concerning the first parameter and the change concerning the second parameter are described as the change of luminance of the display image, they may be the change of any one of resolution, sharpness, contrast, chroma, and a hue. Moreover, the change concerning the first parameter and the change concerning the second parameter are not the same type of change, and they can be selected from filling with a black color, and a change of luminance, resolution, sharpness, contrast, chroma, and a hue. In this case, either an area of the processing region or an amount of change can be used for each of the first parameter and the second parameter.

For example, when the change concerning the first parameter is filling with a black color, or a change of luminance, resolution, sharpness, contrast, chroma, or a hue and the change concerning the second parameter is one of filling with a black color, or a change of luminance, resolution, sharpness, contrast, chroma, or a hue excluding the change concerning the first parameter, a combination of the first parameter and the second parameter may be any one of the following parameters. That is, the first parameter may be an area of the processing region, and the second parameter may be an area of the processing region. Moreover, the first parameter may be an area of the processing region, and the second parameter may be an amount of change. Additionally, the first parameter may be an amount of change, and the second parameter may be an area of the processing region. Further, the first parameter may be an amount of change, and the second parameter may be an amount of change. For example, the change concerning the first parameter may be luminance, the first parameter may be an area of the processing region, the change concerning the second parameter may be resolution, and the second parameter may be amount of resolution. That is, the luminance of the processing region whose area is changed in accordance with the distance L can be decreased by a predetermined amount, and the resolution of a predetermined processing region can be decreased by an amount of change associated with the movement speed V. Other combinations are processed in the same manner.

However, when filling with the black color is carried out, image information of this portion is lost, hence a user may not have realized, even though this portion is changed. Therefore, when the processing region that is filled with the black color is wide, the user will not notice the other change even though this filling is combined with any other parameter. Additionally, for example, since the user is unlikely to identify a difference between, e.g., resolution and sharpness, it is desirable to avoid using the resolution and the sharpness for the first parameter and the second parameter. As described above, facilitation of recognition by the user differs in the display image depending on each combination of the change parameters. Therefore, it is desirable to combine the change parameters that can be readily recognized by the user. For example, it is desirable to use combinations that can be easily recognized by the user, e.g., luminance and sharpness, chroma and sharpness, luminance and resolution, chroma and resolution, contrast and resolution, chroma and contrast, and others.

11th Embodiment

An 11th embodiment according to the present invention will now be described. Here, a difference from the second and 10th embodiment will be described, and like reference numerals denote like parts to omit explanation thereof. A digital camera according to this embodiment has a configuration shown in FIG. 15 like the second embodiment. An effect decision unit 115 according to this embodiment decides various kinds of parameters of an effect added to image data D based on a frame-out accuracy obtained by a frame-out accuracy judgment unit 114 like the second embodiment. A display image processing unit 118 adds the effect to the image data D based on the decision of the effect decision unit 115.

In this embodiment, like the 10th embodiment, the frame-out accuracy decision unit 114 assigns a first parameter to a distance L between the center of gravity of an object of interest and the center of image range and assigns a second parameter to a movement speed V of the object of interest in the image range represented by the image data D.

Figure 55:
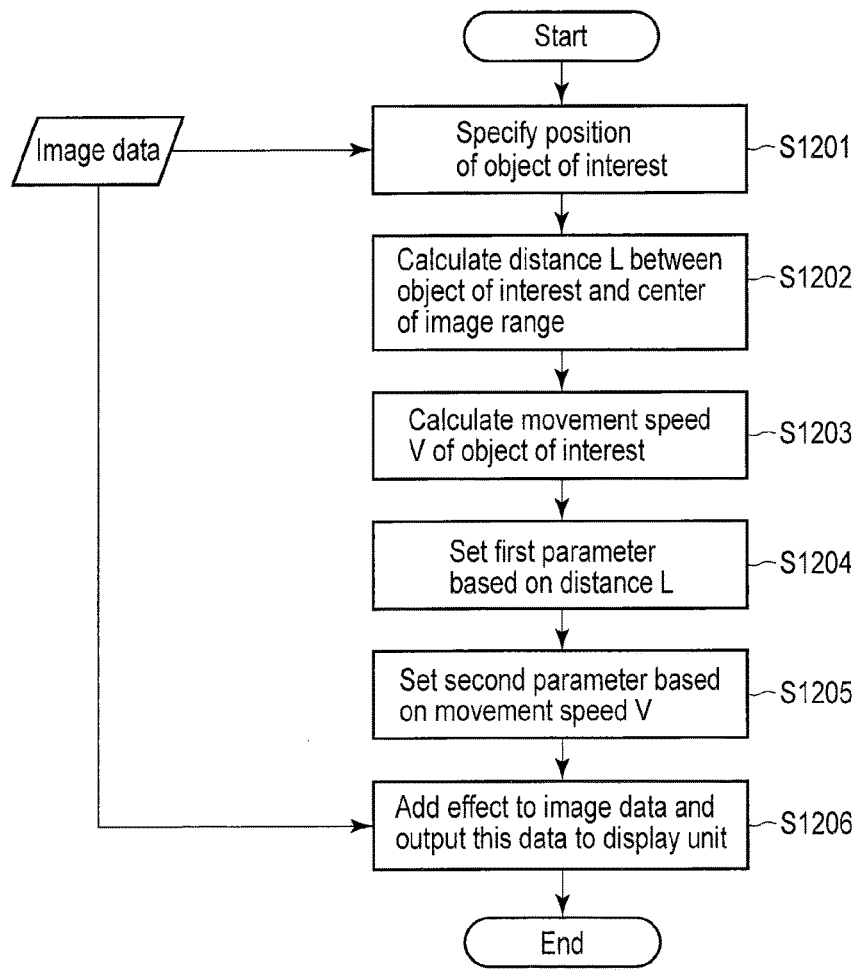
FIG. 55 is a flowchart showing a processing example of an image processing apparatus according to an 11th embodiment of the present invention.

FIG. 55 shows a flowchart for explaining an operation of an image processing apparatus 110 according to this embodiment. As shown in the drawing, processing of a step S1201 to a step S1203 according to this embodiment is equal to processing of the step S1101 to the step S1103 according to the 10th embodiment. However, the change value decision unit 116 in the 10th embodiment is substituted by the effect decision unit 115 in this embodiment.

At a step S1204, the effect decision unit 115 sets the first parameter concerning a change that is made to a processing region of a display image based on the calculated distance L. Furthermore, the effect decision unit 115 sets the second parameter concerning a change that is made to the processing region of the display image at a step S1205. The effect decision unit 115 outputs the set first parameter and second parameter, i.e., information concerning effects to the display image processing unit 118. In this manner, for example, the distance L between the center of gravity of the object of interest and the center of the image range and the movement speed V of the object of interest function as a frame-out accuracy indicative of an accuracy that a position of interest deviates from the image range.

At a step S1206, the display image processing unit 118 adds an effect to an image of the input image data based on the information concerning the effect including the first parameter and the second parameter to create changed image data D'. The display image processing unit 118 outputs the changed image data D' after the change processing to a display unit 126. Any other structure and operation of the digital camera according to this embodiment are equal to those in the second embodiment.

Figure 56:
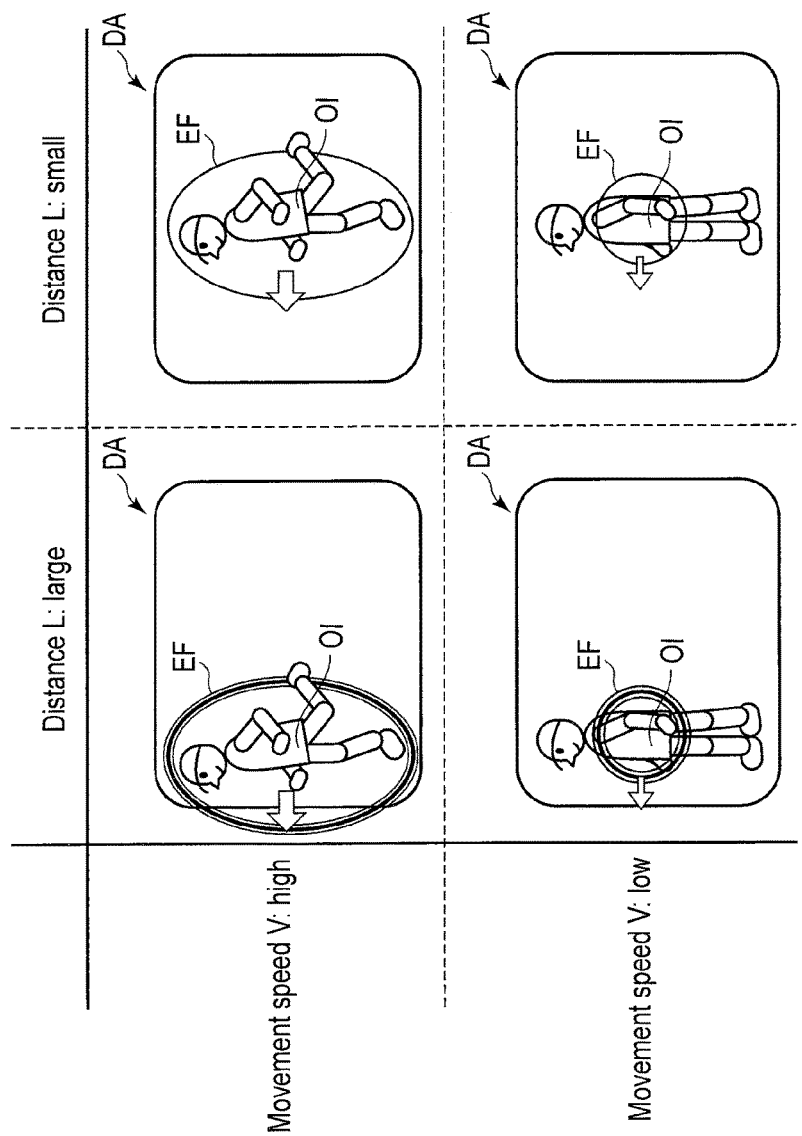
FIG. 56 is a view showing an image example after adding an effect created by the image processing apparatus according to the 11th embodiment of the present invention.

Here, for example, it is assumed that the effect is an ellipse, the first parameter changed in accordance with the distance L is a thickness of a line of the ellipse, and the second parameter changed in accordance with the movement speed V is an area of a portion surrounded by the ellipse. In this case, at the step S1204, the line of the ellipse is set to be bold as the distance L is increased. Moreover, at the step S1205, the area of the portion surrounded by the ellipse is set to be larger as the movement speed V is increased. As a result, such a display image as depicted in FIG. 56 is created, for example. That is, the line of the ellipse as the effect EF is relatively bold when the distance L is relatively large, and the line of the ellipse is relatively thin when the distance is relatively small. Additionally, the area of the portion surrounded by the ellipse is relatively large when the movement speed V is relatively high, and the area of the portion surrounded by the ellipse is relatively small when the movement speed V is relatively low.

According to this embodiment, the effect shown on the image varies in accordance with a value concerning a position of the object of interest and a value concerning the movement speed. A user who holds the digital camera and confirms framing while observing the display unit 126 is guided to pan the digital camera in a direction such that the object of interest moves to the center of a display area and a direction such that relative movement of the object of interest with respect to the display image becomes small so that the effect can be suppressed. Here, since the effect shown in the display image differs in accordance with the parameter based on the distance L and the parameter based on the movement speed V, the user can simultaneously perceive the information concerning the distance L and the information concerning the movement speed V.

Each of the first parameter and the second parameter can take any form. Further, the effect is not restricted to the ellipse, and any shape can be adopted.

Furthermore, this embodiment and its various modifications can be combined with the 10th embodiment to be used. That is, like the 10th embodiment, the change processing may be performed and the effect may be added to a part of an image. In this case, the change value decision unit 116 in the 10th embodiment or the effect decision unit 115 in this embodiment has functions of both the effect decision unit 115 and the change value decision unit 116, and the display image processing unit 118 performs the change of an image according to the first embodiment and the addition of the effect according to the second embodiment with respect to the image data D.

Figure 57:
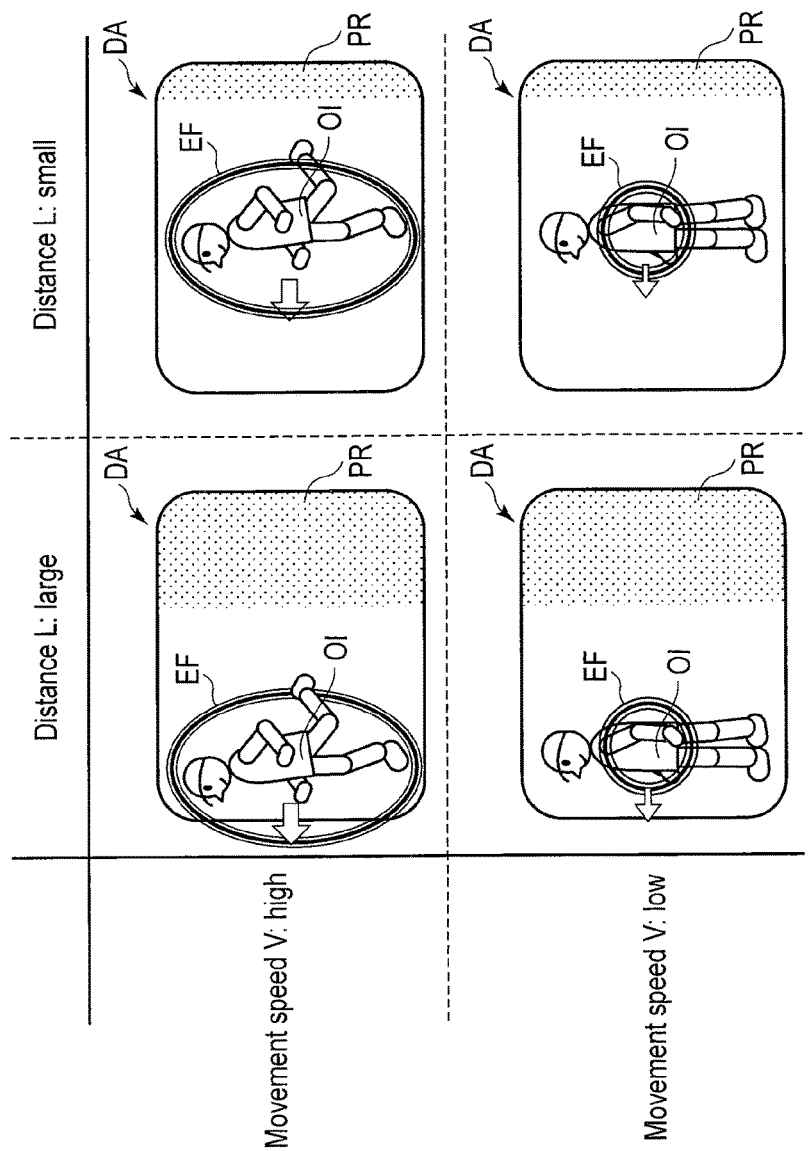
FIG. 57 is a view showing an image example created by the image processing apparatus when the tenth embodiment and the 11th embodiment according to the present invention are combined with each other.

For example, it is assumed that the change that is made to a display image is the luminance of the display image and the first parameter that is changed in accordance with the distance L is an area of a processing region where luminance is lowered. Additionally, it is also assumed that the effect is an ellipse and the second parameter that is changed in accordance with the movement speed V is an area of a portion surrounded by the ellipse. In this case, at the step S1204, an area of the processing region is set in such a manner that the area of the processing region is enlarged as the distance L is increased. Further, at a step S1205, an area of the portion surrounded by the ellipse is set to be enlarged as the movement speed V is increased. As a result, for example, such a display image as depicted in FIG. 57 is created. That is, the area of the processing region is relatively large when the distance L is relatively large, and the area of the processing region is relatively small when the distance L is relatively small. Furthermore, the area of the portion surrounded by the ellipse is relatively large when the movement speed V is relatively high, and the area of the portion surrounded by the ellipse is relatively small as the movement speed V is relatively low.

12th Embodiment

A 12th embodiment according to the present invention will now be described. Here, differences from the third and 10th embodiments will be described, and like reference numerals denote like parts to omit explanation thereof. A digital camera according to this embodiment has a configuration shown in FIG. 27 like the third embodiment. A deformation parameter decision unit 117 according to this embodiment decides various kinds of parameters of deformation processing performed with respect to image data D based on a frame-out accuracy obtained by a frame-out accuracy judgment unit 114 like the third embodiment. A display image processing unit 118 carries out the deformation processing with respect to the image data D based on the decision of the deformation parameter decision unit 117.

In this embodiment, like the 10th embodiment, the frame-out accuracy judgment unit 114 assigns a first parameter to a distance L between the center of gravity of an object of interest and the center of an image range and assigns a second parameter to a movement speed V of the object of interest in the image range represented by the image data D.

Figure 58:
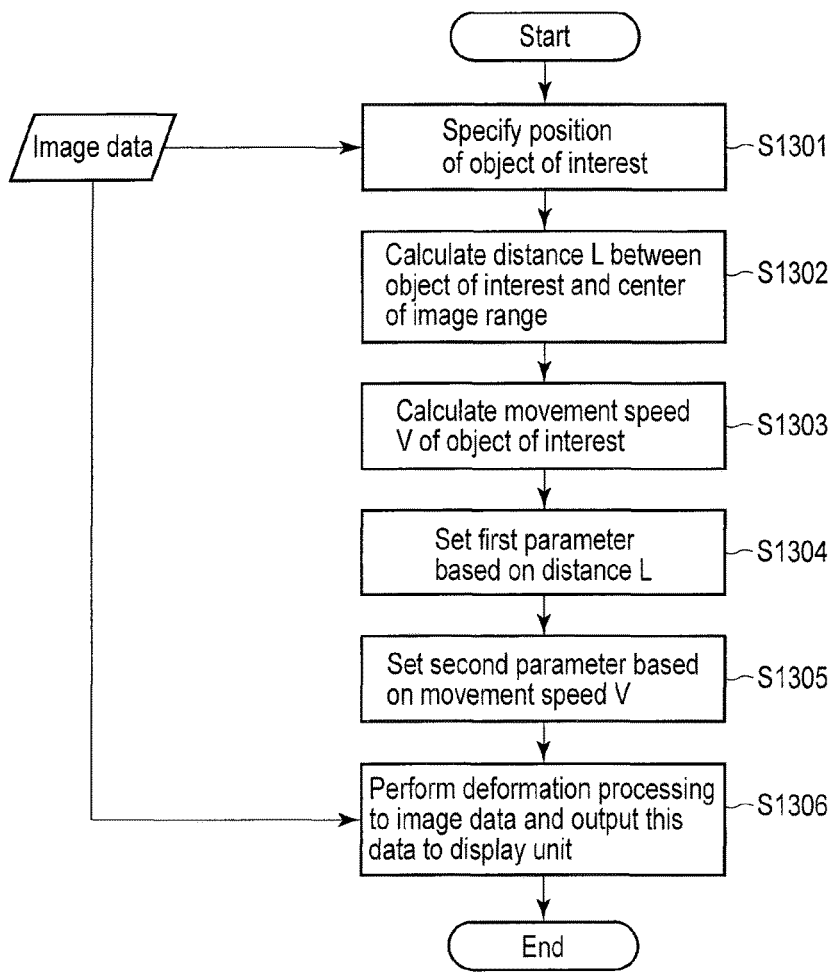
FIG. 58 is a flowchart showing a processing example of an image processing apparatus according to a 12th embodiment of the present invention.

FIG. 58 shows a flowchart for explaining an operation of an image processing apparatus 110 according to this embodiment. As shown in the drawing, processing of a step S1301 to a step S1303 according to this embodiment is equal to the processing of the step S1101 to the step S1103 according to the 10th embodiment. However, the change value decision unit 116 in the 10th embodiment is substituted by a deformation parameter decision unit 117 in this embodiment.

The deformation parameter decision unit 117 sets the first parameter concerning a change that is made to a processing region of a display image based on the calculated distance L at a step S1304. Further, at a step S1305, the deformation parameter decision unit 117 sets the second parameter concerning a change that is made to the processing region of the display image based on the calculated movement speed V. The deformation parameter decision unit 117 outputs the set first parameter and second parameter to a display image processing unit 118.

The display image processing unit 118 performs deformation processing based on the first parameter and the second parameter with respect to the input image data. The display image processing unit 118 outputs changed image data D' after the change processing to a display unit 126. Any other structure and operation of the digital camera according to this embodiment are equal to those in the third embodiment.

Here, for example, the deformation performed with respect to the display image is determined to be deformation of changing a contour of the image into a trapezoidal shape and deformation of expanding or shrinking the image in a predetermined direction. It is assumed that the first parameter changed in accordance with the distance L is an expansion/shrinkage ratio and its direction for expanding/shrinking the image in a perpendicular direction of a side which is the closest to the object of interest in a contour of the display image and the second parameter changed in accordance with the movement speed V is a side opposing the side which is the closest to the object of interest in the contour of the display image and a ratio for reducing this side. In this case, at the step S1304, the expansion/shrinkage ratio of the image is raised as the distance L is increased, and the image is greatly distorted. Further, at the step S1305, one side in the contour of the image is shortened and the contour of the image is greatly distorted as the movement speed V is increased.

As a result, for example, such a display image as depicted in FIG. 59 is created. That is, the expansion/shrinkage ratio of the image is relatively high when the distance L is relatively large, and the expansion/shrinkage ratio of the image is relatively low when the distance L is relatively small. Furthermore, an amount of deformation of the contour is relatively large when the movement speed V is relatively high, and the amount of deformation of the contour is relatively small when the movement speed V is relatively low.

According to this embodiment, since the deformation based on the distance L and the deformation based on the movement speed V are made to the display image, a user can simultaneously perceive information concerning the distance L and information concerning the movement speed V by observing the display image.

Although the deformation concerning the first parameter has been described as the expansion/shrinkage ratio of the image in the display image and the deformation concerning the second parameter has been described as the ratio for reducing the side opposing the side which is the closest to the object of interest in the contour of the display image in the above example, the first parameter and the second parameter may be associated to have a reversed relationship.

Moreover, this embodiment can be combined with the 10th embodiment and/or the 11th embodiment to be used. That is, like the 10th embodiment, the change processing may be performed with respect to a part of the image like the 10th embodiment, and the deformation processing may be executed with respect to the same like this embodiment. In this case, the change value decision unit 116 in the 10th embodiment or the deformation parameter decision unit 117 in this embodiment has functions of both the change value decision unit 116 and the deformation parameter decision unit 117, and the display image processing unit 118 executes a change of the image according to the tenth embodiment and the deformation processing according to this embodiment with respect to the image data D.

What concerns the first parameter is assumed to be the above-described deformation of an image. Additionally, a value of the first parameter is assumed to a value concerning a side opposing a side which is the closest to the object of interest in a contour of a display image and a ratio for reducing this side in the deformation of changing the contour of the image into a trapezoidal shape. At this time, as the second parameter, the following change processing performed with respect to the image can be considered.

For example, as shown in FIG. 60, change processing of specifying a portion concerning a position symmetrical to a position of the object of interest with respect to the center of the image range as a processing region PR and filling this processing region PR with a black color can be considered as the change processing. At this time, an area of the processing region PR which is subjected to the change processing, i.e., the processing of filling with the black color is changed in accordance with a level of the movement speed V.

Further, for example, as shown in FIG. 61, change processing of specifying a portion concerning a position symmetrical to a position of the object of interest with respect to the center of the image range as the processing region PR and decreasing luminance of this processing region PR by a predetermined amount can be considered as the change processing. At this time, an area of the processing region PR is changed in accordance with a level of the movement speed V. Moreover, as shown in FIG. 62, a degree of luminance that is decreased in the processing region PR may be changed in accordance with a level of the movement speed V.

Additionally, for example, as shown in FIG. 63, a change processing of decreasing resolution of the processing region PR by a predetermined amount can be considered. At this time, an area of the processing region PR is changed in accordance with a level of the movement speed V. Further, a degree of the resolution to be decreased in the processing region PR may be changed in accordance with a level of the movement speed V.

Further, for example, as shown in FIG. 64, change processing of decreasing sharpness of the processing region PR by a predetermined amount can be considered. At this time, an area of the processing region PR is changed in accordance with a level of the movement speed V. Furthermore, a degree of the sharpness to be decreased in the processing region PR may be changed in accordance with a level of the movement speed V.

Figure 65:
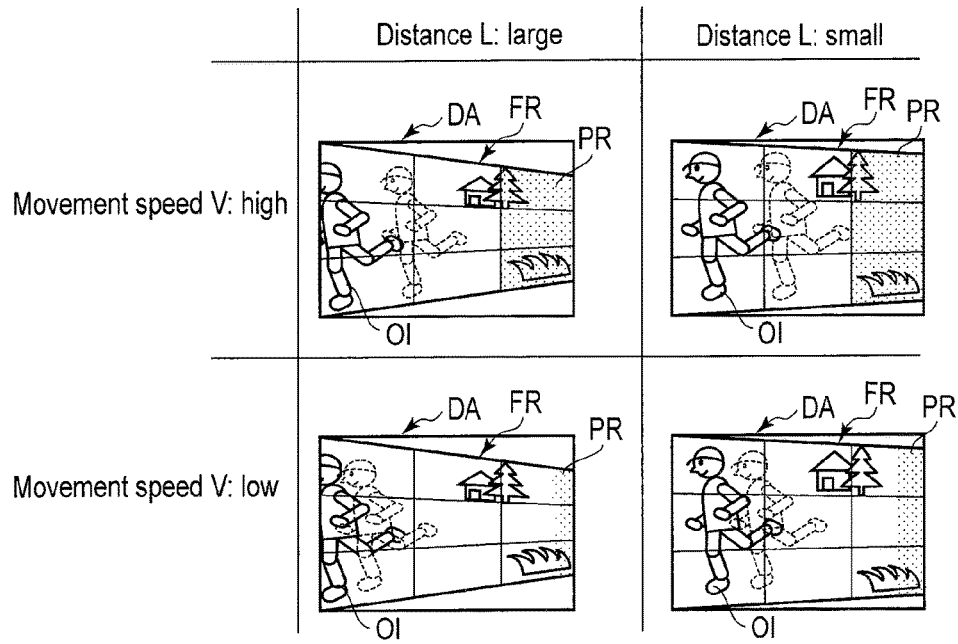
FIG. 65 is a view showing an image example created by the image processing apparatus when the 10th embodiment and the 12th embodiment according to the present invention are combined with each other, which is an example that change processing of changing contrast of the change region is also executed.

Moreover, for example, as shown in FIG. 65, change processing of decreasing the contrast of the processing region PR by a predetermined amount can be considered. At this time, an area of the processing region PR is changed in accordance with a level of the movement speed V. Additionally, a degree of the contrast to be decreased in the processing region PR may be changed in accordance with a level of the movement speed V.

Further, for example, change processing of decreasing the chroma of the processing region PR by a predetermined amount to provide a display close to gray can be considered. At this time, an area of the processing region PR is changed in accordance with a level of the movement speed V. Furthermore, a degree of the chroma to be decreased in the processing region PR may be changed in accordance with a level of the movement speed V.

Moreover, for example, change processing of changing a hue of the processing region PR by a predetermined amount can be considered. At this time, an area of the processing region PR is changed in accordance with a level of the movement speed V. Additionally, a degree of the hue to be decreased in the processing region PR may be changed in accordance with a level of the movement speed V.

Further, some of elements selected from filling with the black color and changes of luminance, resolution, sharpness, contrast, chroma, and a hue may be combined. Furthermore, in each of the above-described cases, for example, expansion/shrinkage of an image in a predetermined direction in accordance with a position of the object of interest described with reference to FIG. 32B may be assigned to the deformation using the first parameter. Moreover, any one change of an image selected from the filling with the black color and the changes of luminance, resolution, sharpness, contrast, chroma, and a hue may be applied to the first parameter, and deformation of changing a contour of an image into a trapezoidal shape or deformation of an image, i.e., expanding/shrinking an image in a predetermined direction may be assigned to the second parameter.

Additionally, this embodiment may be combined with the 11th embodiment. That is, the deformation processing may be applied to an image like this embodiment, and an effect may be added to the image like the 11th embodiment. For example, the first parameter is determined as the above-described deformation of an image, and it is determined as a side opposing a side which is the closest to the object of interest in a contour of a display image and a ratio of reducing this side in the deformation of changing the contour of the image into a trapezoidal shape. Further, the effect is determined as an ellipse, and the second parameter changed in accordance with the movement speed V is determined as an area of a portion surrounded by the ellipse.

Figure 66:
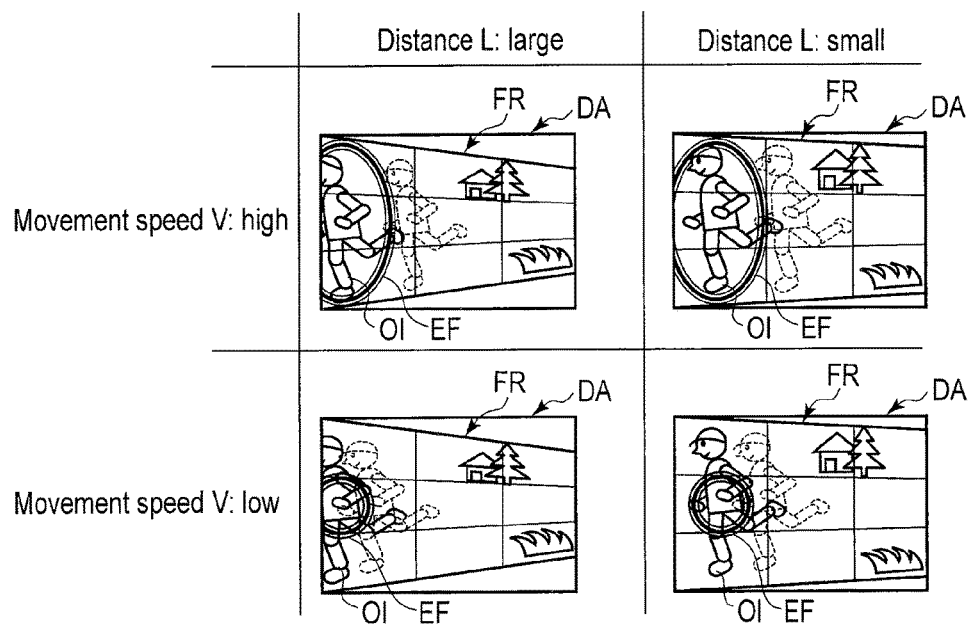
FIG. 66 is a view showing an image example created by the image processing apparatus when the 11th embodiment and the 12th embodiment according to the present invention are combined with each other.

In this case, for example, such a display image as depicted in FIG. 66 is created. That is, a ratio of deformation is relatively large when the distance L is relatively large, and the ratio of deformation is relatively small when the distance L is relatively small. Further, an area of the portion surrounded by the ellipse as the effect EF is relatively large when the movement speed V is relatively low, and the area of the portion surrounded by the ellipse is relatively small when the movement speed V is relatively low.

Further, in regard to the addition of the effect, a thickness of the line of the ellipse as the effect EF may be changed using the second parameter. Furthermore, expansion/shrinkage of an image in a predetermined direction in accordance with a position of the object of interest may be assigned to the deformation using the first parameter. Moreover, the addition of the effect may be assigned to the first parameter, and the deformation of an image may be assigned to the second parameter.

In any case, since the deformation or the change based on the distance L and the deformation or the change based on the movement speed V are performed with respect to a display image, a user can simultaneously perceive information concerning the distance L and information concerning the movement speed V by observing the display image.

It is to be noted that, in the fourth to 12th embodiments, like the first embodiment, the object of interest does not have to be present in the image range, and the same processing can be executed in accordance with a temporal change in position of the object of interest outside the image range when the object-of-interest detection unit 112 can specify a position of the object of interest outside the image range. Additionally, when the object of interest is present outside the image range like the above description, the position of the object of interest may be specified by image processing. Further, the object-of-interest detection unit 112 may be configured to receive raw data output from the imaging unit 122 as it is, and the position of the object of interest may be specified based on the raw data. Furthermore, a reference for obtaining a positional relationship between the image range and the position of the object of interest is not restricted to using the center of the image range, and any other portion may be determined as the reference. Moreover, the position of the object of interest is not restricted to the center of gravity of a object of interest, and the target matter can be placed on a face or a frame of a person in an image when the object of interest is, e.g., a person, and any references may be provided. Additionally, the object of interest is not restricted to a person, and any kind of object can be used. Further, as a method for detecting the object of interest by the object-of-interest detection unit 112, any methods can be adopted.

13th Embodiment

A 13th embodiment according to the present invention will now be described. Here, a difference from the first embodiment will be described, and like reference numerals denote like parts to omit explanation thereof. In the first embodiment, the object-of-interest detection unit 112 receives image data D from the image signal generation unit and specifies a position of the object of interest based on an image represented by the image data D. On the other hand, in this embodiment, a tracking sensor is additionally provided to specify a position of the object of interest.

Figure 67:
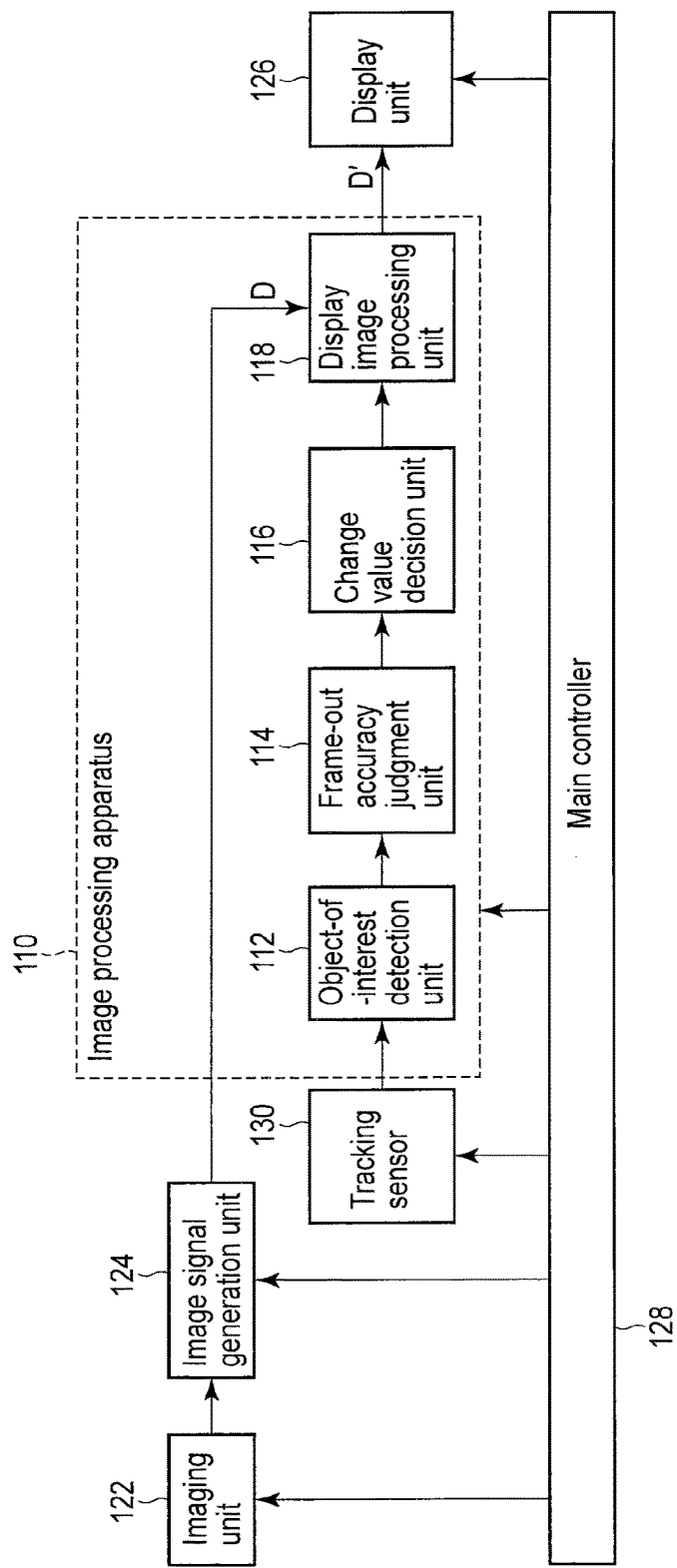
FIG. 67 is a block diagram showing a configuration example of a digital camera as an imaging apparatus including an image processing apparatus according to a 13th embodiment of the present invention.

FIG. 67 shows an outline of a configuration of a digital camera according to this embodiment. As shown in the drawing, this digital camera is different from the digital camera according to the first embodiment in that a tracking sensor 130 is provided. The tracking sensor 130 may be, e.g., a camera having a tracking imaging section different from the imaging unit 122. A basic configuration is the same as that of the first embodiment, and an object-of-interest detection unit 112 receives image data from the camera having the tracking imaging unit and specifies a position of the object of interest based on an image represented by the image data like the first embodiment.

In this case, the imaging unit 122 in the digital camera and the tracking imaging unit functioning as the tracking sensor 130 can be configured to acquire images having different field angles. For example, when an imaging range of the tracking imaging unit that functions as the tracking sensor 130 is widened beyond an imaging range of the imaging unit 122, the object of interest present outside the imaging range of the imaging unit 122 can be imaged by the tracking imaging unit that functions as the tracking sensor 130. As a result, the object-of-interest detection unit 112 can specify a position of the object of interest outside the field angle of the imaging unit 122.

Further, the tracking sensor 130 may be a receiving apparatus that detects electric waves from an electric wave source when the electric wave source is arranged on the object of interest. In this case, the object-of-interest detection unit 112 acquires a reception signal of electric waves, which are emitted from the electric wave source, from the receiving apparatus functioning as the tracking sensor 130. The object-of-interest detection unit 112 specifies a position of the electric wave source with respect to the image range based on the reception signal.

Furthermore, the tracking sensor 130 may be an infrared sensor that detects infrared rays emitted from an infrared source arranged on the object of interest, a temperature sensor that senses a temperature of the object of interest, or various kinds of sensors that can sense a signal from the object of interest.

When each of such sensors that sense a signal of the electric waves, the infrared rays, the temperature, and others from the object of interest is used as the tracking sensor 130, a position of the object of interest can be acquired irrespective of a focal length and field angle of the imaging unit 122. Moreover, using each of these sensors enables specifying a position of the object of interest when a feature point of the object of interest is hard to extract from an image or when specifying a position of the object of interest based on an image is difficult.

In this embodiment, the object-of-interest detection unit 112 specifies a position of the object of interest with respect to the image range based on information input from the tracking sensor 130 and outputs the specified position to a frame-out accuracy judgment unit 114. In this embodiment, any other structure and operation are equal to those of the first, fourth, seventh, and 10th embodiments except using information acquired by the tracking sensor 130 when the object-of-interest detection unit 112 specifies a position of the object of interest.

In this embodiment, likewise, the digital camera can guide a user, who is adjusting framing while observing a display image, to perform framing so that the object of interest can be placed at an appropriate position in an imaging range by displaying in the display unit 126 the display image processed by the image processing apparatus 110. As a change made to an image, it is possible to use any change described in the first, fourth, seventh, and 10th embodiments and their modifications.

It is to be noted that the object of interest does not have to be present in the range of a display image in this embodiment. That is, when the tracking sensor 130 is configured to specify a position of the object of interest outside the image range displayed in the display unit 126, the image processing apparatus 110 can execute the same processing with respect to the object of interest present outside the range of the display image in accordance with a position of this object. Therefore, as the tracking sensor 130, for example, the tracking imaging unit that can image a wider range than the display image range can be used as described above. Further, as the tracking sensor 130, it is possible to use an electric wave receiving apparatus, an infrared sensor, a temperature sensor, or any other various kinds of sensors that can receive a signal from a wider range than the display image range, for example. Furthermore, as described above, when the object of interest is present outside the image range, a position of the object of interest may be specified based on a shape of a processing region as shown in FIG. 7.

Moreover, this embodiment can be applied to the second, fifth, eighth, and 11th embodiments and their modifications. In this case, an outline of a configuration of this digital camera is as shown in FIG. 68. That is, this digital camera includes the tracking sensor 130, and the object-of-interest detection unit 112 specifies a position of the object of interest based on information input from this tracking sensor 130. Any other structures are equal to those of the second, fifth, eighth, and 11th embodiments and their modifications.

Figure 69:
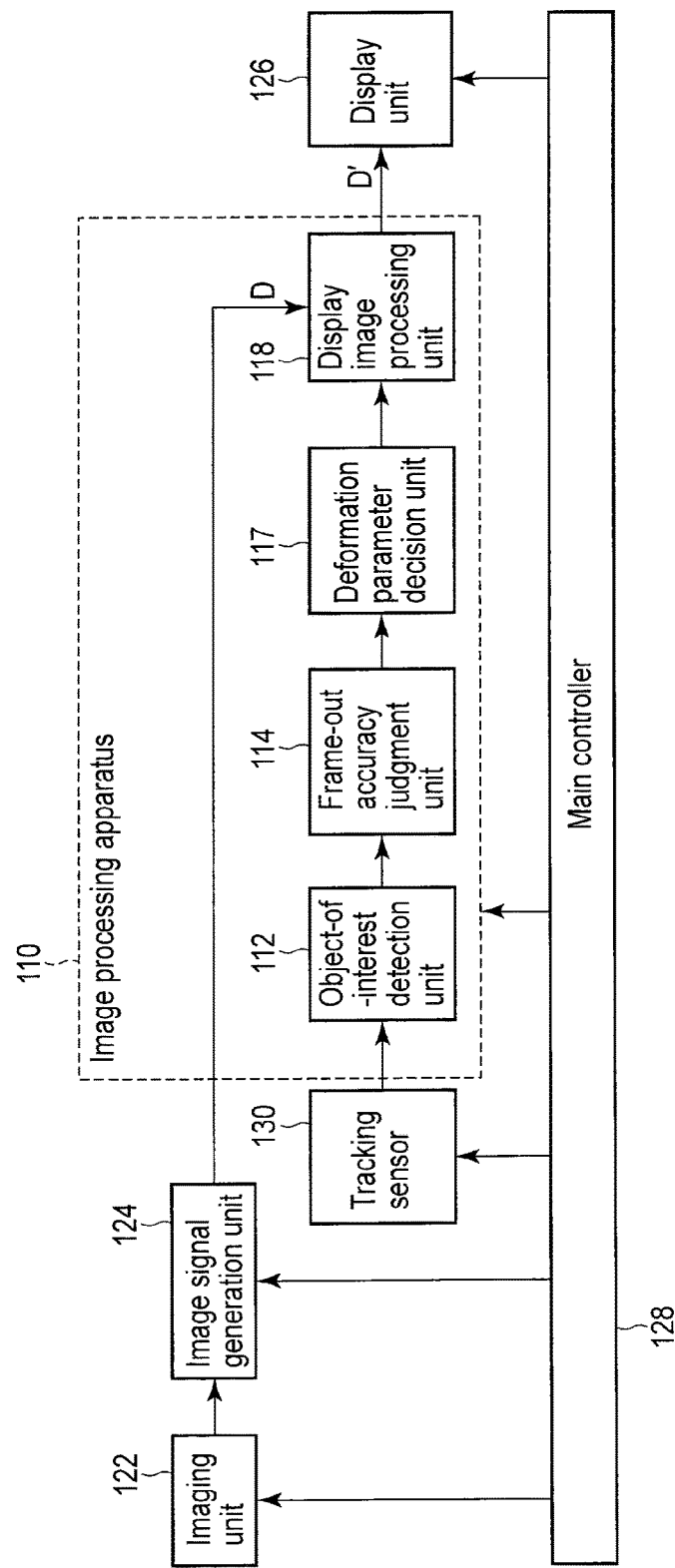
FIG. 69 is a block diagram showing yet another configuration example of a digital camera as an imaging apparatus including an image processing apparatus according to a 13th embodiment of the present invention.

Additionally, this embodiment can be applied to the third, sixth, ninth, and 12th embodiments and their modifications. In this case, an outline of a configuration of this digital camera is as shown in FIG. 69. That is, this digital camera includes the tracking sensor 130, and the object-of-interest detection unit 112 specifies a position of the object of interest based on information input from this tracking sensor 130. Any other structures are equal to those of the third, sixth, ninth, and 12th embodiments and their modifications.

Further, like the first to 12th embodiments, the change value decision unit 116, the effect decision unit 115, and the deformation parameter decision unit 117 according to each embodiment can be combined with each other.

14th Embodiment

A 14th embodiment according to the present invention will now be described. Here, a difference from the first embodiment will be described, and like reference numerals denote like parts to omit explanation thereof. A digital camera according to this embodiment has a zoom optical system. The digital camera according to this embodiment operates an image processing apparatus 110 in cooperation with a zoom-in/out operation.

FIG. 70 shows an outline of a configuration of the digital camera according to this embodiment. As shown in the drawing, this digital camera has a zoom optical system 142 in an imaging unit 122. Further, this digital camera has a zoom switch 144 connected to a main controller 128. The zoom optical system 142 is a general zoom optical system for use in, e.g., a digital camera. An operation of this zoom optical system 142 is controlled by the main controller 128. That is, a focal length of the zoom optical system 142 is changed to a wide side and a telephoto side under control of the main controller 128.

The zoom switch 144 functions as an input unit which receives an instruction from a user concerning an operation of the zoom optical system 142. The zoom switch 144 includes two button switches configured to input an operation of the zoom optical system 142 to the wide side and an operation of the same to the telephoto side, respectively. Furthermore, the zoom switch 144 may be a touch panel provided on a display unit 126.

The zoom switch 144 outputs the input instruction from the user concerning a change in focal length of the zoom optical system to the main controller 128. The main controller 128 controls an operation of the zoom optical system 142 based on the instruction from the user input from the zoom switch 144. That is, the main controller 128 changes the focal length of the zoom optical system 142.

Figure 71:
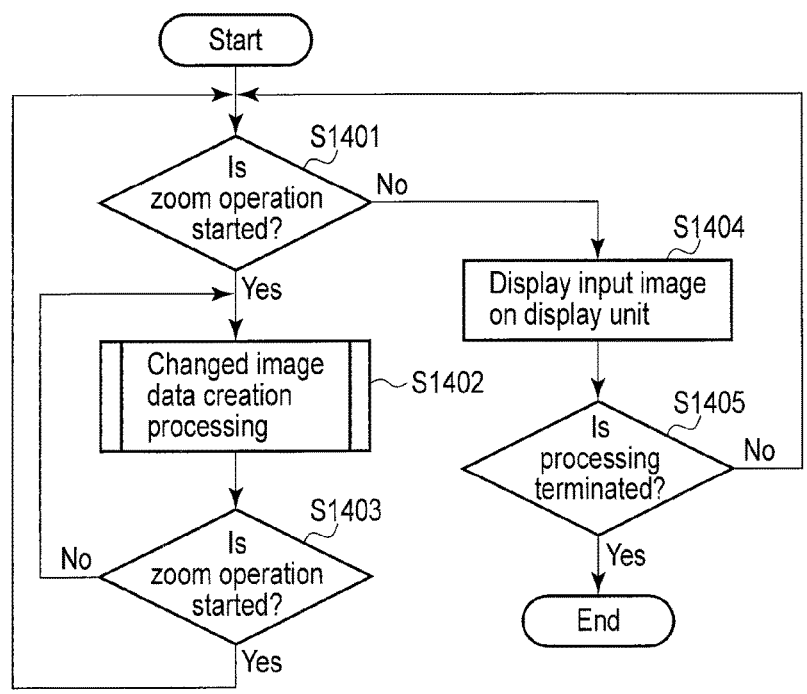
FIG. 71 is a flowchart showing a processing example of a main controller according to the 14th embodiment of the present invention.

In this embodiment, the main controller 128 controls start and end of an operation of the image processing apparatus 110 in accordance with an input from the zoom switch 144. The operation of the main controller according to this embodiment will now be described with reference to a flowchart shown in FIG. 71.

At a step S1401, the main controller 128 judges whether a zoom operation has started. When it is determined that the zoom operation has started at the step S1401, the processing advances to a step S1402.

At the step S1402, the main controller 128 allows the image processing apparatus 110 to function in order to create changed image data D' obtained by performing change processing with respect to an image based on input image data D. Here, the creation of the changed image data D' by the image processing apparatus 110 is as described in the first embodiment with reference to FIG. 2. That is, the image processing apparatus 110 specifies a position of an object of interest, decides a processing region in accordance with a positional relationship between the center of a display area and the center of the object of interest, carries out the change processing on the image to change the inside of the processing region, and outputs the changed image data D' obtained after the processing to a display unit 126. As a result, the display unit 126 displays an image obtained after the change processing based on the changed image data D' input from a display image processing unit 118 of the image processing apparatus 110.

At a step S1403, the main controller 128 judges whether the zoom operation is stopped. When it is determined that the zoom operation is stopped at the step S1403, the processing returns to the step S1401. On the other hand, when it is determined that the zoom operation is not stopped at the step S1403, the processing is returned to the step S1402, and the main controller 128 allows the image processing apparatus 110 to repeat the creation of a changed image.

When it is determined that the zoom operation is not started at the step S1401, the processing is shifted to the step S1404. At the step S1404, the main controller 128 does not allow the image processing apparatus 110 to perform the change processing. That is, the main controller 128 allows the display image processing unit 118 in the image processing apparatus 110 to directly output the input image data D to the display unit 126 as the changed image data D'. As a result, the display unit 126 directly displays an image based on the unchanged image data D input from the display image processing unit 118 of the image processing apparatus 110 as an image based on the changed image data D'.

At a step S1405, the main controller 128 judges whether the processing is terminated. When it is determined that the processing is not terminated at the step S1405, the processing is returned to the step S1401. On the other hand, when it is determined that the processing is terminated at the step S1405, the processing is terminated.

In this embodiment, in which the operation is performed as described above, the change processing is not performed when the zoom-in/out is not effected. On the other hand, when the zoom-in/out is effected, the change processing is carried out like the first embodiment. At the time of zoom-in, such an image as depicted in FIG. 72 is displayed, for example. As shown in an upper view of FIG. 72, a distance between the center of the object of interest OI and the center of a display area DA is short in an image acquired in a wide field of view. On the other hand, the distance between the center of the object of interest OI and the display area DA is gradually increased as the zoom-in advances as shown in a middle view and a lower left view in FIG. 72.

When the distance between the center of the object of interest OI and the center of the display area DA is increased, the image processing apparatus 110 sets a processing region PR at a position symmetrical to the object of interest OI with respect to the center of the display area DA as shown in the lower left view in FIG. 72, and image processing of filling the processing region PR with a black color is carried out. Here, when a user pans the digital camera to the left side, the object of interest OI is placed near the center of the display area DA. As a result, an image having no portion filled with the black color is displayed as shown in a lower right view of FIG. 72. In this manner, for example, the main controller 128 functions as a control unit which judges whether the imaging unit has started to exercise a zoom function and allows the image processing apparatus to execute alteration processing when the zoom function has started to be exercised.

In this embodiment, the digital camera having the image processing apparatus 110 can guide a user so that the object of interest can be always placed in the display area. At the time of zoom-in/out, the object of interest is apt to deviate from the display area since a field angle is changed. In particular, when the zoom-in is effected, the field angle is narrowed, and the object of interest is apt to deviate from the display area. Therefore, like this embodiment, allowing the image processing apparatus 110 to function at the time of the zoom-in/out is effective for guiding the user so that the object of interest can be always placed within the display area.

It is to be noted that, in this embodiment, the image processing apparatus 110 is allowed function at the time of zoom-in/out and the image processing apparatus 110 is not allowed to function in any other case. That is because a throughput of an arithmetic apparatus as the main controller 128 or the image processing apparatus 110 is taken into consideration. In general, at the time of the zoom-in/out, shooting is usually not effected. In this case, the arithmetic apparatus has a margin of processing. On the other hand, when the zoom-in/out is effected, the object of interest is apt to deviate from the display area. Therefore, in this embodiment, the arithmetic apparatus is configured to perform the change processing at the time of the zoom-in/out. When the arithmetic apparatus has a margin of throughput, the digital camera may be configured in such a manner that the image processing apparatus 110 can function irrespective of the zoom-in/out.

In this embodiment, although the same processing as that in the first embodiment is carried out at the step S1402 in the above description, the present invention is not restricted thereto. When the image processing apparatus 110 is configured like the second to 12th embodiments, the main controller 128 enables the image processing apparatus 110 to perform such image processing as that in the second to 12th embodiments at the step S1402.

Moreover, when the digital camera has a tracking sensor 130 like the 13th embodiment, the image processing apparatus 110 is allowed to perform the same image processing as that in the 13th embodiment at the step S1402.

Additionally, although the imaging unit 122 has the zoom optical system in this embodiment, the present invention is not restricted to zoom utilizing the optical system, and the same function and the same effect can be obtained even when so-called digital zoom is used.

Modification of 14th Embodiment

Figure 73:
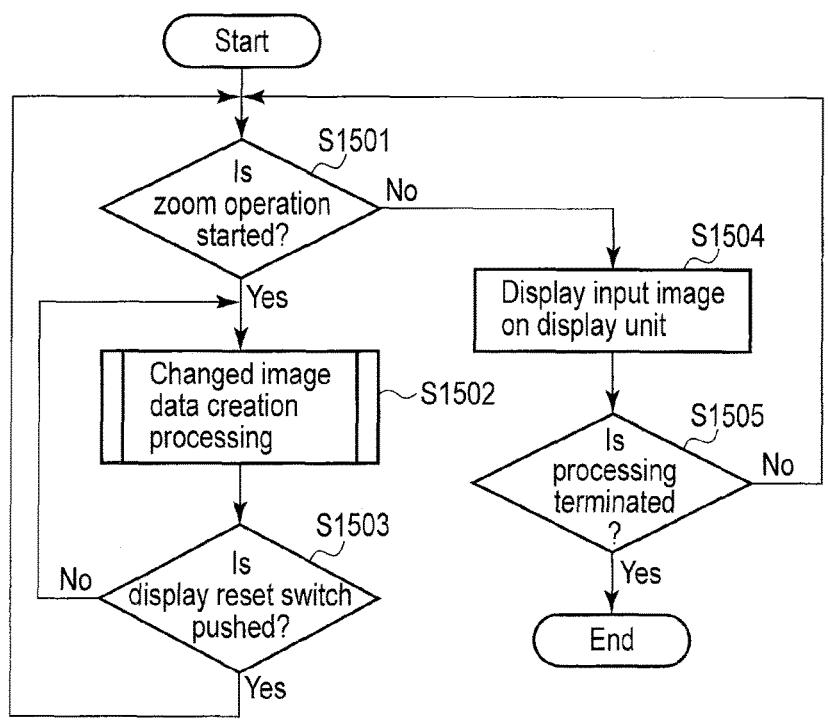
FIG. 73 is a flowchart showing a processing example of a main controller according to a modification of the 14th embodiment of the present invention.

A difference of a modification of the 14th embodiment from the 14th embodiment will be explained. In this modification, a display reset switch is further provided in the zoom switch 144. An operation of the main controller 128 based on this modification will now be described with reference to a flowchart shown in FIG. 73.

At a step S1501, the main controller 128 judges whether a zoom operation is started. When the zoom operation is determined to be started at the step S1501, the processing advances to a step S1502.

At the step S1502, the main controller 128 operates the image processing apparatus 110 to create a changed image. As a result, the display unit 126 displays an image obtained after the change processing based on changed image data D', which is obtained after the change processing, input from the display image processing unit 118 of the image processing apparatus 110.

At a step S1503, the main controller 128 judges whether the display reset switch is pushed. When the display reset switch is determined to be pushed at the step S1503, the processing is returned to the step S1501. On the other hand, when it is determined that the display reset switch is not pushed at the step S1503, the processing is returned to the step S1502, and the creation of the changed image by the image processing apparatus 110 is repeated.

When it is determined that the zoom operation is not started at the step S1501, the processing advances to the step S1504. At the step S1504, the main controller 128 does not allow the image processing apparatus 110 to perform the change processing. That is, the main controller 128 allows the display image processing unit 118 of the image processing apparatus 110 to directly output the input image data D to the display unit 126 as the changed image data D'. As a result, the display unit 126 displays an image based on the image data D, which is not subjected to the change processing, input from the display image processing unit 118 of the image processing apparatus 110 as an image based on the changed image data D'.

At a step S1505, the main controller 128 judges whether the processing is terminated. When it is determined that the processing is not terminated at the step S1505, the processing is returned to the step S1501. On the other hand, when it is determined that the processing is terminated at the step S1505, the processing is terminated.

According to this modification, after start of the zoom-in/out, the image processing apparatus 110 is allowed to function until the display reset switch is pushed. That is, even after stop of the zoom-in/out, the image processing apparatus 110 is allowed to function until the display reset switch is pushed. As a result, for example, the object of interest is moved to an end of the display area at the time of zoom-in, and the display 126 displays an image subjected to the change processing like the lower left view in FIG. 72 even after the zoom-in operation is stopped. According to this modification, the digital camera having the image processing apparatus 110 can guide a user so that the object of interest can be placed within the display area even after effecting the zoom-in, for example.

15th Embodiment

A 15th embodiment according to the present invention will now be described. Here, a difference from the first embodiment will be described, and like reference numerals denote like parts to omit explanation thereof. Although the example that the image processing apparatus 110 is applied to a digital camera has been described in the first to 13th embodiments, the image processing apparatus according to the present invention can be used for various apparatuses that process images including the object of interest without being restricted to the digital camera.

For example, the image processing apparatus 110 according to each of the first, fourth, seventh, and 10th embodiments can be applied to an endoscope as an imaging apparatus as shown in FIG. 74. The endoscope shown in FIG. 74 has an insertion unit 232 that is inserted into a body of a subject. A side of the insertion unit 232 that is inserted into the body of the subject will be referred to as a distal-end side, and the other side of the same that is outside the body of the subject will be referred to as a proximal-end side. An imaging unit 222 is arranged near an end portion on the distal-end side of the insertion unit 232. A portion near the distal end of the insertion unit 232 closer to the proximal-end side than a portion where the imaging unit 222 is arranged is configured to freely bend by an operation using an operation unit 234. This endoscope has a light source unit 236 to illuminate an imaging range of the imaging unit 222. The imaging unit 222 is connected to an image signal generation unit 224. The image signal generation unit 224 is connected with the image processing apparatus 110 having an object-of-interest detection unit 112, a frame-out accuracy judgment unit 114, a change value decision unit 116, and a display image processing unit 118. The display image processing unit 118 in the image processing apparatus 110 is connected to a display unit 226.

The imaging unit 222 converts a subject image formed by, e.g., a non-illustrated lens into an electrical signal by photoelectric conversion as an endoscopic image, converts this electrical signal into raw data, and outputs the converted data to the image signal generation unit 224. That is, endoscopic photography is performed. The image signal generation unit 224 executes various kinds of processing based on the raw data input from the imaging unit 222 to create an image signal (image data) like the image signal generation unit 124 in the first embodiment. The image signal generation unit 224 outputs the image data to the object-of-interest detection unit 112 and the display image processing unit 118 in the image processing apparatus 100.

The image processing apparatus 110 operates like the first embodiment. That is, giving a brief explanation, the object-of-interest detection unit 112 specifies a position of the object of interest in an image represented by the image data input from the image signal generation unit 224. The object-of-interest detection unit 112 outputs the specified position of the object of interest to the frame-out accuracy judgment unit 114. The frame-out accuracy judgment unit 114 calculates an accuracy that frame-out of the object of interest from an image range of the image displayed in the display unit 126 occurs and a direction that the frame-out occurs based on the position of the object of interest specified by the object-of-interest detection unit 112. The frame-out accuracy judgment unit 114 outputs the calculated accuracy and direction that the frame-out of the object of interest occurs to the change value decision unit 116. The change value decision unit 116 decides parameters for change processing, e.g., a change region, a change type, a change degree, and others of the change processing performed on the display image based on the accuracy and the direction related to the occurrence of frame-out of the object of interest from the display range input from the frame-out accuracy judgment unit 114. The change value decision unit 116 outputs decided parameters for the change processing to the display image processing unit 118. The display image processing unit 118 performs the change processing with respect to the image data D input from the image signal generation unit 224 based on the parameters for the change processing input from the change value decision unit 116. The display image processing unit 118 outputs changed image data subjected to the change processing to the display unit 226. The display unit 226 displays an image based on the changed image data output from the display image processing unit 118.

At this time, for example, it is possible to adopt a configuration in which the imaging unit 222 has an imaging field angle of 180 degrees, the object-of-interest detection unit 112 specifies a position of the object of interest by utilizing the field angle of 180 degrees and, on the other hand, the display image created by the display image processing unit 118 has a field angle of 60 degrees, and an enlarged, more detailed image is displayed in the display unit 226.

In this embodiment, like the first, fourth, seventh, and 10th embodiments and their modifications, the change value decision unit 116 can set parameters of the change processing for various display images based on a position of the object of interest in the display image or a movement speed. Further, the display image processing unit 118 can make various kinds of changes to the display image based on settings decided by the change value decision unit 116 like the first, fourth, seventh, and 10th embodiments and their modifications.

According to this embodiment, an operator of this endoscope can operate this embodiment by inserting or removing the insertion unit 232 to trace the object of interest or bending the end of the insertion unit 232 using the operation unit 234 while confirming the display image displayed in the display unit 226.

Furthermore, the image processing apparatus 110 according to each of the second, fifth, eighth, and 11th embodiments and their modifications may be applied to the endoscope according to this embodiment. When the image processing apparatus 110 according to each of the second, fifth, eighth, and 11th embodiments is applied to the endoscope, a configuration roughly shown in FIG. 75 can be obtained, for example. In this endoscope, the image processing apparatus 110 operates like the description of the second, fifth, eighth, and 11th embodiments and their modifications in the endoscope using the image processing apparatus 110 according the first, fourth, seventh, and 10th embodiments. Any other structures are equal to those in the endoscope using the image processing apparatus 110 according to each of the first, fourth, seventh, and 10th embodiments.

Moreover, the image processing apparatus 110 according to each of the third, sixth, ninth, and 12th embodiments and their modifications may be applied to the endoscope according to this embodiment. When the image processing apparatus 110 according to each of the third, sixth, ninth, and 12th embodiments and their modifications is applied to the endoscope, a configuration roughly shown in FIG. 76 can be obtained. In this endoscope, the image processing apparatus 110 operates like the description of the third, sixth, ninth, and 12th embodiments and their modifications in the endoscope using the image processing apparatus 110 according the first, fourth, seventh, and 10th embodiments. Any other structures are equal to those in the endoscope using the image processing apparatus 110 according to each of the first, fourth, seventh, and 10th embodiments.

Further, like the first to 12th embodiments, the change value decision unit 116, the effect decision unit 115, and the deformation parameter decision unit 117 according to each embodiment can be combined to constitute an endoscope.

16th Embodiment

Figure 77:
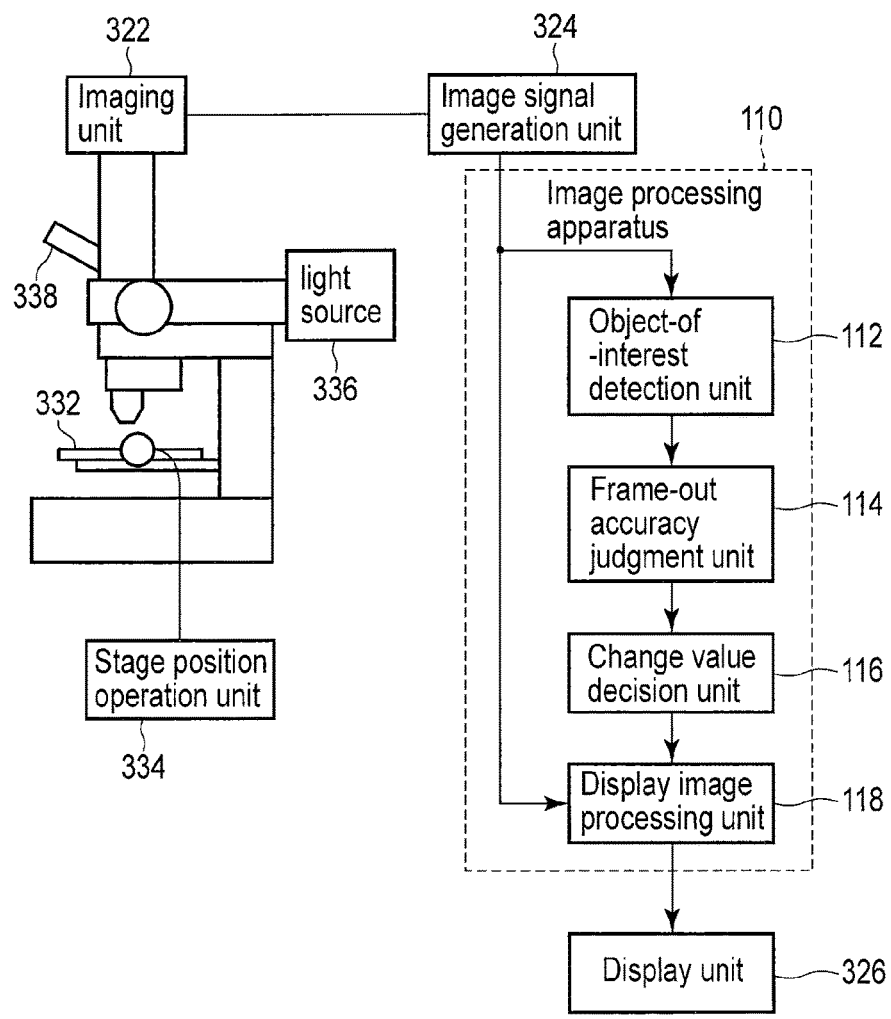
FIG. 77 is a block diagram showing a configuration example of a microscope as an imaging apparatus including an image processing apparatus according to a 15th embodiment of the present invention.

The image processing apparatus 110 according to each of the first, fourth, seventh, and 10th embodiment can be applied to a microscope as an imaging apparatus as shown in FIG. 77. A microscope shown in FIG. 77 is a microscope used for observing a sample installed on a moving stage 332. This microscope has a light source 336 configured to illuminate a sample and a stable position operation unit 334 used for moving the moving stage 332. An observer can observe an enlarged image obtained by the microscope through an eyepiece lens 338 in a megascopic manner.

Furthermore, this microscope has an imaging unit 322 that performs photoelectric conversion with respect to a microscope-enlarged image to generate an electrical signal and converts the electrical signal into raw data to be output to an image signal generation unit 324. Like the image signal generation unit 124 in the first embodiment, the image signal generation unit 324 creates an image signal (image data) and outputs it to an image processing apparatus 110 connected to this microscope. Like the example of the endoscope, the image processing apparatus 110 operates like the first embodiment. As a result, a display unit 326 displays a changed image obtained after change processing associated with an accuracy related to the occurrence of frame-out of the object of interest from the image range.

In this embodiment, like the first, fourth, seventh, and 10th embodiments and their modifications, a change value decision unit 116 can set parameters of the change processing for various display images based on a position of the object of interest in the display image or a movement speed. Moreover, a display image processing unit 118 can make various kinds of changes to each display image based on settings decided by the change value decision unit 116 like the first, fourth, seventh, and 10th embodiments and their modifications.

According to this embodiment, an operator of this microscope can operate a position of the moving stage 332 using a stage position operation unit 334 to trace the object of interest while confirming a display image displayed in the display unit 326.

Additionally, the image processing apparatus 110 according to each of the second, fifth, eighth, and 11th embodiments and their modifications may be applied to the microscope according to this embodiment. When the image processing apparatus 110 according to each of the second, fifth, eighth, and 11th embodiments and their modifications is applied to the microscope, a configuration roughly shown in FIG. 78 can be obtained, for example. In this microscope, the image processing apparatus 110 operates like the description of the second, fifth, eighth, and 11th embodiments and their modifications in the microscope using the image processing apparatus 110 according to each of the first, fourth, seventh, and 10th embodiments. Any other structures are equal to those in the microscope using the image processing apparatus 110 according to each of the first, fourth, seventh, and 10th embodiments.

Further, the image processing apparatus 110 according to each of the third, sixth, ninth, 12th embodiments and their modifications may be applied to the microscope according to this embodiment. When the image processing apparatus 110 according to each of the third, sixth, ninth, 12th embodiments and their modifications is applied to the microscope, a configuration schematically shown in FIG. 79 can be obtained. In this microscope, the image processing apparatus 110 operates like the description of the third, sixth, ninth, and 12th embodiments and their modifications in the microscope using the image processing apparatus 110 according to each of the first, fourth, seventh, and 10th embodiments. Any other structures are equal to those in the microscope using the image processing apparatus 110 according to each of the first, fourth, seventh, and 10th embodiments. As a result, the same effect can be obtained.

Furthermore, like the first to 12th embodiments, the change value decision unit 116, the effect decision unit 115, and the deformation parameter decision unit 117 according to each embodiment may be combined to constitute a microscope.

Moreover, the image processing apparatus 110 according to each embodiment is not restricted to the imaging apparatus of, e.g., an endoscope or a microscope, and it can be applied to various kinds of audio visual systems or TV games. Additionally, functions of the image processing apparatus 110 may be determined as a computer program, and a computer may be allowed to perform the operations described with reference to each flowchart. This computer program can be stored in, e.g., a sustainable recording medium. The computer can read a recorded program from this recording medium and execute processing associated with this program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus which receives an image signal and generates a display image having an image range associated with a display area of a display unit from an image based on the image signal, the apparatus comprising:
   a position-of-interest calculating unit which calculates a position of interest as a position of an object of interest in the image based on the image signal;
   a frame-out accuracy calculation unit which calculates a frame-out accuracy representing an accuracy that the position of interest deviates from the image range based on the position of interest and the image range;
   an alteration variable decision unit which decides a processing variable of alteration processing performed with respect to the image based on the image signal in conformity with the frame-out accuracy; and
   an image alteration unit which performs the alteration processing with respect to the image based on the image signal in conformity with the decided processing variable to generate a signal of the display image,
   wherein the alteration variable decision unit includes a change processing decision unit which decides a change region as a region where change processing is carried out with respect to the image based on the image signal and a level of change of the change processing in conformity with the frame-out accuracy,
   the change processing decision unit decides a display image region concerning a position opposing the position of interest with respect to a center of the image range as the change region,
   the image alteration unit performs the change processing with the decided level of the change with respect to the decided change region of the image based on the image signal and does not perform the change processing with respect to a region other than the change region of the image, and
   the alteration processing is performed directly on the image signal.

2. The apparatus according to claim 1,
wherein the change region is a display image region concerning a position apart from the position of interest by a predetermined distance.

3. The apparatus according to claim 1,
wherein the change processing decision unit changes an area of the change region in accordance with the frame-out accuracy.

4. The apparatus according to claim 3,
wherein a type of the change processing is at least one of filling an image with color, increase/decrease in resolution, increase/decrease in sharpness, increase/decrease in contrast, increase/decrease in luminance, increase/decrease in chroma, and a change in a hue.

5. The apparatus according to claim 1,
wherein a type of the change processing is at least one of increase/decrease in resolution, increase/decrease in sharpness, increase/decrease in contrast, increase/decrease in luminance, increase/decrease in chroma, and a change in a hue, and
the change processing decision unit changes an amount of the increase/decrease or an amount of the change as the level of the change in accordance with the frame-out accuracy.

6. The apparatus according to claim 5,
wherein a type of the change processing is at least one of decrease in resolution, decrease in sharpness, decrease in contrast, decrease in luminance, and decrease in chroma, and
the change processing decision unit changes an amount of the decrease as the level of the change in accordance with the frame-out accuracy.

7. The apparatus according to claim 1,
wherein the alteration variable decision unit includes a processing decision unit which sets a change region around a representative point of the object of interest in the image based on the image signal in conformity with the frame-out accuracy and decides processing for an image performed with respect to the change region, and
the image alteration unit performs the processing with respect to the change region of the image based on the image signal.

8. The apparatus according to claim 7,
wherein the position-of-interest calculation unit includes a contour extraction unit which extracts a contour of the object of interest, and
the processing decision unit decides the change region based on the contour.

9. The apparatus according to claim 7,
wherein the processing decision unit changes an area of the change region and/or a level of the processing in accordance with the frame-out accuracy.

10. The apparatus according to claim 7,
wherein the processing decision unit changes an area of a portion surrounded by the change region in the image based on the image signal in conformity with the frame-out accuracy.

11. The apparatus according to claim 7,
wherein the change region and/or the processing changes with time.

12. The apparatus according to claim 1,
wherein the alteration variable decision unit includes a deformation parameter decision unit which decides a deformation parameter for performing geometric conversion with respect to the image based on the image signal in conformity with the frame-out accuracy, and
the image alteration unit executes deformation processing including the geometric conversion with respect to the image based on the image signal in conformity with the deformation parameter.

13. The apparatus according to claim 12,
wherein the geometric conversion includes changing a shape of a frame peripheral of the image in the image range.

14. The apparatus according to claim 13,
wherein the geometric conversion is configured to shorten and deform a part of the frame of the image in the image range, and
the deformation parameter decision unit decides a ratio of shortening the part of the frame in accordance with the frame-out accuracy.

15. The apparatus according to claim 12,
wherein the geometric conversion is conversion including shrinking a part of the image in the image range and expanding the other part of the image.

16. The apparatus according to claim 15,
wherein the deformation parameter decision unit decides a ratio of effecting the shrinking and the expanding in accordance with the frame-out accuracy.

17. The apparatus according to claim 1,
wherein the frame-out accuracy calculation unit calculates the frame-out accuracy in accordance with a positional relationship of the position of interest with respect to the image range.

18. The apparatus according to claim 1,
wherein the frame-out accuracy calculation unit calculates the frame-out accuracy in accordance with a change in a positional relationship of the position of interest with respect to the image range.

19. The apparatus according to claim 1,
wherein the frame-out accuracy calculation unit calculates the frame-out accuracy in accordance with a positional relationship of the position of interest with respect to the image range and a change in the positional relationship of the position of interest with respect to the image range.

20. The apparatus according to claim 1,
wherein the frame-out accuracy calculation unit executes:
(i) calculating a first frame-out accuracy in accordance with a positional relationship of the position of interest with respect to the image range; and
(ii) calculating a second frame-out accuracy in accordance with a change in the positional relationship of the position of interest with respect to the image range,
the change processing decision unit executes:
(i) deciding in accordance with the first frame-out accuracy a first change region which is a region where the image based on the image signal is subjected to first change processing and whose area differs depending on the first frame-out accuracy;
(ii) deciding in accordance with the second frame-out accuracy a second change region which is a region where the image based on the image signal is subjected to second change processing and whose area differs depending on the second frame-out accuracy;
(iii) deciding the level of the change of the first change processing which is at least one of filling an image with a color, increase/decrease in resolution, increase/decrease in sharpness, increase/decrease in contrast, increase/decrease in luminance, increase/decrease in chroma, and a change in a hue; and
(iv) deciding the level of the change of the second change processing which is at least one of the filling an image with a color, the increase/decrease in resolution, the increase/decrease in sharpness, the increase/decrease in contrast, the increase/decrease in luminance, the increase/decrease in chroma, and a change in a hue, and the image alteration unit executes:
(i) performing the first change processing having the decided level of the change with respect to the decided first change-region; and
(ii) performing the second change processing having the decided level of the change with respect to the decided second change region.

21. The apparatus according to claim 1,
wherein the frame-out accuracy calculation unit executes:
(i) calculating a first frame-out accuracy in accordance with a positional relationship of the position of interest with respect to the image range; and
(ii) calculating a second frame-out accuracy in accordance with a change in the positional relationship of the position of interest with respect to the image range,
the change processing decision unit executes:
(i) deciding in accordance with the first frame-out accuracy the level of the change, which differs depending on the first frame-out accuracy, of first change processing which is at least one of increase/decrease in resolution, increase/decrease in sharpness, increase/decrease in contrast, increase/decrease in luminance, increase/decrease in chroma, and a change in a hue;
(ii) deciding in accordance with the second frame-out accuracy the level of the change, which differs depending on the second frame-out accuracy, of second change processing which is at least one of the increase/decrease in resolution, the increase/decrease in sharpness, the increase/decrease in contrast, the increase/decrease in luminance, the increase/decrease in chroma, and the change in a hue;
(iii) deciding a first change region where the first change processing is performed with respect to the image based on the image signal; and
(iv) deciding a second change region where the second change processing is performed with respect to the image based on the image signal, and
the image alteration unit executes:
(i) performing the first change processing having the decided level of the change with respect to the decided first change region; and
(ii) performing the second change processing having the decided level of the change with respect to the decided second change region.

22. The apparatus according to claim 1,
wherein the frame-out accuracy calculation unit executes:
(i) calculating a first frame-out accuracy in accordance with one of a positional relationship of the position of interest with respect to the image range and a change in the positional relationship of the position of interest with respect to the image range; and
(ii) calculating a second frame-out accuracy in accordance with the other of the positional relationship of the position of interest with respect to the image range and the change in the positional relationship of the position of interest with respect to the image range,
the change processing decision unit executes:
(i) deciding in accordance with one of the first frame-out accuracy and the second frame-out accuracy a first change region which is a region where the image based on the image signal is subjected to first change processing and whose area differs depending on one of the first frame-out accuracy and the second frame-out accuracy;
(ii) deciding the level of the change of the first change processing which is at least one of filling an image with a color, increase/decrease in resolution, increase/decrease in sharpness, increase/decrease in contrast, increase/decrease in luminance, increase/decrease in chroma, and a change in a hue;
(iii) deciding the level of the change, which differs depending on the other of the first frame-out accuracy and the second frame-out accuracy, of the second change processing which is at least one of the increase/decrease in resolution, the increase/decrease in sharpness, the increase/decrease in contrast, the increase/decrease in luminance, the increase/decrease in chroma, and the change in a hue; and
(iv) deciding a second change region which is a region where the image based on the image signal is subjected to the second change processing;
the image alteration unit executes:
(i) performing the first change processing having the decided level of the change with respect to the decided first change region; and
(ii) performing the second change processing having the decided level of the change with respect to the decided second change region.

23. The apparatus according to claim 7,
wherein the frame-out accuracy calculation unit executes:
(i) calculating a first frame-out accuracy in accordance with one of a positional relationship of the position of interest with respect to the image range and a change in the positional relationship of the position of interest with respect to the image range; and
(ii) calculating a second frame-out accuracy in accordance with the other of the positional relationship of the position of interest with respect to the image range and the change in the positional relationship of the position of interest with respect to the image range,
the processing decision unit executes:
(i) setting a first change region around a representative point of the object of interest in the image based on the image signal in conformity with the first frame-out accuracy and decides first processing for an image performed with respect to the first change region; and
(ii) setting a second change region around a representative point of the object of interest in the image based on the image signal in conformity with the second frame-out accuracy and decides second processing for an image performed with respect to the second change region, and
the image alteration unit executes:
(i) performing the first processing with respect to the first change region of the image based on the image signal; and
(ii) performing the second processing with respect to the second change region of the image based on the image signal.

24. The apparatus according to claim 7,
wherein the frame-out accuracy calculation unit executes:
(i) calculating a first frame-out accuracy in accordance with one of a positional relationship of the position of interest with respect to the image range and a change in the positional relationship of the position of interest with respect to the image range; and
(ii) calculating a second frame-out accuracy in accordance with the other of the positional relationship of the position of interest with respect to the image range and the change in the positional relationship of the position of interest with respect to the image range, the processing decision unit executes:
(i) deciding the change region to change an area of the change region and/or a level of the processing in accordance with the first frame-out accuracy, and to change an area of a portion surrounded by the change region in accordance with the second frame-out accuracy; and
(ii) deciding the processing for the processing region based on the first frame-out accuracy and the second frame-out accuracy; and the image alteration unit performs the processing with respect to the change region of the image based on the image signal.

25. The apparatus according to claim 7,
wherein the frame-out accuracy calculation unit calculates the frame-out accuracy in accordance with a positional relationship of the position of interest with respect to the image range, and
the processing decision unit sets a region indicative of the positional relationship between the position of interest and the image range as the change region.

26. The apparatus according to claim 7,
wherein the frame-out accuracy calculation unit calculates the frame-out accuracy in accordance with a change in a positional relationship of the position of interest with respect to the image range, and
the processing decision unit sets a region indicative of a direction of the change in the positional relationship between the position of interest and the image range as the change region.

27. The apparatus according to claim 12,
wherein the frame-out accuracy calculation unit executes:
(i) calculating a first frame-out accuracy in accordance with one of a positional relationship of the position of interest with respect to the image range and a change in the positional relationship of the position of interest with respect to the image range; and
(ii) calculating a second frame-out accuracy in accordance with the other of the positional relationship of the position of interest with respect to the image range and the change in the positional relationship of the position of interest with respect to the image range, the deformation parameter decision unit executes:
(i) deciding a first parameter for the geometric conversion including changing a shape of a frame peripheral of the image based on the image signal with a direction and a ratio associated with the first frame-out accuracy; and
(ii) deciding a second parameter for the geometric conversion including shrinking a part of the image based on the image signal and expanding the other part of the image with a direction and a ratio associated with the second frame-out accuracy, and the image alteration unit performs the deformation processing including the geometric conversion with respect to the image based on the image signal in conformity with the first deformation parameter and the second deformation parameter.

28. The apparatus according to claim 1,
wherein the alteration variable decision unit includes a change processing decision unit and a processing decision unit,
the frame-out accuracy calculation unit executes:
(i) calculating a first frame-out accuracy in accordance with one of a positional relationship of the position of interest with respect to the image range and a change in the positional relationship of the position of interest with respect to the image range; and
(ii) calculating a second frame-out accuracy in accordance with the other of the positional relationship of the position of interest with respect to the image range and the change in the positional relationship of the position of interest with respect to the image range, the change processing decision unit decides a first change region in the image based on the image signal and change processing performed with respect to the first change region based on the first frame-out accuracy, the processing decision unit decides a second change region around a representative point of the object of interest in the image based on the image signal and processing for an image performed with respect to the second image region based on the second frame-out accuracy, and the image alteration unit executes the change processing with respect to the first change region of the image based on the image signal and performs the processing with respect to the second change region of the image based on the image signal to generate a signal of the display image.

29. The apparatus according to claim 28,
wherein the change processing decision unit changes an area of the first change region in accordance with the first frame-out accuracy,
a type of the change processing is at least one of filling an image with color, increase/decrease in resolution, increase/decrease in sharpness, increase/decrease in contrast, increase/decrease in luminance, increase/decrease in chroma, and a change in a hue.

30. The apparatus according to claim 28,
wherein a type of the change processing is at least one of increase/decrease in resolution, increase/decrease in sharpness, increase/decrease in contrast, increase/decrease in luminance, increase/decrease in chroma, and a change in a hue, and
the change processing decision unit changes an amount of the increase/decrease or an amount of the change which is the level of the change in accordance with the frame-out accuracy.

31. The apparatus according to claim 28,
wherein the processing decision unit changes an area of the second change region and/or a level of the processing in accordance with the second frame-out accuracy.

32. The apparatus according to claim 28,
wherein the processing decision unit changes an area of a portion surrounded by the change region in the image in accordance with the image signal in conformity with the second frame-out accuracy.

33. The apparatus according to claim 1,
wherein the alteration variable decision unit includes a change processing decision unit and a deformation parameter decision unit,
the frame-out accuracy calculation unit executes:
(i) calculating a first frame-out accuracy in accordance with one of a positional relationship of the position of interest with respect to the image range and a change in the positional relationship of the position of interest with respect to the image range; and
(ii) calculating a second frame-out accuracy in accordance with the other of the positional relationship of the position of interest with respect to the image range and the change in the positional relationship of the position of interest with respect to the image range, the change processing decision unit decides a first change region in the image based on the image signal and change processing performed with respect to the first change region based on the first frame-out accuracy, the deformation parameter decision unit decides a deformation parameter for performing geometric conversion with respect to the image based on the image signal in conformity with the second frame-out accuracy, and the image alteration unit executes the change processing with respect to the first change region of the image based on the image signal and performs the deformation processing with respect to the image based on the image signal in conformity with the deformation parameter to generate a signal of the display image.

34. The apparatus according to claim 33,
wherein the change processing decision unit changes an area of the first change region in accordance with the first frame-out accuracy, a type of the change processing is at least one of filling an image with color, increase/decrease in resolution, increase/decrease in sharpness, increase/decrease in contrast, increase/decrease in luminance, increase/decrease in chroma, and a change in a hue.

35. The apparatus according to claim 33,
wherein a type of the change processing is at least one of increase/decrease in resolution, increase/decrease in sharpness, increase/decrease in contrast, increase/decrease in luminance, increase/decrease in chroma, and a change in a hue, and the change processing decision unit changes an amount of the increase/decrease or an amount of the change which is the level of the change in accordance with the frame-out accuracy.

36. The apparatus according to claim 33,
wherein the geometric conversion includes deforming a frame peripheral of the image by shortening a part of the frame of the image in the image range, and the deformation parameter decision unit decides a ratio of shortening the part of the frame in accordance with the second frame-out accuracy.

37. The apparatus according to claim 33,
wherein the geometric conversion is conversion including shrinking a part of the image in the image range and expanding the other part of the image, and the deformation parameter decision unit decides a ratio of effecting the shrinking and the expanding in accordance with the second frame-out accuracy.

38. The apparatus according to claim 1,
wherein the alteration variable decision unit includes a processing decision unit and a deformation parameter decision unit, the frame-out accuracy calculation unit executes:
(i) calculating a first frame-out accuracy in accordance with one of a positional relationship of the position of interest with respect to the image range and a change in the positional relationship of the position of interest with respect to the image range; and
(ii) calculating a second frame-out accuracy in accordance with the other of the positional relationship of the position of interest with respect to the image range and the change in the positional relationship of the position of interest with respect to the image range, the processing decision unit decides a change region around a representative point of the object of interest in the image based on the image signal and processing for an image performed with respect to the image region based on the first frame-out accuracy, the deformation parameter decision unit decides a deformation parameter for performing geometric conversion with respect to the image based on the image signal in conformity with the second frame-out accuracy, and the image alteration unit performs the processing with respect to the change region of the image based on the image signal and executes deformation processing with respect to the image based on the image signal in conformity with the deformation parameter to generate a signal of the display image.

39. The apparatus according to claim 38,
wherein the processing decision unit changes an area of the change region and/or a level of the processing in accordance with the first frame-out accuracy.

40. The apparatus according to claim 38,
wherein the processing decision unit changes an area of a portion surrounded by the change region in the image based on the image signal in conformity with the first frame-out accuracy.

41. The apparatus according to claim 38,
wherein the geometric conversion includes deforming a frame peripheral of the image by shortening a part of the frame of the image in the image range, and the deformation parameter decision unit decides a ratio of shortening the part of the frame in accordance with the second frame-out accuracy.

42. The apparatus according to claim 38,
wherein the geometric conversion is conversion including shrinking a part of the image in the image range and expanding the other part of the image, and the deformation parameter decision unit decides a ratio of effecting the shrinking and the expanding in accordance with the second frame-out accuracy.

43. An image display apparatus comprising:
an image processing apparatus according to claim 1; and
the display unit which displays the display image generated by the image processing apparatus.

44. An imaging apparatus comprising:
an image processing apparatus according to claim 1; and
an imaging unit which performs imaging to generate the image signal that is input to the image processing apparatus.

45. An imaging apparatus comprising:
an image processing apparatus according to claim 1;
an imaging unit which performs imaging to generate the image signal that is input to the image processing apparatus; and
the display unit which displays the display image generated by the image processing apparatus.

46. The apparatus according to claim 44,
wherein the imaging unit has a zoom function.

47. The apparatus according to claim 46, further comprising a control unit configured to judge whether the imaging unit has started to exercise the zoom function and allow the image processing apparatus to execute the alteration processing when the zoom function has started to be exercised.

48. The apparatus according to claim 1,
wherein the change processing decision unit decides the change region so that the change region does not include a display image region concerning a position to which the position of interest belongs with respect to a center of the image range.

* * * * *